(12) United States Patent
Mizukoshi et al.

(10) Patent No.: US 6,296,321 B1
(45) Date of Patent: Oct. 2, 2001

(54) AXLE UNIT FOR DRIVING A VEHICLE WHEEL

(75) Inventors: Yasumasa Mizukoshi; Hideo Ouchi; Takeo Ohkuma, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/638,140

(22) Filed: Aug. 15, 2000

Related U.S. Application Data

(63) Continuation of application No. 09/249,810, filed on Feb. 16, 1999, now Pat. No. 6,135,571.

(30) Foreign Application Priority Data

| Feb. 16, 1998 | (JP) | 10-32743 |
| Aug. 5, 1998 | (JP) | 10-221747 |
| Sep. 7, 1998 | (JP) | 10-252641 |
| Sep. 8, 1998 | (JP) | 10-253983 |
| Jan. 5, 1999 | (JP) | 11-000624 |
| Aug. 21, 1999 | (JP) | 10-235969 |

(51) Int. Cl.$^7$ ................................ F16C 19/36
(52) U.S. Cl. .................... 301/105.1; 301/126
(58) Field of Search ............. 301/105.1, 124.1, 301/126, 131; 180/252, 258, 259; 464/178, 904, 906; 384/544; 403/259, 261

(56) References Cited

U.S. PATENT DOCUMENTS

| 2,271,849 | * | 2/1942 | Wallace | 180/259 X |
| 2,349,388 | * | 5/1944 | Sturges | 180/259 |
| 2,956,632 | * | 10/1960 | Forbush et al. | 384/544 X |
| 3,583,511 | * | 6/1971 | Asberg | 180/43 |
| 3,589,747 | * | 6/1971 | Asberg | 280/96.1 |
| 4,371,214 | * | 2/1983 | Strader | 301/126 |
| 4,537,270 | * | 8/1985 | Brandenstein et al. | 180/70.1 |
| 4,792,020 | | 12/1988 | Okumura et al. | 188/18 A |
| 4,881,842 | | 11/1989 | Farrell et al. | |
| 4,893,960 | * | 1/1990 | Beier et al. | 403/24 |
| 4,958,944 | * | 9/1990 | Hofmann et al. | 384/512 |
| 5,226,738 | * | 7/1993 | Valette et al. | 384/513 |
| 5,240,333 | * | 8/1993 | Hassiotis et al. | 384/448 |
| 5,490,732 | * | 2/1996 | Hofmann et al. | 384/537 |
| 5,492,417 | * | 2/1996 | Baker et al. | 384/544 X |
| 5,536,075 | * | 7/1996 | Berttetti | 301/105.1 |
| 5,536,098 | * | 7/1996 | Schwarzler | 384/544 X |
| 5,544,962 | * | 8/1996 | Hofmann et al. | 384/448 |
| 5,674,011 | | 10/1997 | Hofmann et al. | |
| 5,720,530 | | 2/1998 | Holsnijders et al. | |

FOREIGN PATENT DOCUMENTS

| 2113723 | * | 2/1972 | (DE) | 301/105.1 |
| 34 18 440 | | 11/1985 | (DE) | . |
| 195 43 436 | | 5/1997 | (DE) | . |
| 0 736 398 | * | 10/1996 | (EP) | . |
| 2198995 | * | 6/1988 | (GB) | 301/105.1 |
| 2 233 404 | | 1/1991 | (GB) | . |
| 1-82903 | | 2/1989 | (JP) | . |
| 3-31001 | | 2/1991 | (JP) | . |
| 7-317754 | | 12/1995 | (JP) | . |
| 9-220904 | | 8/1997 | (JP) | . |
| 2573325 | | 3/1998 | (JP) | . |
| 10-95203 | * | 4/1998 | (JP) | . |
| 10-19661 | | 7/1998 | (JP) | . |
| 10-272903 | | 10/1998 | (JP) | . |

\* cited by examiner

Primary Examiner—Russell D. Stormer
(74) Attorney, Agent, or Firm—Crowell & Moring, L.L.P.

(57) ABSTRACT

A compact and light weight axle unit with good durability and reliability for driving a vehicle wheel is provided wherein the splined bore 28 of the hub 6a is engaged with the splined shaft 30 of the drive shaft member 29, and a stop ring 35 is held between the outer engagement groove 25 on the inner peripheral surface of the splined bore 28 and the inner engagement groove 24 on the outer peripheral surface of the splined shaft 30 to prevent the splined shaft 30 from being removed.

3 Claims, 39 Drawing Sheets

US 6,296,321 B1

AXLE UNIT FOR DRIVING A VEHICLE WHEEL

This application is a continuation of Ser. No. 09/249,810, filed Feb. 16, 1999, now U.S. Pat. No. 6,135,571.

FIELD OF THE INVENTION

The present invention relates to an axle unit for driving a vehicle wheel, being a so-called fourth generation hub unit, used for rotatably supporting a driven wheel {the front wheels of an FF vehicle (front engine, front wheel drive vehicle), the rear wheels of an FR vehicle (front engine, rear wheel drive vehicle), the rear wheels of an RR vehicle (rear engine, rear wheel drive vehicle) and all wheels of a 4WD vehicle (four-wheel-drive vehicle)} supported on an independent suspension, relative to the suspension unit, and driving the driven wheel. The fourth generation hub unit has a hub unit and a constant velocity joint detachably combined with each other.

DESCRIPTION OF THE BACKGROUND

Various kinds of axle units have heretofore been used, in which an outer ring and an inner ring are rotatably combined via rolling members in order to rotatably support a wheel on a suspension unit. It is necessary for the axle unit used for supporting the driven wheel on the independent suspension and rotatably driving the driven wheel, to smoothly transmit the rotation of the drive shaft to the wheel (while ensuring constant velocity), in combination with a constant velocity joint, regardless of relative displacement between the differential gear and the driven wheel and the steering angle imparted to the wheel. The axle unit for driving the vehicle wheel, which is a so-called fourth generation hub unit, can be combined with such a constant velocity joint and can be constructed relatively compact and lightweight. Such an axle unit has heretofore been disclosed in Japanese Patent Publication Tokukai Hei No. 7-317754, or in U.S. Pat. No. 5,674,011.

FIG. 36 shows one example of a conventional construction disclosed in Japanese Patent Publication Tokukai Hei No. 7-317754. An outer ring 1 which does not rotate while being supported on the suspension unit when incorporated into the vehicle, has an outward flange shaped attachment portion 2 for supporting the outer ring on the suspension unit, on the outer peripheral face thereof, and two rows of outer ring raceways 3 on the inner peripheral face thereof.

On the radially inner side of the outer ring 1, a hub 6 formed by combining a first element 4 and a second element 5 is disposed. Of these, the first element 4 is formed in a cylindrical form having an mount flange 7 for supporting the wheel on one end side (on the left end side in FIG. 36), and an inner ring raceway 8 on the other end side (on the right end side in FIG. 36). The second element 5 has on one end side (the left end side in FIG. 36) a cylindrical portion 9 for externally securing the first element 4, and on the other end side (the right end side in FIG. 36) a housing 11 which is the outer ring of a constant velocity joint 10 of a Rzeppa type, with the inner ring raceway 8 arranged on the outer peripheral face of the middle part thereof.

By disposing a plurality of rolling members 12, respectively between the outer ring raceways 3 and the inner ring raceways 8, the hub 6 is rotatably supported on the inside of the outer ring 1.

In a position where the inner peripheral face of the first element 4 and the outer peripheral face of the second element 5 are joined in an aligned manner, an outside engagement groove 13 and an inside engagement groove 14 are respectively formed, and a stop ring 15 is provided between and engaged into these engagement grooves 13, 14, thereby preventing that the first element 1 from coming away from the second element 5.

Moreover, a weld 17 is applied between an outer peripheral rim portion on one end face (the left end face in FIG. 36) of the second element 5 and an inner peripheral rim portion of a stepped portion 16 formed on the inner peripheral face of the first element 4, to securely connect the first and second elements 4 and 5 to each other.

Furthermore, substantially cylindrical covers 18 made of metal such as stainless steel plate, and circular seal rings 19 made of a resilient material such as rubber or elastomer are provided between the opening portions at opposite ends of the outer ring 1 and the outer peripheral face in the middle part of the hub 6. On the inside of the middle part of the second element 5, an isolating member 20 for closing off the inside of the second element 5 is provided. These covers 18, seal rings 19 and isolating member 20 shut off the portion where the plurality of rolling members 12 are installed, or the portion of constant velocity joint 10, from outside, and prevent grease existing inside the portion from leaking to the outside as well as preventing the ingress of foreign matter such as rainwater, dust or the like.

The constant velocity joint 10 comprises the housing 11, an inner ring 21, a retainer 22 and a plurality of balls 23. The inner ring 21 is fixed to a tip end of a drive shaft (not shown) which is rotatably driven via a transmission by an engine. On the outer peripheral face of this inner ring 21, there are respectively formed in a direction at right angles to the circumferential direction, six inner engagement grooves 24 having a section of an arc when cut on a virtual plane orthogonal to the central axis of the inner ring 21, at even spacing in the circumferential direction.

At a position opposite to the inner engagement grooves 24 on the inner peripheral face of the housing 11, there are similarly formed respectively in a direction at right angles to the circumferential direction, six outer engagement grooves 25 having a section of an arc.

The retainer 22 is formed in an overall annular shape, having a section of an arc, and is held between the outer peripheral face of the inner ring 21 and the inner peripheral face of the housing 11. Pockets 26 are respectively formed in the retainer 22 at the six positions in the circumferential direction thereof, being positions aligned with the inside and outside engagement grooves 24 and 25, and the abovementioned balls (six in total) are retained therein, one inside each of the pockets 26. These balls 23 can be freely rolled along the inside and outside engagement grooves 24 and 25, while being retained in each pocket 26, respectively.

When the axle unit for driving the vehicle wheel constructed as described above is fitted to a vehicle, the outer ring 1 is supported on the suspension unit by the attachment portion 2, and the driven wheel is fixed to the first element 4 by the mount flange 7.

The drive shaft (not shown) is rotatably driven via the transmission by the engine, and the tip portion of the drive shaft is spline-engaged to the inside of the inner ring 21 of the constant velocity joint 10. At the time of driving an automobile, the rotation of the inner ring 21 is transmitted to the hub 6 including the second element 5 via the plurality of balls 23 to rotatably drive the driven wheel.

FIG. 37 shows a second example of a conventional construction which is disclosed in the abovementioned U.S. Pat. No. 5,674,011. In the case of the second example of conventional construction, two rows of outer ring raceways 3 are disposed on the inner peripheral face of the outer ring 1 which does not rotate at the time of use, being internally fixed to a knuckle 40 of a suspension unit.

A mount flange 7 for supporting the wheel, is disposed on one end side (on the left end side in FIG. 37) of the outer peripheral face of the hub 6a, and two rows of inner ring raceways 8 are disposed on the other end side (on the right end side in FIG. 37) via a pair of inner rings 50. The inner rings 50 are supported and secured to the body of the hub 6a by means of a crimped portion 27 formed by bending the other end of the hub 6a radially outward.

A plurality of rolling members 12 are respectively disposed between the outer ring raceways 3 and the inner ring raceways 8 to rotatably support the hub 6a inside of the outer ring 1.

A splined bore 28 is provided in the central portion of the hub 6a. The hub 6a and a drive shaft member 29 are thus combined to form an axle unit for driving a vehicle wheel. On one end side of the drive shaft member 29, there is provided a splined shaft 30 engaging with the splined bore 28. In addition, on the other end side of the drive shaft member 29 is a housing 11 which is the outer ring of the constant velocity joint. The drive shaft member 29 and the hub 6a are combined together such that the splined shaft 30 is inserted into the splined bore 28, and a coupling member 31 made of a resilient material is interlockingly engaged with the members 29 and 6a to thereby prevent separation. The coupling member 31 is provided with encoders 32 made of a magnetic material or a permanent magnet to make it possible to detect the rotation speed of the two members 29 and 6a.

FIG. 38 shows a third example of a conventional construction which is disclosed in Japanese Utility Model Registration No. 2,573,325. In the case of the third example of conventional construction, a hub 6b is spline-engaged with a portion of an end of an axle 92 exposed from the end of an axle pipe 93. The hub 6b is rotatably supported by rolling members arranged in two rows inside of a fixed outer ring 1a.

In addition, a stop ring 15a in the form of a segment circle is engaged in an engagement groove 94 formed in the tip portion of the axle 92 at a portion projecting from the spline engagement with the hub 6b, to prevent the hub 6b from coming out from the axle 92.

FIG. 39 shows a fourth example of a conventional construction which is disclosed in U.S. Pat. No. 4,881,842. In the case of the fourth example of conventional construction, a hub 6c is rotatably supported by two rows of rolling members inside of an outer ring 1b fixed to a knuckle 40.

A splined shaft 30 is spline-engaged with a splined bore 28 formed in the central portion of the hub 6c. In addition, a housing 11 which is the outer ring of the constant velocity joint is disposed on the base end (the right end in FIG. 39) of the splined shaft 30. On the tip end face (the left end face in FIG. 39) of the splined shaft 30, is formed an attachment portion 95 for engaging with a tool for pulling the splined shaft 30 into the splined bore 28.

The hub 6c is prevented from coming out from the splined shaft 30 by a stop ring 15b fitted in the engagement groove formed in a portion on the tip end side on the outer peripheral face of the splined shaft 30. In this condition, a resilient ring 96 is resiliently compressed between the hub 6c and the housing 11 to prevent play of the hub 6c on the splined shaft 30.

FIG. 40 shows a fifth example of a conventional construction which is disclosed in U.S. Pat. No. 5,492,417. In the case of the fifth example of conventional construction, a hub 6d is rotatably supported by two rows of rolling members inside of an outer ring 1c fixed to a knuckle 40. An inner ring 50 externally fitted to the hub 6d is prevented from moving axially, with a stop ring 97 fitted in the hub 6d.

In addition, the tip portion of a sleeve 98 (the left end in FIG. 40) of a constant velocity joint, which is spline-engaged with the axially inner end (the right end in FIG. 40) of the hub 6d covers the stop ring 97 to prevent the stop ring 97 from coming off from the hub 6d.

A stop ring 15c is positioned between and engaged with the outer peripheral face of the inner end of the hub 6d and the inner peripheral face of the sleeve 98 to prevent the hub 6d from coming out from the sleeve 98. A gear-like undulation portion 99 is formed on the outer peripheral face of the tip portion of the sleeve 98 so that this portion functions as an encoder. A rotation speed detection sensor 101 supported on the outer ring 1c via a seal ring 100 faces the undulation portion 99 so as to detect the rotation speed of the sleeve 98 and the hub 6d.

In the case of the first example of the conventional construction shown in FIG. 36, transmission of the rotation force between the first element 4 and the second element 5 which constitute the hub 6 must be effected by the portion of weld 17. That is to say, it is necessary to transmit a large torque for driving, between the first element 4 for supporting the wheel and the second element 5 coupled to the drive shaft.

However, since these elements 4 and 5 are engaged with each other at their cylindrical faces, a large torque cannot be transmitted at the engaging faces. It is therefore required to transmit the large torque through the portion of weld 17. Hence the weld 17 needs to be a full peripheral built up weld in order to increase the strength of the portion of weld 17 sufficiently. When the weld 17 is a built up weld around the whole periphery however, the shape of the portion of inner ring raceway 8 formed on the outer peripheral face of the first element 4 may be distorted, or the hardness of the portion of inner ring raceway 8 may be decreased, due to the heat at the time of welding. Hence the durability of the rolling bearing unit including this inner ring raceways 8 cannot be sufficiently ensured.

In the case of the second example of the conventional construction shown in FIG. 37, since the separation between the hub 6a and the drive shaft member 29 is prevented by the coupling member 31 made of a resilient material, the function of preventing the separation is rather uncertain. That is to say, when an automobile turns abruptly, a large cornering force is applied to the hub 6a in the direction of pulling this hub 6a away from the drive shaft member 29, based on the large thrust load due to a centrifugal force applied to the hub 6a from the wheel. Therefore in the case of such a large force it is very difficult to reliably prevent the separation of the hub 6a from the drive shaft member 29, by means of the coupling member 31. Hence sufficient reliability cannot be ensured.

The third example of the conventional construction shown in FIG. 38 relates to a so-called semi-floating type construction which is a non-independent suspension type suspension. In the case of such a construction, the splined engagement portion can be shut off from the outside space by the coupling portion of the axle pipe 93 and the outer ring 1a. Therefore, it is not necessary to provide a sealing device between the axle and the hub to shut off the splined engagement portion from the outside space. The third example of such a conventional construction has a quite different basic construction from that of the present invention in which the driven wheel supported by an independent type suspension is rotatably supported with respect to the suspension unit.

In the case of the fourth example of the conventional construction shown in FIG. 39, a member for shutting off the splined engagement portion from the outside is not provided. Therefore, the ingress of foreign matter such as rain water containing dust into the splined engagement portion cannot be avoided. Moreover, in the case of the construction as shown in FIG. 39, in which play of the hub 6c with respect to the splined shaft 30 is prevented by the resilient ring 96, and the resilient ring 96 can be deformed due to axial load causing sliding motion in the splined engagement portion, and then if foreign matter enters into the splined engagement portion, the splined engagement portion is worn, and the durability is deteriorated, which is unsatisfactory.

In the case of the fifth example of the conventional construction shown in FIG. 40, since the splined engagement portion is disposed in a portion protruding inward from the inner end opening of the outer ring 1c, the axial dimension of the whole axle unit for driving the vehicle wheel is increased, and a compact and lightweight structure cannot be realized.

The axle unit for driving the vehicle wheel according to the present invention has been developed in order to address the above-mentioned problems.

SUMMARY OF THE INVENTION

An object of the present invention is to provide a compact and light weight axle unit with good durability and reliability for driving a vehicle wheel wherein the hub has a splined bore which is engaged with the splined shaft of the drive shaft member, and a stop ring which is held between the outer engagement groove on the inner peripheral surface of the splined bore and the inner engagement groove on the outer peripheral surface of the splined shaft to prevent the splined shaft from being removed.

DETAILED DESCRIPTION OF THE PREFERRED EMBODIMENTS

Figure 37:
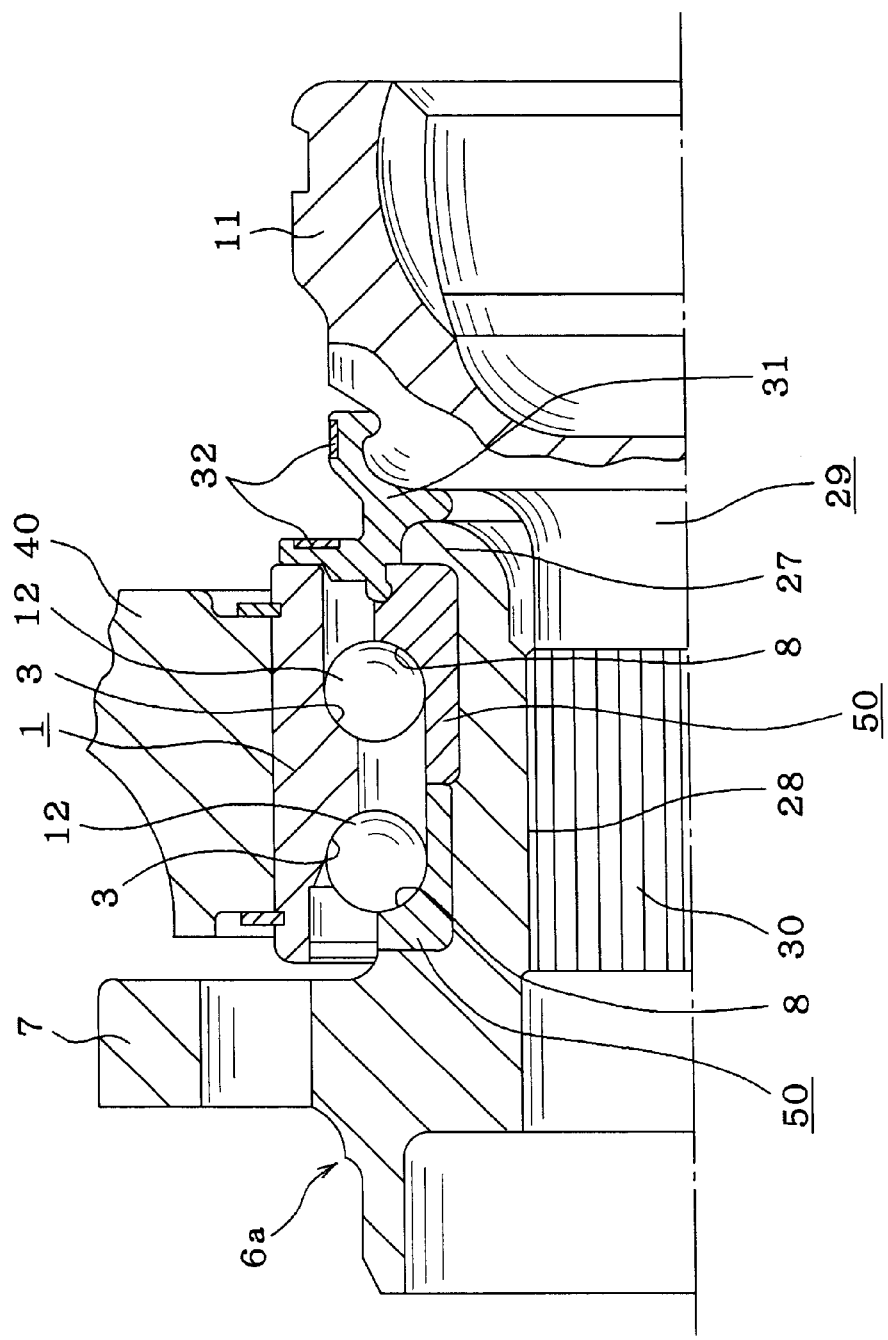
FIG. 37 is a cross sectional partial view of one example of the prior art structures.
Figure 38:
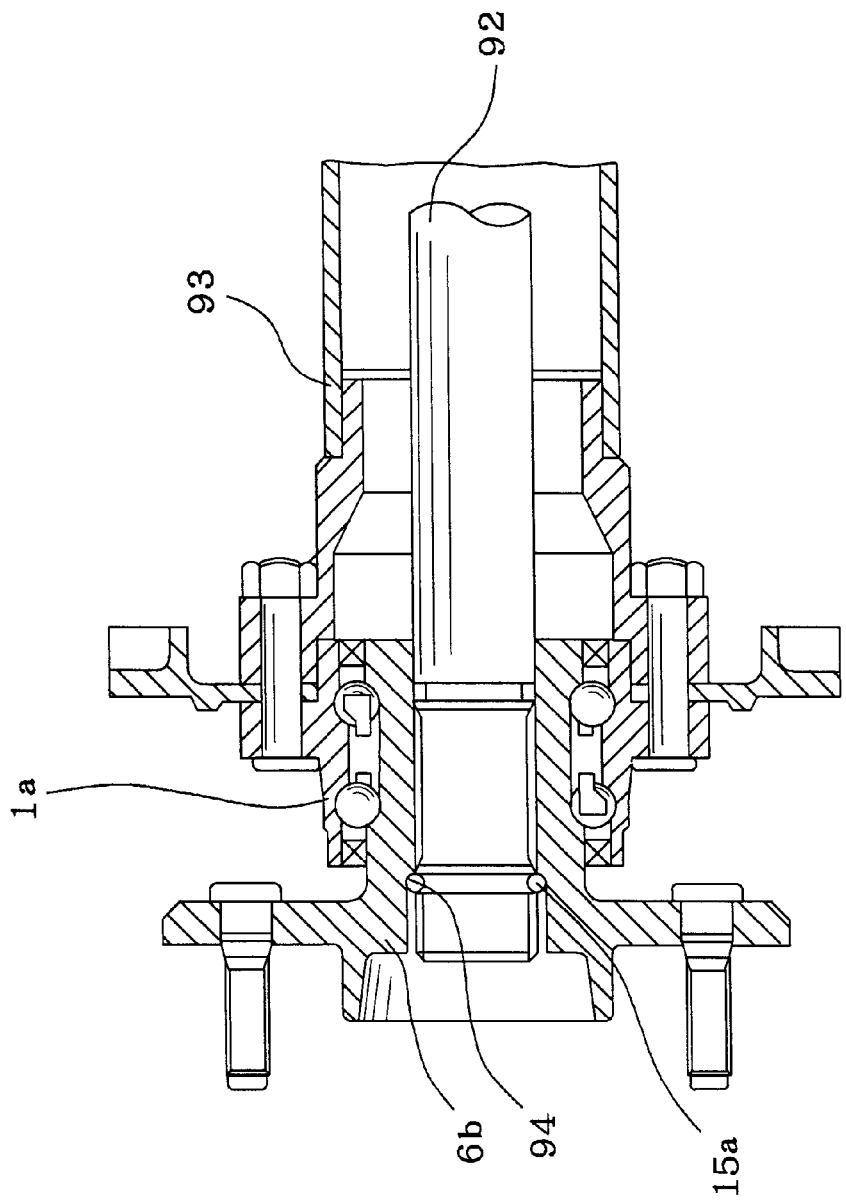
FIG. 38 is a cross sectional partial view of one example of the prior art structures.

The axle unit for driving a vehicle wheel in one feature of the present invention is combined with a constant velocity joint and comprises, like the axle unit for driving the vehicle wheel of the second example of the prior art structure shown in FIG. 37, an outer ring having an inner peripheral surface formed with an outer ring raceway and being not rotatable during use, a hub having an outer peripheral surface formed with a mount flange at a portion on one end side thereof to support the wheel, with an inner ring raceway at a portion on the other end side thereof, the inner ring raceway being formed directly thereon or on an inner ring thereon, and a splined bore at a central portion, a drive shaft member having a splined shaft on one end side thereof for engagement with the splined bore and a housing section on the other end side thereof, the housing section forming the outer ring of the constant velocity joint, and a plurality of rolling members provided rotatably between the outer ring raceway and the inner ring raceway.

Particularly, in one feature of the present invention, the axle unit for driving the vehicle wheel is provided with an inner engagement portion formed in the outer peripheral surface of the splined shaft in the whole circumference, an outer engagement portion formed in the inner peripheral surface of the hub in the whole circumference at the location in alignment with the inner engagement portion, and a stop ring made of a resilient member.

The stop ring is provided between and engaged with the inner engagement portion and the outer engagement portion, so that the hub is positioned axially with reference to the drive shaft member. In addition, a seal member of resilient material is resiliently held between the hub and the drive shaft member to seal the splined engagement portion between the splined bore and the splined shaft.

In another feature of the present invention, a coupling shaft member different from the hub is provided, and the axle unit for driving the vehicle wheel is provided with an outer engagement portion formed in the inner peripheral surface of the bore formed and engaged on one end side of the splined shaft in the whole circumference, an inner engagement portion formed in the outer peripheral surface of the coupling shaft member in the whole circumference at the location in alignment with the outer engagement portion, and a stop ring made of a resilient member.

Part of the hub is held axially from the opposite sides between part of the coupling shaft member and part of the drive shaft member and in this state, the stop ring is provided between and engaged with the inner engagement portion and the outer engagement portion, so that the hub is positioned axially with reference to the coupling shaft member and drive shaft member. In addition, a seal member of resilient material is resiliently held between the hub and the drive shaft member to seal the splined engagement portion between the splined bore and the splined shaft.

In addition, in another feature, a coupling member different from the hub is provided, and part of the coupling member is connected to one end of the drive shaft member. With part of the coupling member and part of the drive shaft member, the hub is positioned axially with reference to the coupling member and drive shaft member. In addition, a seal member of resilient material is resiliently held between the hub and the drive shaft member to seal the splined engagement portion between the splined bore and the splined shaft.

With the axle unit for driving the vehicle wheel, torque is transmitted between the drive shaft member and the hub based on engagement between the splined shaft and splined bore. Accordingly, any treatment such as the built up weld to securely conduct the torque transmission between the drive shaft member and the hub, that causes distortion by heat etc., is not required, so that the endurance of the rolling bearing unit parts including the inner ring raceways can be secured.

Particularly, in this invention, the hub and the drive shaft member can be prevented from being separated from each other by engagement between the inner and outer engagement portions and the stop ring, or between the inner and outer engagement portions, the stop ring and the coupling shaft member, or between the coupling member, the drive shaft member and the hub. Since the stop ring is made of a material with sufficient strength such as metals, the separation is positively prevented so as to secure the reliability of the axle unit for driving the vehicle wheel.

In the structure of the present invention, axial sliding motion occurs in the splined engagement portion, which is different from the clamping with a nut or from the connection with welding, but since the seal member of resilient material is resiliently held between the hub and the drive shaft member to isolate the splined engagement portion from outside space, foreign matter can be prevented from entering the splined engagement portion, so that wear in the splined engagement portion is prevented. As a result, the endurance of the axle unit for driving the vehicle wheel including the splined engagement portion can be improved.

Now, some examples of the embodiments of the present invention are explained with reference to the attached drawings.

Figure 1:
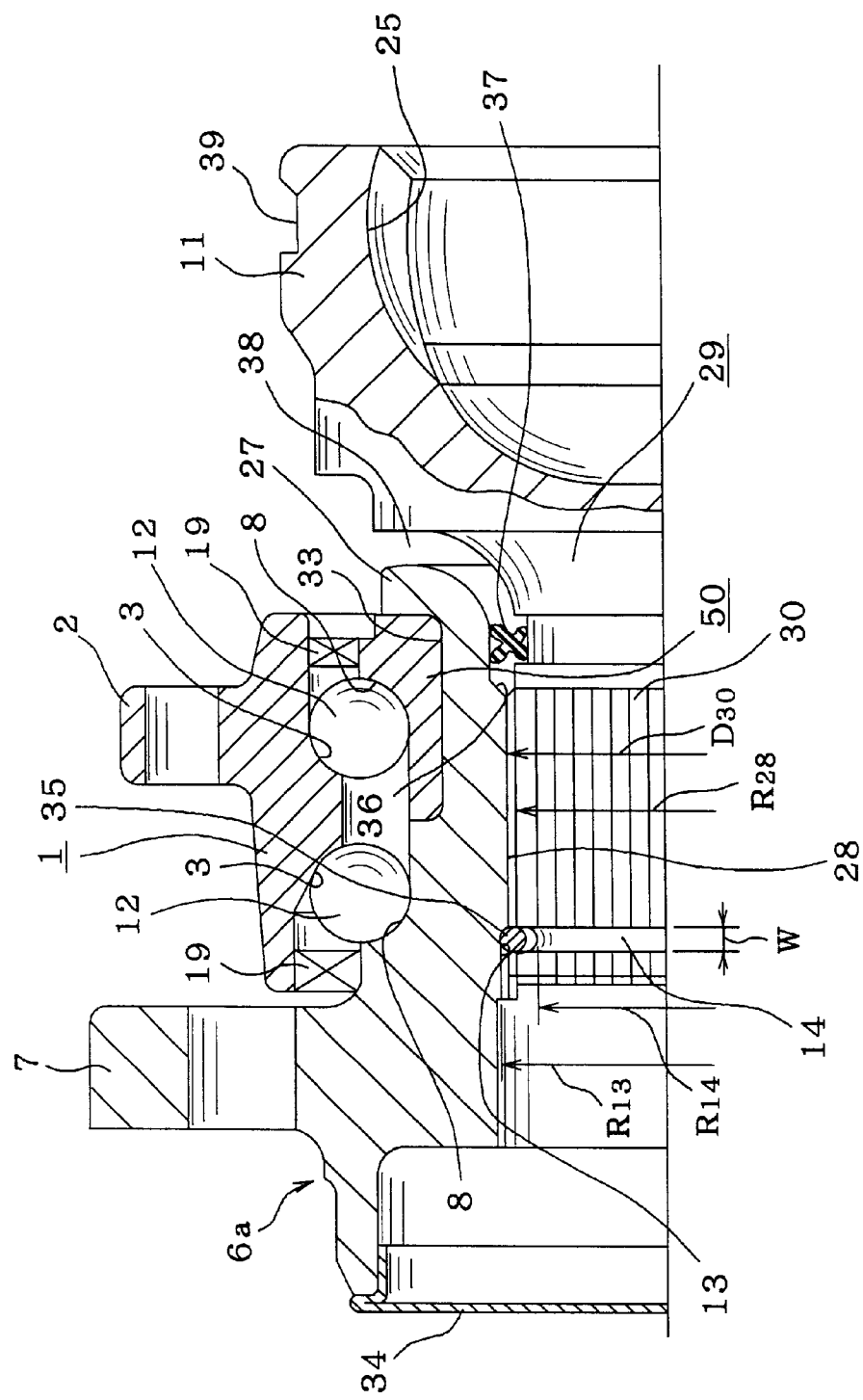
FIG. 1 is a cross sectional view of one half of an example of the embodiments of the axle unit for driving a vehicle wheel according to the present invention.
Figure 2:
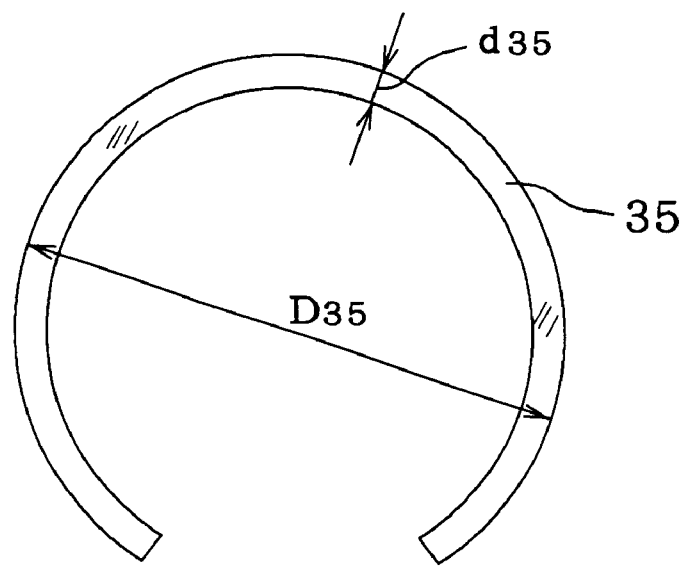
FIG. 2 is a view of a stop ring taken from one side of FIG. 1.

FIGS. 1 and 2 show a first example of an embodiment of the present invention. An outer ring 1 which does not rotate while being supported on the suspension unit has an attachment portion 2 for supporting on the suspension unit, on the outer peripheral face thereof, and two rows of outer ring raceways 3 on the inner peripheral face thereof. A hub 6a is disposed concentrically with the outer ring 1, on the inner diameter side of the outer ring 1.

Inner ring raceways 8 are disposed directly or on a separate inner ring 50 on the outer peripheral face of the hub 6a on a part facing the respective outer ring raceways 3.

The inner ring 50 is externally fitted to a stepped portion 33 formed on the axially inner end of the main body of the hub 6a (an end portion towards the center in the width direction of the vehicle when fitted to the vehicle; the right end in FIG. 1), and is secured to the hub 6a at the axially inner end of the main body, by a crimped portion 27 formed by upsetting and expanding a portion protruding from the axially inner end face of the inner ring 50 in a radially outward direction.

The hub 6a is rotatably supported on the inside of the outer ring 1, by rollably providing a plurality of rolling members 12 between the outer ring raceways 3 and the inner ring raceways 8, respectively.

In addition, seal rings 19 are disposed between the inner peripheral face on opposite end portions of the outer ring 1 and the outer peripheral face of the middle part of the main body of the hub 6a and the outer peripheral face of the axially inner end portion of the inner ring 50, to isolate the portion where the rolling members 12 are arranged from the outside space.

The outer end opening, that is at the axially outer end, of the hub 6a is fitted and secured with a cap 34 to shut off the outer end opening. On the outer peripheral face of the axially outer end of the hub 6a (the end towards the outside in the width direction of the vehicle when fitted to the vehicle; the left end in FIG. 1; corresponding to the one end described in the claims), a mount flange 7 for supporting and securing the wheel to the hub 6a is provided integrally with the hub 6a.

Moreover, a splined bore 28 is disposed in the center of the hub 6a. The hub 6a and the drive shaft member 29 are combined to constitute a rolling bearing unit for a wheel. A splined shaft 30 which engages with the splined bore 28 is also disposed at the portion on the axially outer end side of the drive shaft member 29. The portion on the axially inner end side of the drive shaft member 29 forms a housing 11 which is an outer ring of a constant velocity joint.

With the axle unit for driving the vehicle wheel according to the present invention, an inside engagement portion or inside engagement groove 14 is formed around the whole periphery on the outer peripheral face of the middle part on the axially outer end side of the splined shaft 30. An outside engagement portion or outside engagement groove 13 is also formed around the whole periphery at a position aligned with the inside engagement groove 14, on the inner peripheral face of the middle part on the axially outer end side of the splined bore 28.

Moreover, a stop ring 35 in the form of a segment circle as shown in FIG. 2 is fitted to the inside and outside engagement grooves 14 and 13 so that the stop ring 35 is provided between and engaged with these engagement grooves 14 and 13.

The stop ring 35 is so formed that the diameter thereof is resiliently compressible and expandable, by forming a wire rod made of a resilient metal such as spring steel, stainless spring steel and the like in the form of an approximate C-shaped segment circle. An outer diameter $D_{35}$ of the stop ring 35 in a free state should be at least a diameter $R_{28}$ of the maximum inscribing circle of the splined bore 28 (the addendum circle of the splined bore 28). Moreover, a diameter $R_{14}$ of the groove bottom of the inside engagement groove 14 and the diameter $R_{13}$ of the groove bottom of the outside engagement groove 13 are restricted so that the stop ring 35 is provided between and engaged with the inside and outside engagement grooves 14 and 13. That is to say, the diameter $R_{14}$ of the groove bottom of the inside engagement groove 14 is not larger than a value obtained by subtracting twice of the diameter $d_{35}$ of the wire rod constituting the stop ring 35 from the diameter $R_{28}$ of the maximum inscribing circle of the splined bore 28 ($R_{14} \leq R_{28} - 2d_{35}$).

Such a restriction is required to make it possible to freely insert the splined shaft 30 together with the stop ring 35 into the splined bore 28, with the stop ring 35 pushed into the bottom of the inside engagement groove 14.

In addition, the diameter $R_{13}$ should be less than a value obtained by adding twice of the diameter $d_{35}$ of the wire rod constituting the stop ring 35 to the diameter $D_{30}$ of the maximum circumscribing circle of the splined shaft 30 (the addendum circle of the splined shaft 30) ($R_{13} < D_{30} + 2d_{35}$). Such a restriction is required to engage the inner peripheral rim portion of the stop ring 35 with the inside engagement groove 14, with the diameter of the stop ring 35 resiliently enlarged.

Therefore, it is preferred that the diameter $R_{13}$ of the groove bottom of the outside engagement groove 13 be restricted so that the stop ring 35 exists in a central position in a diametrical direction of the engagement portion between the splined bore 28 and the splined shaft 30, with the outer peripheral rim of the stop ring 35 abutted against the groove bottom of the outside engagement groove 13.

Since the dimensions of the inside and outside engagement grooves 14 and 13 and the stop ring 35 are restricted as described above, then if the splined shaft 30 is inserted into the splined bore 28 with the stop ring 35 fitted to the portion of inside engagement groove 14, the hub 6a and the drive shaft member 29 can be coupled so as not to be separated. That is to say, when the hub 6a and the drive shaft member 29 are coupled, the splined shaft 30 is inserted into the splined bore 28 with the stop ring 35 fitted to the inside engagement groove 14, from inside toward outside, that is, from the right to the left in FIG. 1.

By this inserting action, the stop ring 35 is guided along the inner peripheral faces of the crimped portion 27 and of a guide face 36 formed in a conical concave shape disposed adjacent to the axially inner end portion of the splined bore 28, while resiliently compressing the outer diameter, and is pushed into the splined bore 28. Then, the diameter of the stop ring 35 resiliently expands until the outer peripheral rim of the stop ring 35 abuts against the bottom face of the outside engagement groove 13, with the inside engagement groove 14 and the outside engagement groove 13 aligned.

In this way, with the diameter of the stop ring 35 resiliently expanded, the stop ring 35 is provided between and engaged with the inside and outside engagement grooves 14 and 13 to prevent the splined shaft 30 from coming out from the splined bore 28, and to couple the hub 6a and the drive shaft member 29 so as not to be separated.

The tilt angle of the guide face 36 with respect to the axial direction of the hub 6a is preferably 30 degree or less so that the stop ring 35 can smoothly pass along the guide face 36.

Furthermore, it is preferable that the engagement portion between the splined shaft 30 and the splined bore 28 is lubricated by applying a urea type grease to the engagement portion between the splined shaft 30 and the splined bore 28 to interpose a lubricant therebetween. The urea type grease contains an urea compound as the consistency agent and a synthetic oil as the base oil.

A width W of the inside and outside engagement grooves 14 and 13 is required to be not smaller than the diameter $d_{35}$ of the wire rod constituting the stop ring 35, but the difference between the width W and the diameter $d_{35}$ is made as small as possible. The reason for this is to suppress play in the coupling portion made up of the inside and outside engagement grooves 14 and 13 and the stop ring 35.

To improve the coupling strength between the hub 6a and the drive shaft member 29, the coupling portion made up of the inside and outside engagement grooves 14 and 13 and the stop ring 35 may be disposed in two axial positions. In this case however, the width of the inside and outside engagement grooves 14 and 13 and the diameter of the wire rod constituting the stop ring 35 located on the tip end side in the insertion direction (the left end side in FIG. 1) should be larger than the width of the inside and outside engagement grooves and the diameter of the wire rod constituting the stop ring located on the rear end side in the insertion direction (the right end side in FIG. 1).

The reason for this is to prevent the stop ring of the engagement portion on the tip end side and the outside engagement groove of the engagement portion on the rear end side from engaging with each other. Otherwise, the splined shaft 30 could not be inserted further into the splined bore 28.

In the case of this example, a seal member or seal ring 37 of an X-shape in cross-section is disposed between a portion located between the splined shaft 30 and the housing 11 on the outer peripheral face of the middle part of the drive shaft member 29, and the inner peripheral face of the axially inner end portion of the hub 6a. The circular seal ring 37 made of a resilient material such as a rubber like elastomer etc. cooperates with the cap 34 to seal off the splined engagement portion between the splined shaft 30 and the splined bore 28 substantially completely to prevent the ingress of foreign matter such as rain water containing dust into the splined engagement portion, and to prevent the spline engagement portion from rusting, or wear of the splined engagement portion from progressing.

Incidentally, if a member of steel plate is, in lieu of the resilient material as in the present invention, provided with a spring performance by being formed e.g. in a V-shape in cross section and simply placed into contact with the mating member, it may be possible for the member to tightly come into contact with the mating member in the macro shape, but not possible to tightly one into contact with the mating member in the micro shape such as surface roughness, undulation. Accordingly, it can not be referred to as "seal" because no secure sealing is achieved. In this invention, the seal ring is made of a more or less soft material which can tightly conform with the micro shape of the mating member which the seal ring contacts, so that good sealing performance is achieved. Specifically, not only the sealing performance but also the durability is taken into consideration, and therefore the seal is made of a rubber material with good sealing property such as nitrile rubber, fluorine-containing rubber, or a thermoplastic polyether elastomer material with good durability such as hytrel, arnytel, so that the seal material has a modules of longitudinal elasticity of 200 [MPa] or less, and desirably between 5 [MPa] and 60 [Mpa]. Furthermore, a gap 38 is interposed between the crimped portion 27 formed at the axially inner end portion of the hub 6a and the axially outer end face of the housing 11 of the drive shaft member 29. Therefore, at the time of operating the axle unit of this example, even if circumferential relative motions are produced based on elastic deformation during bearing torque, the crimped portion 27 does not rub against the axially outer end face of the housing 11, so that no abnormal sounds are produced due to rubbing. Furthermore, on the outer peripheral face of the inner end portion of the housing 11, an anchoring groove 39 is formed for anchoring an axially outer end portion of a dust prevention boot (not shown).

In the case of the axle unit for driving the vehicle wheel according to the present invention constructed and assembled as described above, the transmission of torque between the drive shaft member 29 and the hub 6a is effected based on the engagement between the splined shaft 30 and the splined bore 28. Accordingly, working involving for example a full peripheral built up weld which can cause distortion due to the heat, is not required for reliably transmitting the torque between the drive shaft member 29 and the hub 6a. Hence the durability of each part of the rolling bearing unit including the inner ring raceways 8 formed on the outer peripheral face of the middle part of the main body of hub 6a can be ensured.

Moreover, separation between the drive shaft member 29 and the hub 6a can be prevented by the engagement between the inside and outside engagement grooves 14 and 13 and the stop ring 35. The stop ring 35 formed in the form of a segment circle can be made of metallic materials having sufficient strength, such as spring steel, stainless spring steel and the like. Hence the abovementioned separation can be reliably prevented thus ensuring the reliability of the axle unit.

Furthermore, since the seal ring 37 is disposed between the drive shaft member 29 and the hub 6a to cooperate with the cap 34, the splined engagement portion between the splined shaft 30 and the splined bore 28 is shut off from the outside space, and since grease as a lubricant is applied to and interposed in this splined engagement portion, the occurrence of excessive wear in the splined engagement portion due to fretting or the like, can be prevented.

Incidentally, the splined engagement portion is lubricated as mentioned above because any sliding movements would be caused in the axial direction in the splined engagement portion because there are axial clearances provided between the stop ring and the engagement grooves in the engagement. Any solid lubricants and liquid lubricants may be used for lubrication, but the grease lubricant is inexpensive and easy to treat. The grease is filled in the splined engagement portion between the hub and the driving shaft member such that the grease is coated on either the male spline or the female spline in engagement before connecting the hub to the driving shaft member. When the grease is coated on the female spline in the inner diameter surface of the hub, since the coated portion is not exposed, the grease could not be attached to a packing member during transportation, and then it is possible to control the grease amount after assembling.

Moreover, in the present embedment, the seal 37 is provided to seal the splined engagement portion in addition to the seal 19 for sealing the bearing, and therefore even when the hub unit in a sub-assembly, not in a complete assembly, is transported and assembled with the driving shaft member in a later step, foreign matter such as dust could not enter the hub unit during transportation, since it has been already sealed.

Similarly, when in the market, the hub unit is disengaged from the driving shaft member in order that one of them is reused, foreign matter such as dust could not enter the hub unit when being disengaged from the driving shaft member.

Although the structure where a single seal is used for sealing between the outer ring of the bearing and the driving shaft member is known in the art, which is different from the present invention, the step of simultaneously assembling the hub unit and driving shaft member must be adopted to prevent the foreign matter such as dust from entering the bearing in the structure, and such a product lacks in flexibility. In addition, in this case, both of the hub unit and driving shaft member must be simultaneously exchanged when required in the market. Such a structure urges the user to bear monetary load for redundant parts, and in addition it is not desirable in saving resources.

The present invention is directed to a structure where the seal member of the bearing is separated from the seal member of the spline, with the spline seal provided between the relatively not-rotatable members to achieve easily the good seal performance. In addition, the seal 37 before assembling the hub unit in the driving shaft member is fitted onto the driving shaft member with interference, and therefore the seal would not drop, the seal mount position would not move, and any such troubles would not occur during assembling.

Figure 3:
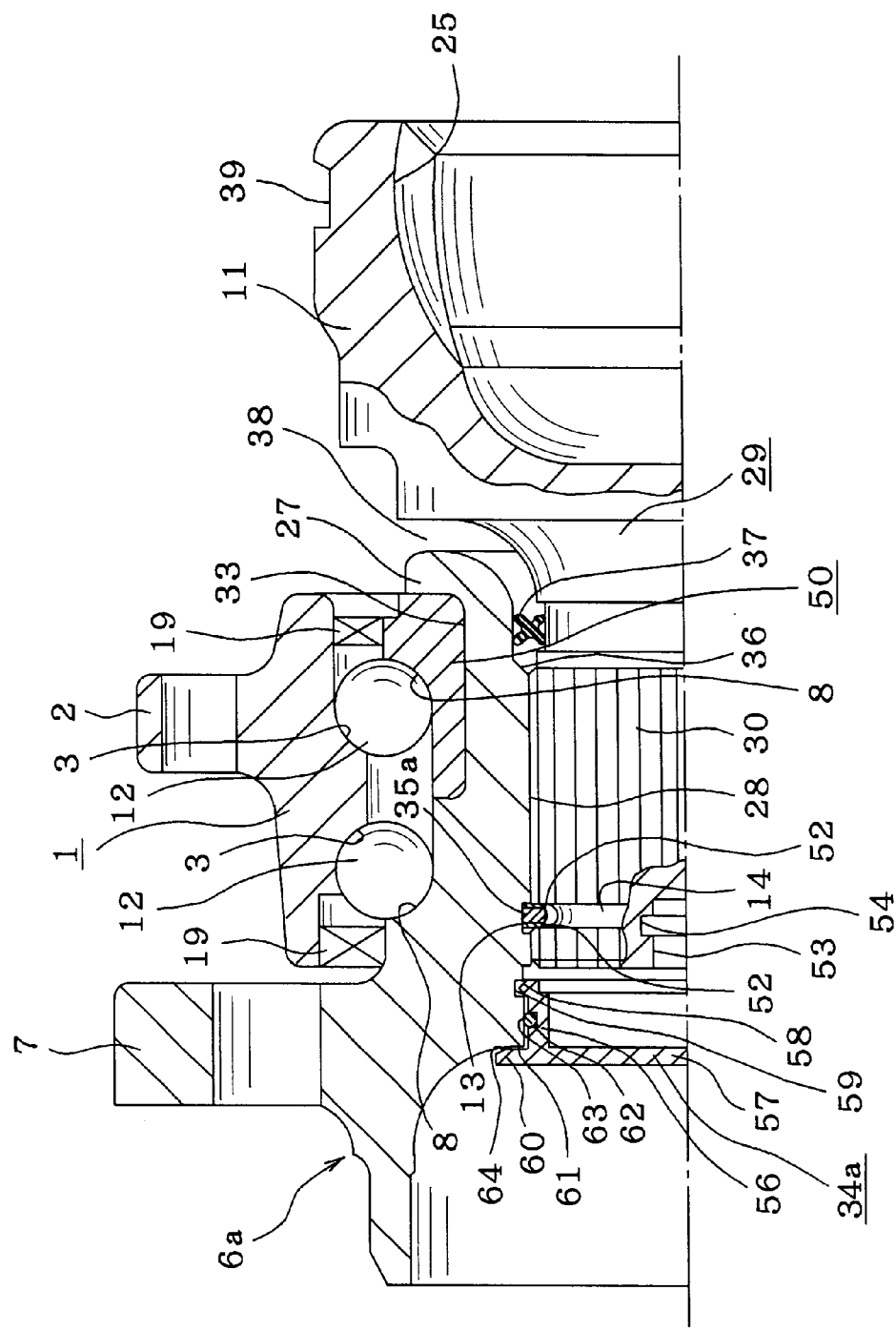
FIG. 3 is a cross sectional view of one half of an example of the embodiments of the axle unit for driving a vehicle wheel according to the present invention.
Figure 4:
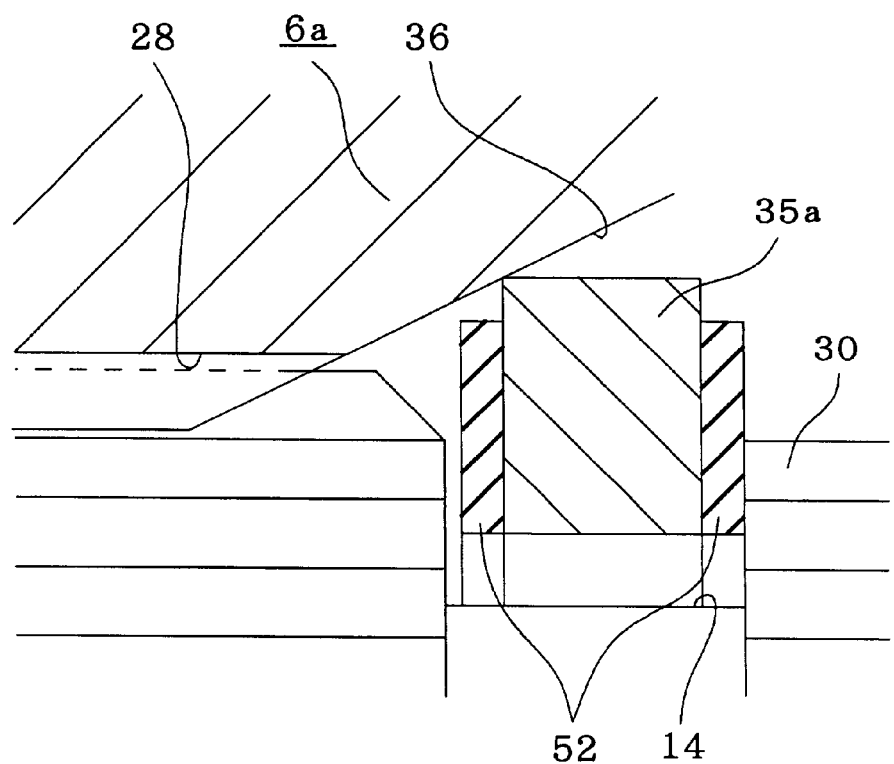
FIG. 4 is an enlarged partial view of the stop ring in an inserted state.
Figure 5:
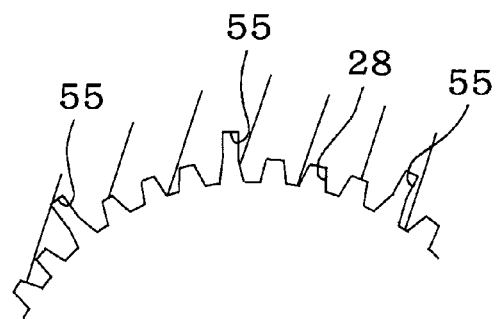
FIG. 5 is a partial view of the splined bore taken from left in FIG. 3.

FIGS. 3 to 5 show a second example of the embodiment of the present invention. In the case of this example, the stop ring 35a provided between and engaged with the inside engagement groove 14 and the outside engagement groove 13 is made by press punching a plate member made of a spring steel (including a tool steel such as SK5 or the like), in order to impart a spring property to the stop ring 35a. Such a stop ring 35a is formed roughly in a C-shape overall, having a rectangular cross-section (a segment circle), and the entire ring is quench hardened.

In this example, a pair of buffer members 52 composed of a resilient material such as rubber or a synthetic resin are bonded around the whole periphery on axially opposite side faces of the stop ring 35a. Hence, even if the hub 6a and the drive shaft member 29 are relatively displaced in the axial direction, due to play existing in the coupling portion between both axially opposed faces of the inside and outside engagement grooves 14 and 13 and the stop ring 35a, direct bumping of the axially opposed faces of the inside and outside engagement grooves 14 and 13 against the axially opposite side faces of the stop ring 35a is prevented, thereby alleviating the shock on these faces.

As a result, durability of the inside and outside engagement grooves 14 and 13 and the stop ring 35a can be ensured, as well preventing the occurrence of any unpleasant metallic sound due to direct bumping of these portions. Moreover, by bonding the abovementioned buffer members 52 thereto, the effect of preventing wear of the stop ring 35a due to fretting can also be obtained.

The outer diameter of the buffer member 52 bonded to the face, at least on the axially outside in the installed state (the left side face in FIGS. 3 and 4), of the opposite side faces of the stop ring 35a is made slightly smaller than that of the stop ring 35a. Specifically, as shown in FIG. 4, the outer diameter of the buffer members 52 is made smaller so that when the tip end portion of the splined shaft 30 is inserted into the inside of the splined bore 28, the outer peripheral edge of the buffer member 52 bonded to the outside face of the stop ring 35a does not abut against the guide face 36 disposed on the inner end edge of the splined bore 28.

This is because the frictional force acting on the abutting portion of the guide face 36 and the buffer member 52 would be larger than the frictional force acting on the abutting portion of the guide face 36 and the stop ring 35a. In other words, so that the larger frictional force is prevented from acting, thus making it easier to insert the tip portion of the splined shaft 30 into the inside of the splined bore 28. If the outer diameter of both buffer members 52 is restricted as described above, it is not necessary to worry about the direction of attaching the stop ring 35a to the inside engagement groove 14, thus facilitating installation.

In the case of this example, the axial dimension of the splined shaft 30 and the splined bore 28 is restricted such that the tip end portion of the splined shaft 30 protrudes slightly from the axially outer end edge of the splined bore 28, at the time of inserting the splined shaft 30 into the splined bore 28, when the portion on the outer diameter side of the stop ring 35a attached to the inside engagement groove 14 enters into the outside engagement groove 13 (when the stop ring 35a is placed on engagement between the inside and outside engagement grooves 14 and 13). Therefore, it can be easily judged whether or not the stop ring 35 a is placed for engagement between the inside and outside engagement grooves 14 and 13, enabling prevention of errors in assembly.

In the case of this example, a bottomed bore 53 is formed in the central portion of the tip end face of the splined shaft 30, and an engagement groove 54 is formed around the whole periphery on the inner peripheral face of the middle part of the bottomed bore 53.

At the time of inserting the splined shaft 30 into the splined bore 28, by engaging the tip portion of a drawing tool in the engagement groove 54, the splined shaft 30 can be pulled from an opening on the axially outer end side of the splined bore 28.

In addition, though not shown, the male spline formed on the outer peripheral face of the splined shaft 30 is formed slightly twisted in the axial direction, to reduce any play in the circumferential direction of the splined engagement portion between the splined shaft 30 and the splined bore 28. Therefore, when the splined shaft 30 is inserted into the splined bore 28, a large frictional force works in the axial direction between the outer peripheral face of the splined shaft 30 and the inner peripheral face of the splined bore 28.

In the case of this example however, since the splined shaft 30 can be pulled out by the drawing tool whose tip portion is engaged in the engagement groove 54, the insertion of the splined shaft 30 can be easily effected.

Moreover, in the case of this example, since the attachment groove 54 for engaging the tip portion of the drawing tool therein is formed on the inner peripheral face of the bottomed bore 53 formed on the tip end face of the splined shaft 30, the weight and the axial dimension of the drive shaft member 29 is not increased, unlike the fourth example of the conventional construction. Though the strength of the tip portion of the splined shaft 30 may be somewhat decreased with the formation of the bottomed bore 53, in practice there is no problem, since a large torque is not applied to the tip portion.

Furthermore, in the case of this example, deep grooves 55 deeper than the female splined grooves formed on the inner peripheral face of the splined bore 28 are formed in the axial direction (in the right and left direction in FIG. 3, and in the direction out of the page in FIG. 5), as shown in FIG. 5, at a plurality of places in the circumferential direction of the splined bore 28, in a portion at least from the axially outer end edge of the splined bore 28 towards the axially outer end of the splined bore 28 which straddles the outside engagement groove 13.

When the splined shaft 30 is pulled out from the splined bore 28, the diameter of the stop ring 35a is reduced by a plurality of pins inserted from the axially outer end portion of the splined bore 28 into the respective deep grooves 55, to disengage the stop ring 35a from the outside engagement groove 13.

In the example shown in the figure, the width of respective deep grooves 55 is made narrow so that these deep grooves 55 do not affect the engagement state of the splined engagement portion between the splined bore 28 and the splined shaft 30. However, it is also possible to widen the width of respective deep grooves 55 so that the deep grooves span two to three splined grooves.

If the width of respective deep grooves 55 is made wide, as described above, it is possible to form these deep grooves 55 by forging. In such a case, the number of gear teeth to be spline-engaged is reduced in the portion where these deep grooves 55 are formed, however these deep grooves 55 need be formed only in an axial part of the splined engagement portion. Therefore, the number of gear teeth to be spline-engaged is not reduced over the full length of the splined engagement portion. Hence, reduction of the torque which can be transmitted by the splined engagement portion is minimal, resulting in no practical problem.

In the case of this example, a cap 34a for closing the opening at the axially outer end of the space where the splined shaft 30 and the splined bore 28 exist is fixed to a portion facing close to the tip end face of the splined shaft 30 in the axial middle part of the main body of hub 6a. In the case of this example, this cap 34a is generally made of a synthetic resin, and is formed in a bottomed cylindrical shape, having a cylindrical portion 56 and a disk portion 57 for closing the opening at the axially outer end of the cylindrical portion 56.

When this cap 34a is fitted to the middle part of the hub 6a, the cylindrical portion 56 is internally secured to the middle part of the hub 6a, with an engagement protrusion 58 formed around the whole periphery on the outer peripheral face of the axially inner end portion of the cylindrical portion 56 engaged in an engagement groove 59 formed around the whole periphery on the inner peripheral face of the middle part of the hub 6a.

Then, an outwardly flanged collar 60 is formed on the outer peripheral face on the axially outer end side of the cylindrical portion 56 and abuts against a stepped face 61 formed on the inner peripheral face on the axially outer end side of the hub 6a.

Moreover, an O-ring 63 is fitted into a groove 62 formed around the whole periphery of the cylindrical portion 56, to seal a space between the outer peripheral face of the cylindrical portion 56 and the inner peripheral face of the middle part of the hub 6a.

In the case of this example, as described above, by fixing the cap 34a to a portion facing close to the tip end face of the splined shaft 30, in the middle part of the hub 6a, the volume of the space between the cap 34a and the seal ring 37 where the splined shaft 30 and the splined bore 28 exist can be reduced. Into this space, grease is filled to prevent rust and wear of the splined shaft 30 and the splined bore 28 and to prevent the occurrence of abnormal sounds resulting from the rust and wear.

Moreover, by reducing the volume of the space as in this example, the amount of grease to be filled therein can be reduced to reduce the cost.

In addition, the cap 34a attached as described above can be easily removed from the middle part of the hub 6a by pulling on the inside face of the collar 60 with the tip portion of a special tool inserted between the stepped face 61 and the axially inside face of the collar 60.

Therefore, a chamfered portion 64 is formed on the outer peripheral rim portion on the axially inside face of the collar 60 to facilitate insertion of the tip portion of the special tool between the stepped face 61 and the axially inside face of the collar 60.

Other construction and operation are substantially the same as for the case of the above described first example. Incidentally, the coller 60 comprises larger and smaller diameter portions in a two-step shape, so that the tip end of the special tool can be securely inserted into the face on the axially inner side of the coller 60. Then, the axially inside face of the smaller diameter portion is abutted to the stepped face 61 to provide a gap between the axially inside face of the larger diameter portion and the stepped face 61.

Figure 6:
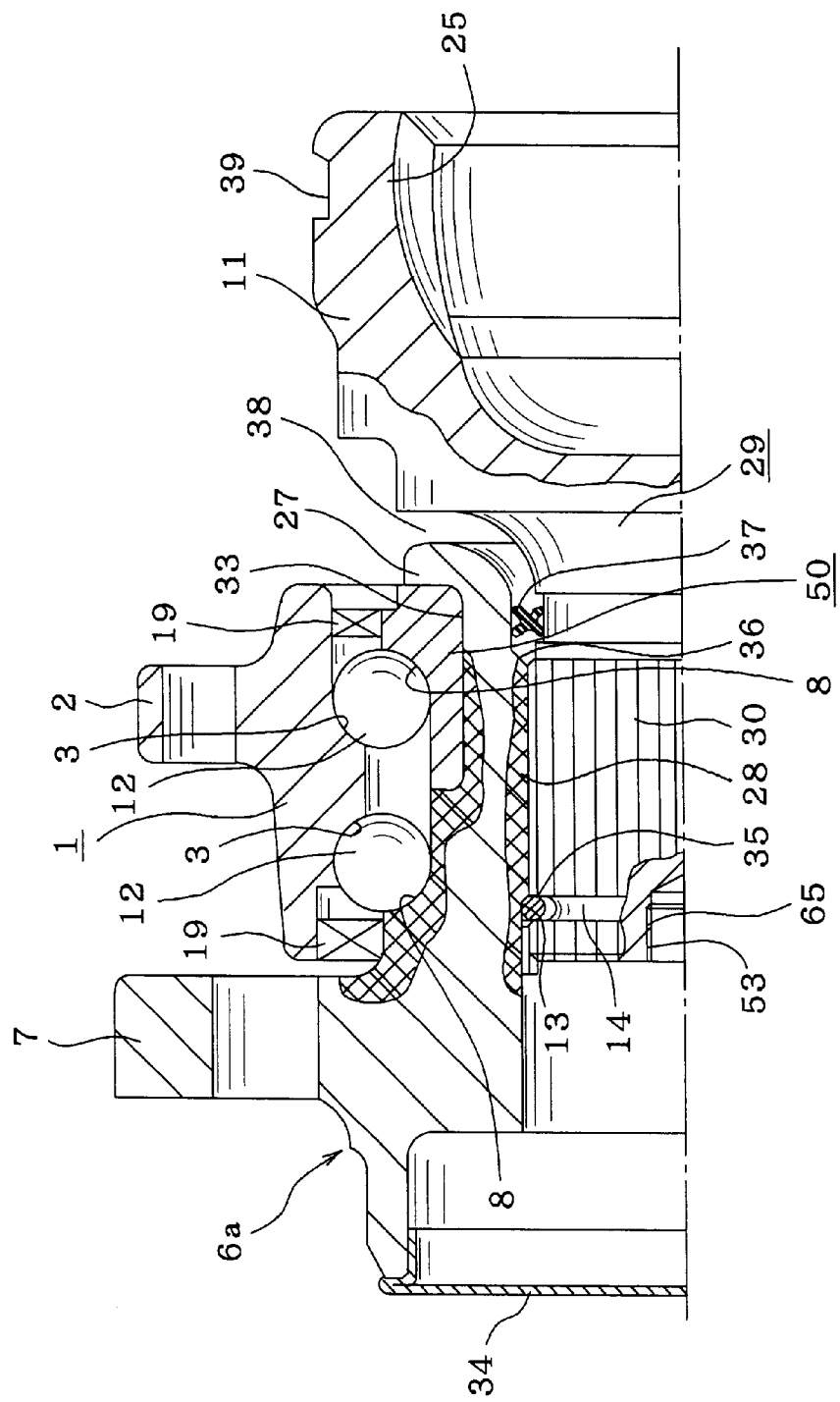
FIG. 6 is a cross sectional view of one half of an example of the embodiments of the axle unit for driving a vehicle wheel according to the present invention.

FIG. 6 shows a third example of the embodiment of the present invention. In the case of this example, a screw groove 65 which is an engagement groove, is formed on the inner peripheral face of a bottomed hole 53 provided in the central portion of the tip end face of the splined shaft 30. When the splined shaft 30 is inserted in the splined bore 28, an external thread formed at the tip portion of a pulling member is screwed in the screw groove 65.

In the case of this example, the hub 6a is made of a carbon steel material, for example, a carbon steel for mechanical structures such as S53C~S55C (JIS G4051) or SAE 1060~SAE 1070.

Moreover, quenched hardened layers are formed by induction hardening or the like on portions on the peripheral face of the hub 6a shown by the oblique hatching in FIG. 6 to improve the durability of these portions. The portions are continuous portions on the outer peripheral face in the middle part of the hub 6a from the base end portion of the axially inside face of the mount flange 7 to the axially inner half of a stepped portion 33 in which the inner ring 50 is externally fitted, and on a portion on the inner peripheral face of the hub 6a where the splined bore 28 is formed.

Particularly, in the case of this example, since the quenched hardened layer is formed on a part of the splined bore 28, fretting wear due to the slight vibration in the axial direction of the splined bore 28 can be prevented, even if some chatter is produced in the axial direction in the engagement portion of the splined shaft 30 and the splined bore 28, due to play existing in the engagement portion of the inside and outside engagement grooves 14 and 13 and the stop ring 35. Hence the durability of the splined engagement portion including the splined bore 28 can be sufficiently ensured.

Other construction and operation are substantially the same as for the case of the above described first and second examples.

Figure 7:
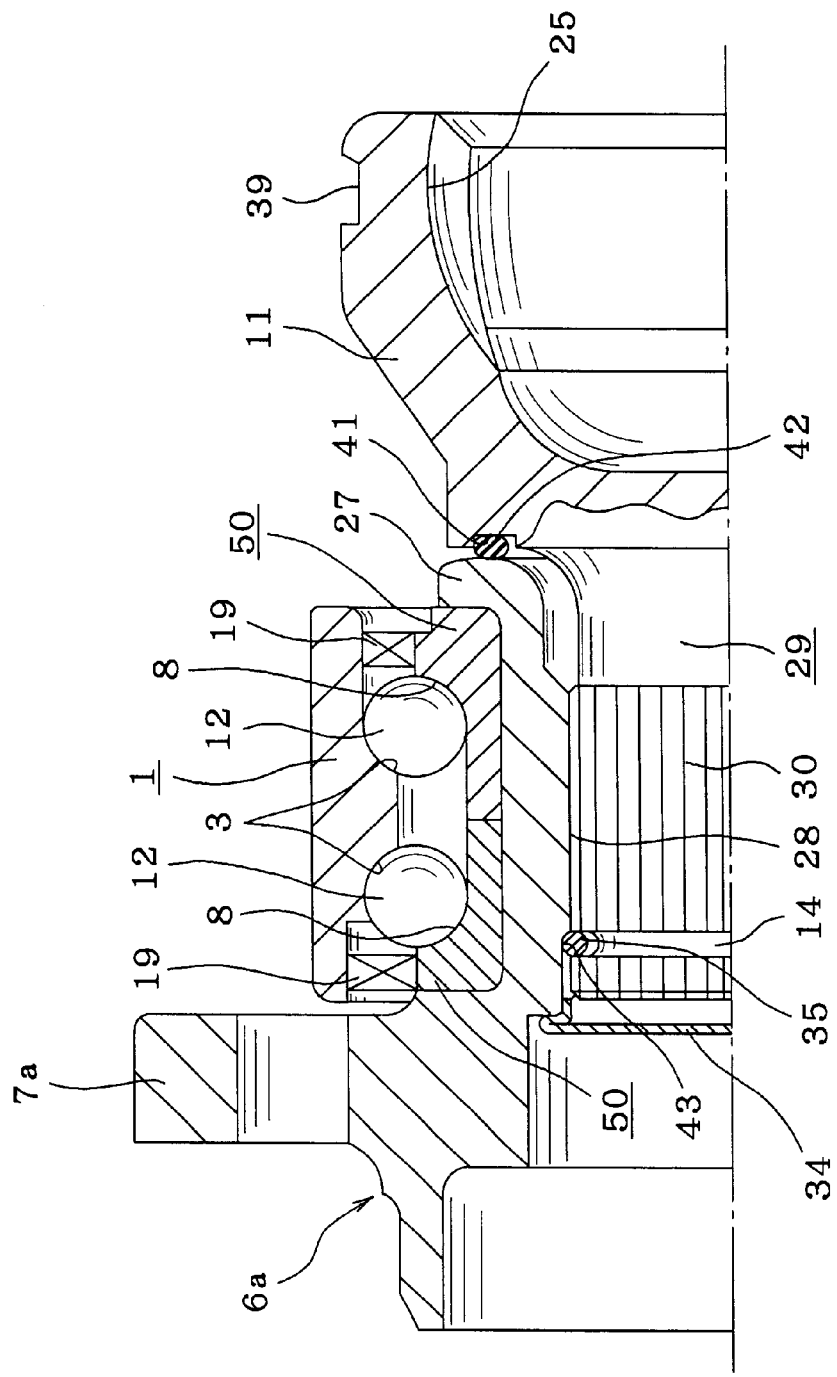
FIG. 7 is a cross sectional view of one half of an example of the embodiments of the axle unit for driving a vehicle wheel according to the present invention.
Figure 39:
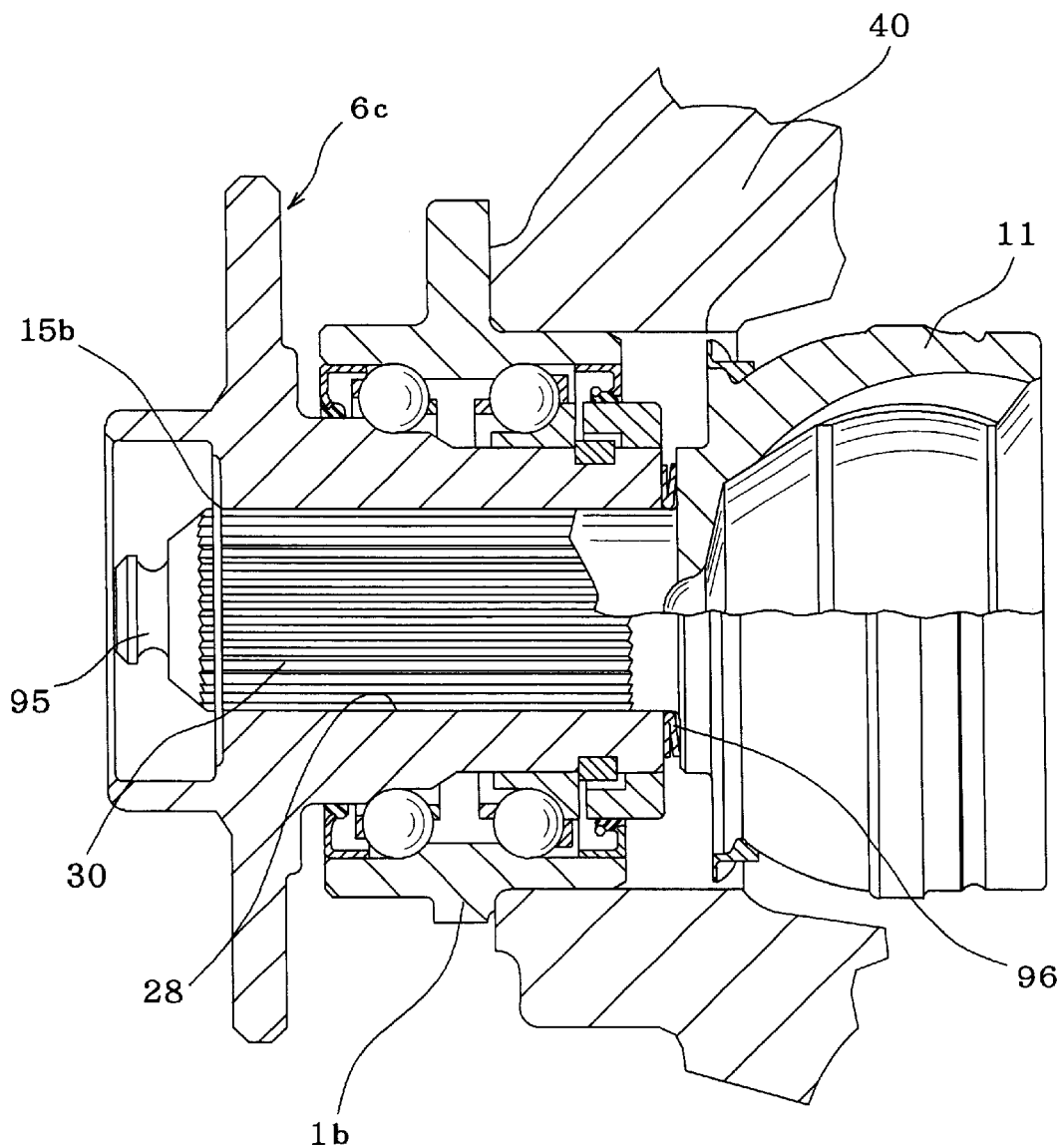
FIG. 39 is a cross sectional partial view of one example of the prior art structures.
Figure 40:
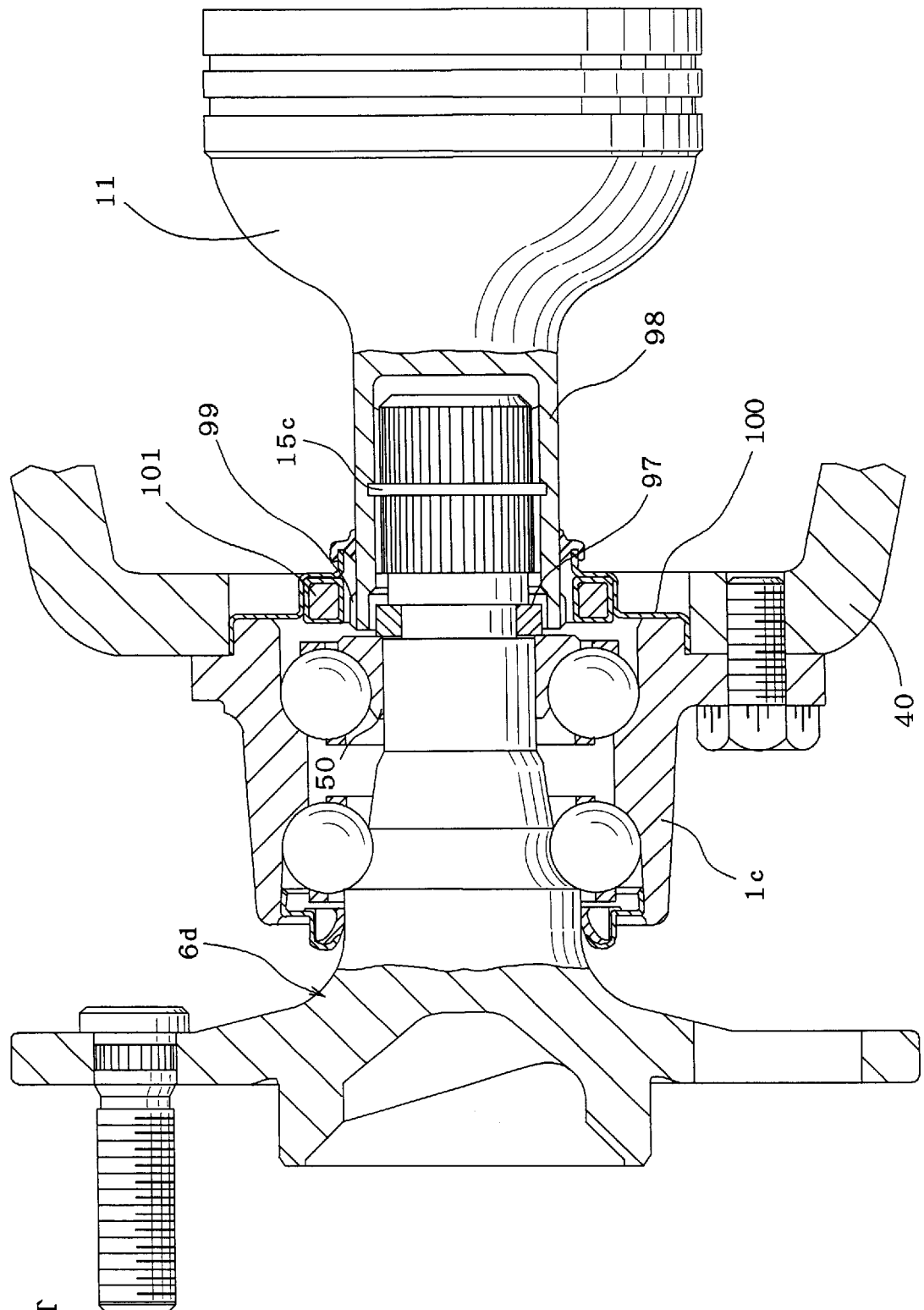
FIG. 40 is a cross sectional partial view of one example of the prior art structures.

FIG. 7 shows a fourth example of the embodiment of the present invention. In the case of this example, the outer peripheral face of the outer ring 1 is formed in a simple cylindrical shape, and at the time of fitting the outer ring 1 into the suspension unit, it is internally secured in an attachment bore provided in the knuckle 40 (see FIGS. 37, 39 and 40). Moreover, a pair of inner rings 50 provided with inner ring raceways 8 on the respective outer peripheral faces are externally fitted to the main body of hub 6a and fixed by the crimped portion 27, so that two rows of inner ring raceways 8 are provided on the outer peripheral face of the hub 6a.

The end face of the crimped portion 27 is made to abut against or positioned close to the axially outer end face of the housing 11 of the drive shaft member 29. An O-ring 42 is held in a retaining groove 41 formed on the axially outer end face of the housing 11 and made to resiliently abut against the end face of the crimped portion 27 to seal a space between the crimped portion 27 and the housing 11.

In the case of this example, by abutting or positioning the end face of the crimped portion 27 against or close to the axially outer end face of the housing 11 of the drive shaft member 29, the splined shaft 30 is prevented from being displaced relative to the splined bore 28 further towards the left than as shown in FIG. 7. Together with this, in the case of this example, the outside engagement portion provided on the inner peripheral face of the hub 6a is a stepped portion 43 formed on the axially outer end edge portion of the splined bore 28.

At the time of assembly of the drive wheel axle unit, this stepped portion 43 is engaged with a stop ring 35 which is engaged in an inside engagement groove 14 formed on the outer peripheral face of the splined shaft 30, to thereby prevent the splined shaft 30 from coming out from the splined bore 28.

In the case of this example, the construction is such that the O-ring 42 is subjected to preload with the drive shaft member 29 fitted to the hub 6a. Hence, chatter in the axial direction between the splined shaft 30 and the splined bore 28 can be prevented, thus preventing fretting wear due to slight vibration in the axial direction.

Incidentally, also in the present structure, as described in the first example of the embodiments, the modules of longitudinal elasticity of the seal material used is 200 [MPa] or less, desirably between 5 [MPa] and 60 [MPa], so that the seal member tightly comforts with the micro shape of this mating member in contact with it to obtain good seal performance. In addition, if the inner diameter of the O-ring 42 is made smaller in size than the inner diameter of the retaining groove 41, so that the O-ring 42 is fitted onto the inner diameter surface of the retaining groove 41, the seal would not drop, the seal mount position would not move, and any such troubles would not occur during assembling.

When the driving shaf member slides in the axial direction during operation, the O-ring is deformed to always receive variable strain, and thus the use condition of O-ring is very severe. The variation amount of strain is determined by the maximum sliding resistance (several tens [kgf]) in the axial direction of th tripod joit mounted on the side of reduction gear of the driving shaft, the strain in the O-ring when receiving the load, and the deviation in size of the parts required for manufacturing. In order to make the strain in the O-ring small to improve its durability, it is desirable to use a tripod joint with small sliding resistance such that the axial sliding resistance at the normal joint angle from 5 degrees to 15 degrees is 20 [kgf] or less. When the compression strain can not be 30% or less, desirably 20 or less in spite that the strain in the O-ring is minimized as small as possible, the retaining groove 41 formed on the outer end face of the housing 11 is made to have a deeper depth, so that the outer end face comes directly into contact with the crimped portion 27 of the hub when the compression strain of the O-ring exeeds 30% to avoid any further strain in the O-ring. Thus, by limiting the movement in either direction of the driving shaft member at the outer end face and at the stop ring 35 with a metal member shaped to have rigidity in the axial direction, the strain of the seal member is positively limited to a value or less. As a result, not only the improvement in durability of the seal member is obtained, but also the improvement in durability of the spline is obtained due to the reduction in vibration width of the sliding movement in the spline.

Incidentally, in the present structure where a preload is applied to the O-ring, since the O-ring is made of a soft material with a small modules of longitudinal elasticity, the splined engagement portion between the hub and the driving shaft member is constructed to allow relative sliding movements in the axial direction. Accordingly, the splined engagement portion must be lubricated because of the same reason as described in the first example of the embodiments.

In the case of this example, a cap 34 is fitted and fixed to the middle part of the main body of hub 6a to face close to the end face of the splined shaft 30, as in the case of the abovementioned second example, to thereby close off the middle part. The cap 34 in this example however, is made of a metal plate, as with the first example and the third example described above. In the case of this example thus constituted, the volume of the space between the cap 34 and the O-ring 42 where the splined shaft 30 and the splined bore 28 exist can be reduced to decrease the amount of grease to be filled in this space, and hence the cost can be reduced.

Other construction and operation are substantially the same as for the case of the above described first to third examples.

Figure 8:
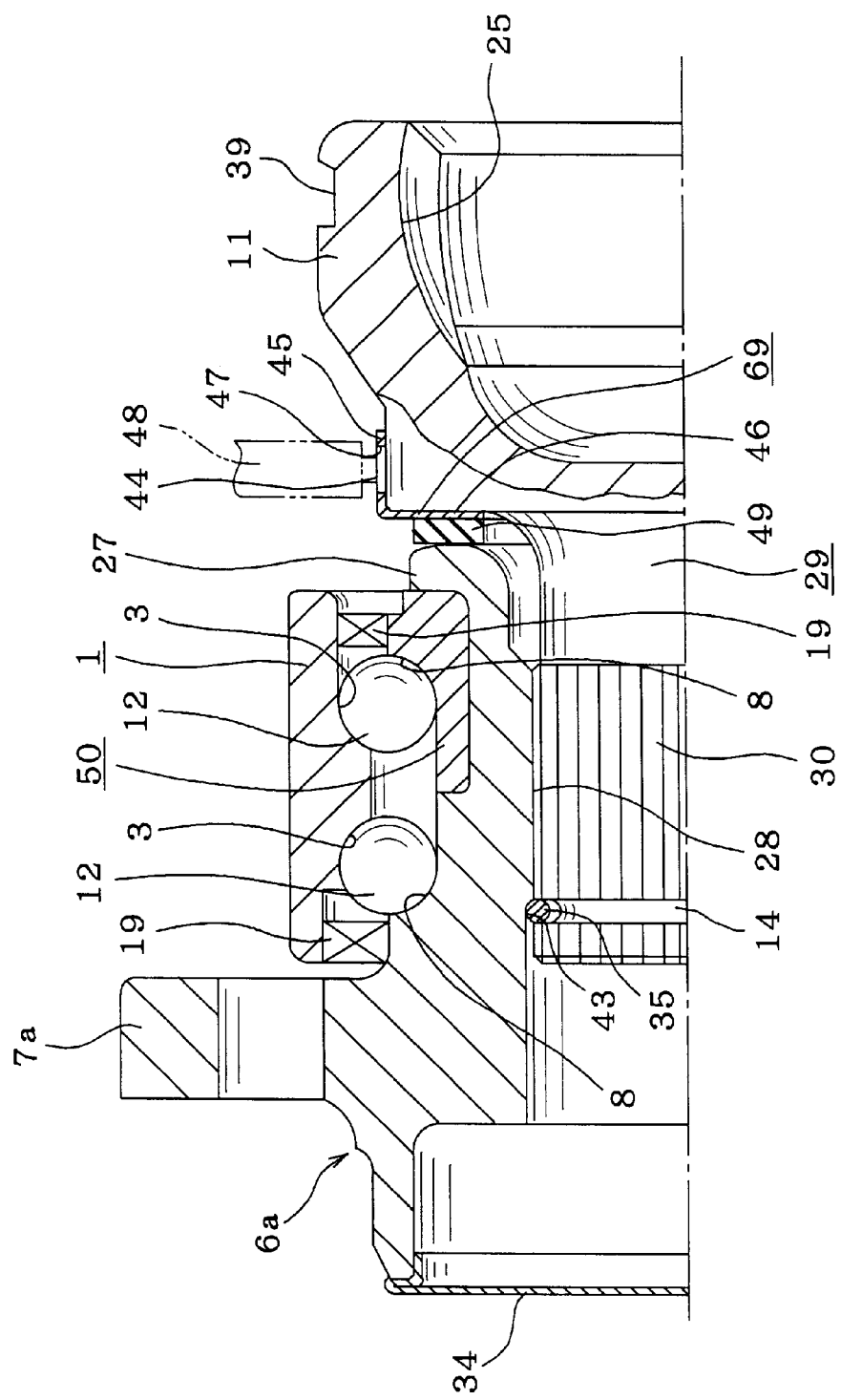
FIG. 8 is a cross sectional view of one half of an example of the embodiments of the axle unit for driving a vehicle wheel according to the present invention.

FIG. 8 shows a fifth example of the embodiment of the present invention. In the case of this example, a metal backing member 69 with an encoder 44 is externally secured to the middle part of the drive shaft member 29, at the axially outer end of the housing 11, to make it possible to freely detect the rotation speed of the drive shaft member 29.

This metal backing member 69 is formed in an overall annular shape with an L-shape in cross-section, having a cylindrical portion 45 and a ring-shaped portion 46, by bending a magnetic metal plate having corrosion resistance, for example a stainless steel plate such as SUS430. Such a metal backing member 69 is secured to the drive shaft member 29 by externally fitting the cylindrical portion 45 to the axially outer end portion of the housing 11 by an interference fit. The ring-shaped portion 46 is made to abut against the axially outer end face of the housing 11.

Moreover, in the cylindrical portion 45, there are formed a plurality of through holes 47 of slit shape elongated in the axial direction (the right and left direction in FIG. 8), at equal intervals in the circumferential direction. Hence, the magnetic property of the outer peripheral face of the cylindrical portion 45 changes alternately at equal intervals in the circumferential direction. That is to say, in the case of this example, the outer peripheral face of the cylindrical portion 45 functions as the encoder 44.

A detection section of a sensor 48 supported on a fixed portion such as the suspension unit or the like, is made to face close to the encoder 44, that is the outer peripheral face of the cylindrical portion 45, when fitted to the vehicle, to freely detect the rotation speed of the drive shaft member 29 which rotates synchronously with the wheel.

An annular resilient plate (resilient material) 49 is attached to the axially outside face of the ring-shaped portion 46 by bonding or baking and then clamped together with the ring-shaped portion 46, between the axially outer end face of the housing 11 and the end face of the crimped portion 27 provided in the inner axially end portion of the hub 6a, under resilient compression. Therefore, in the case of this example, the splined shaft 30 is prevented from being displaced relative to the splined bore 28 further towards the left than as shown in FIG. 8, by means of the ring-shaped portion 46 and the resilient plate 49. Moreover, the resilient plate 49 seals the space between the axially outer end face of the housing 11 and the end face of the crimped portion 27.

Therefore, in the case of this example, not only are the seal ring 37 described in the first to third examples and the O-ring 42 in the above described fourth example are not required, but also it is not necessary to subject each portion to a predetermined machining for attaching the seal ring 37 and O-ring 42 thereto.

The resilient plate 49 is so formed that it does not protrude onto the outer peripheral face of the cylindrical portion 45, so that the encoder 44 disposed on the outer peripheral face of the cylindrical portion 45 and the detection section of the sensor 48 can be positioned sufficiently close to each other.

Other construction and operation are substantially the same as for the case of the above described first to fourth examples.

Incidentally, the inner diameter of the resilient plate 49 can be made smaller than the inner diameter of the circular ring portion 46 of the metal ring 69, so that the resilient plate 49 has an radially inner portion which projects radially inward than the circular ring portion 46 (loward in FIG. 8). Then, the axially inside surface (the right side surface in FIG. 8) of the radially inward portion of the resilient plate 49 is made flush with the axially inside surface of the metal ring 69, so that the projecting portion of the resilient plate 49 comes directly in contact with the axially outer end surface of the housing portion 11.

In this structure, the resilient plate 49 is held at the portion projecting radially inward than the circular ring portion 46 between the axially inner end portion of the hub 6*a* and the axially outer end portion of the housing portion 11, such that it is directly compressed. Accordingly, foreign matter such as rain water can be securely prevented at the contact portion between the axially outer end surface of the housing portion 11 and the resilient plate 49 from entering the spline engagement portion through the fitting portion between the cylindrical portion 45 of the metal ring 69 and the housing 11.

In addition, the axial deflection (resilient compression amount) of the resilient plate 49 is designed for good sealing performance taking into consideration the size tolerance etc. of the parts required for production. For example, in the case of the axle unit for driving the automobile wheel, the minimum deflection is about 0.2 mm to about 0.6 mm, and the maximum deflection is about 1.3 mm to about 1.7 mm.

In operation, the thrust load based on the axial sliding resistance of the tripod joint used on the inboard side (the widthwise central side of the vehicle) is applied to the resilient plate 49. Accordingly, the deflection amount of the resilient plate 49 at that time must be taken into consideration. In order to obtain enough durability for long term use, the compression deformation of the resilient plate must be designed to be kept 30% or less (desirably 20% or less) even under the expected maximum deflection amount. For such design, in the case of the axle unit for driving the automobile wheel, the thickness of the resilient plate 49 provided between the axially inner end portion of the hub 6*a* and the metal ring 69 must be about 4 mm to about 6 mm. Accordingly, the design with margin such as making the thickness about 6 mm to about 9 mm is desirable if there is no space problem.

If the contact condition of the resilient plate 49 with the mating surface, subjected to large contact pressure, moves in sliding contact, the surface of the resilient plate 49 experiences premature fatigue. Accordingly, it is desirable on design that even if the torque applied to the constant velocity joint is opposite in direction, in other words even if it moves from the driving state to the inertia running state where engine braking occurs in the non-driven state, it is absorbed by the shear deflection of rubber of the resilient plate 49 and no sliding occurs in the circumferential direction at the contact portion between the resilient plate 49 and the axially inner end of the hub 6*a*. With the thickness (4 to 6 mm, and if space is available, 6 to 9 mm) as mentioned above, that design is possible.

The amount of deflection of the resilient plate 49 always changes during operation of the axle unit for driving the vehicle wheel. In order to obtain the durability of the resilient plate 49 for long term use even under such extremely severe use conditions, the resilient plate 49 is desirable made of a thermoplastic polyether elastomer material such as Hytrel (Dupont) or Arnytel, which is a little more expensive than nitrile rubber.

Figure 9:
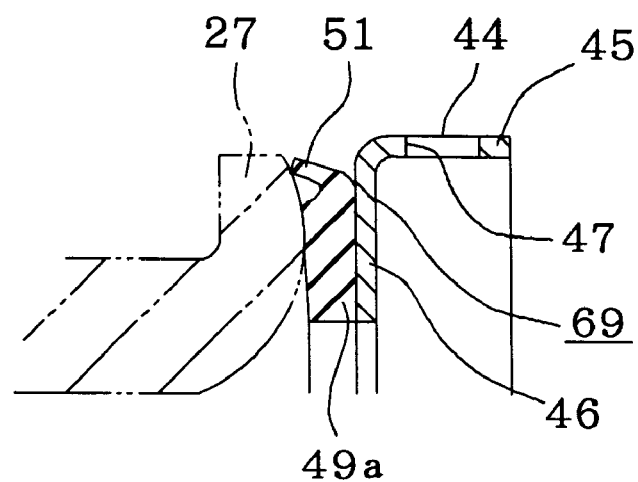
FIG. 9 is a cross sectional view of the encoder and resilient plate in another example of the embodiments of the present invention.

FIG. 9 shows a sixth example of the embodiment of the present invention. In the case of the above described fifth example, the resilient plate 49*a* has a function to inhibit the splined shaft 30 from being displaced relative to the splined bore 28 further towards the left than as shown in FIG. 8, and a function to seal the space between the ring-shaped portion 46 and the crimped portion 27.

With these two functions, to make the function of preventing the displacement satisfactory, it is necessary to increase the rigidity of the resilient plate 49*a*, while to make the sealing function satisfactory, it is necessary to decrease the rigidity of the resilient plate 49*a* to some extent. In the case of this example, in view of these circumstances, a flexible seal lip 51 which is relatively thin and has low rigidity is disposed on the outer peripheral edge portion of the resilient plate 49*a*.

Furthermore, the tip end edge of the seal lip 51 is made to abut against the end face of the crimped portion 27 around the whole periphery to seal the space between the ring-shaped portion 46 and the crimped portion 27. On the other hand, the main body of the resilient plate 49*a* has a higher rigidity so that it can effectively inhibit the splined shaft 30 from being displaced relative to the splined bore 28 further towards the left than as shown in FIG. 8.

Figure 10:
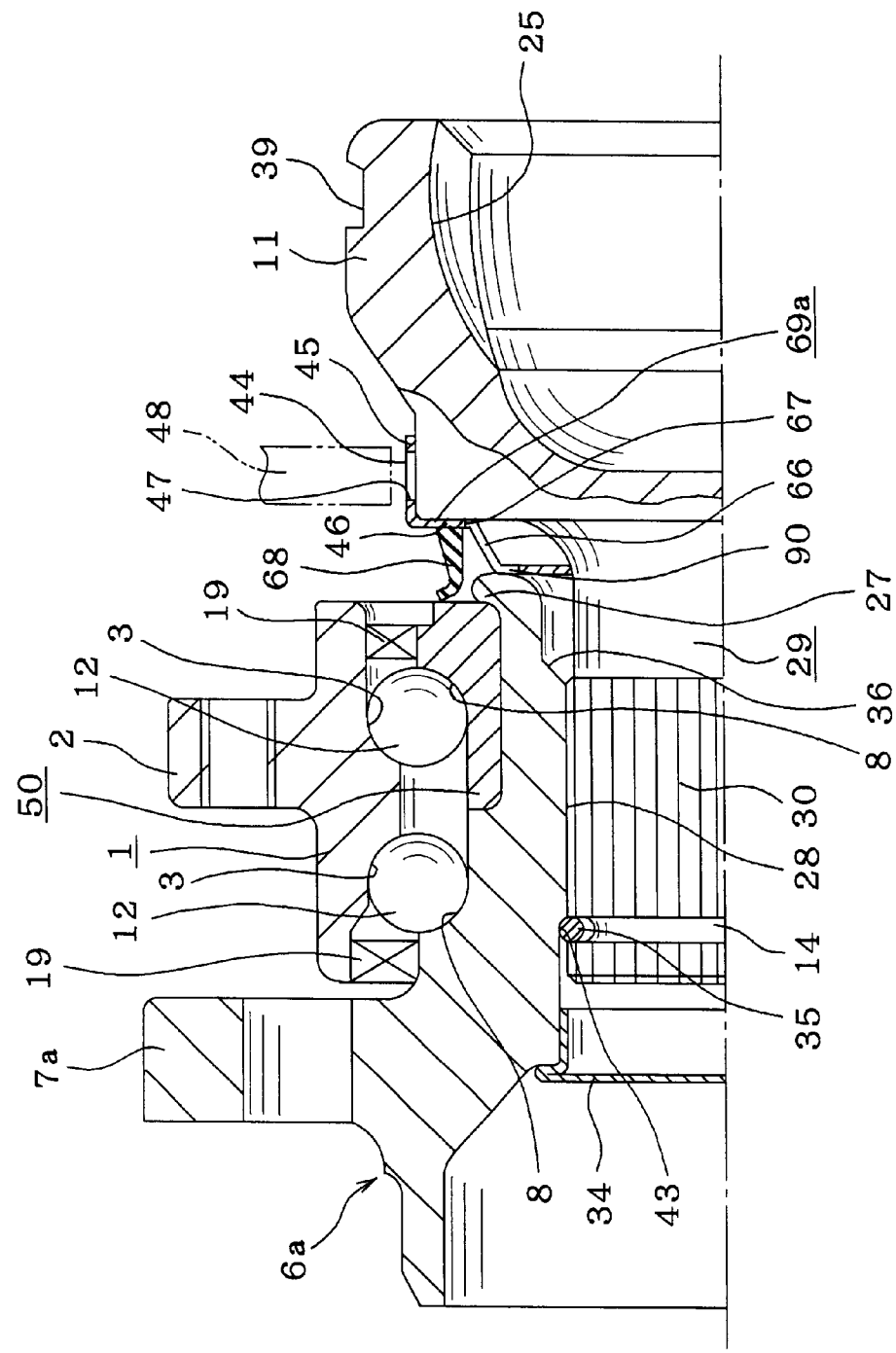
FIG. 10 is a cross sectional view of one half of an example of the embodiments of the axle unit for driving a vehicle wheel according to the present invention.
Figure 11:
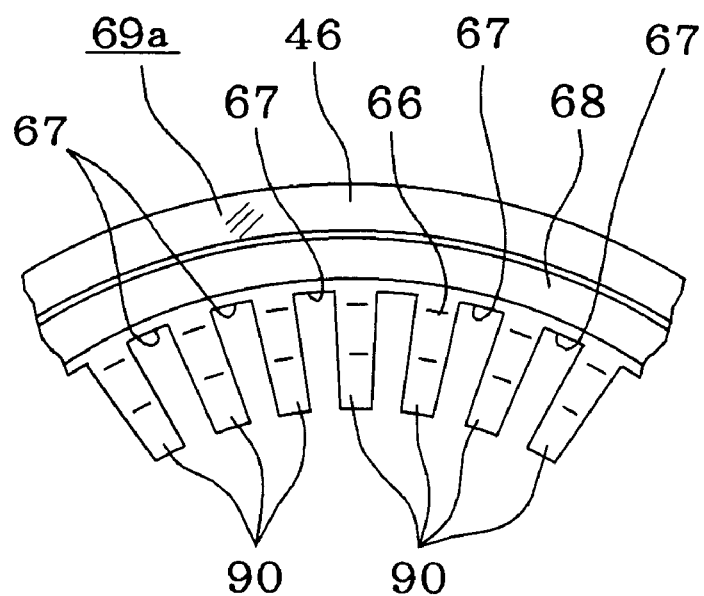
FIG. 11 is a view of part of the backing metal member and seal lips taken from left in FIG. 10.

FIGS. 10 and 11 show a seventh example of the embodiment of the present invention. In the case of this example, a metal backing member 69*a* externally secured to the axially outer end portion of the housing 11 is made by subjecting a plate material made of a spring steel (including a tool steel such as SK5 or the like) to pressing and bending, and then entirely to quench hardening.

In the case of this example, by forming an inclined portion 66 with the inclination increasing axially outward towards the inner diameter side, on a portion of the inner diameter side of a ring-shaped portion 46 of the metal backing member 69*a*, the portion on the inner diameter side of the ring-shaped portion 46 is protruded axially outward.

Moreover, as shown in FIG. 11, a plurality of notches 67 are formed on the inner peripheral rim portion on the inner diameter side of the ring-shaped portion 46 at equal intervals in the circumferential direction, to form a plurality of tongues 90 in the mid portions between these notches 67, thereby enough resilience is imparted to the portion on the inner diameter side of the ring-shaped portion 46 including the inclined portion 66.

The tip portion on the inner diameter side of the ring-shaped portion 46 formed as described above, that is, the tip portion of the tongues 90 is made to abut resiliently against the end face of the crimped portion 27, thereby inhibiting the splined shaft 30 from being displaced relative to the splined bore 28 further towards the left than as shown in FIG. 10.

Hence, chatter in the axial direction between the splined shaft 30 and the splined bore 28 is prevented. In this state, a preload loading equivalent to or greater than an axial sliding resistance (several tens of kgf) of a tripod type constant velocity joint, not-shown, incorporated in a section of the transmission (right side in FIG. 10), not shown, is applied to the tongues 90.

Hence, at the time of driving, even when a load in a direction of thrust (the right and left direction in FIG. 10) is applied to the constant velocity joint, the engagement portion between the splined shaft 30 and the splined bore 28 does not slide axially, thus preventing wear from being caused in the engagement portion.

These tongues 90 are designed so that even when an excess load is applied to the respective tongues 90 at the time of assembly, for example, even when the tongues 90 are clamped between the hub 6a and the drive shaft member 29 and bent until they become flat, the stress generated inside the tongues 90 will not exceed the allowable stress, thus resulting in no damage in the tongues 90. That is to say, since the stress generated inside the tongues 90 increases with the increase of the displacement amount of the tongues 90 when they are bent until they become flat, the dimensions of each portion are decided to keep to a value from 2 to 3 mm the displacement amount of the tongues 90 when bent to become flat.

A seal lip 68 is formed in an overall cylindrical shape from a resilient material such as a rubber like elastomer, and its axially inner end is securely connected by bonding or by baking to the axially outside face of the ring-shaped portion 46. In addition, an axially outer end rim or tip end edge of the seal lip 68 is made to abut resiliently against the axially inner end face of the inner ring 50 around the whole periphery to seal the space between the axially outer end face of the housing 11 and the end face of the crimped portion 27.

In the case of this example, a portion towards the tip of the seal lip 68 is formed in a curved shape to impart a suitable resilience to this portion, so that the position of abutment and the abutment pressure of the axially outer end rim of the seal lip 68 are not changed with respect to the axially inner end face of the inner ring 50, at the time of operating the rolling bearing unit for wheel, even if the splined shaft 30 is displaced relative to the splined bore 28 further towards the left than as shown in FIG. 10 against the resilience of the inner diameter side portion of the ring-shaped portion 46.

Other construction and operation are substantially the same as for the case of the above described fourth and fifth examples shown in FIGS. 7 and 8.

Figure 12:
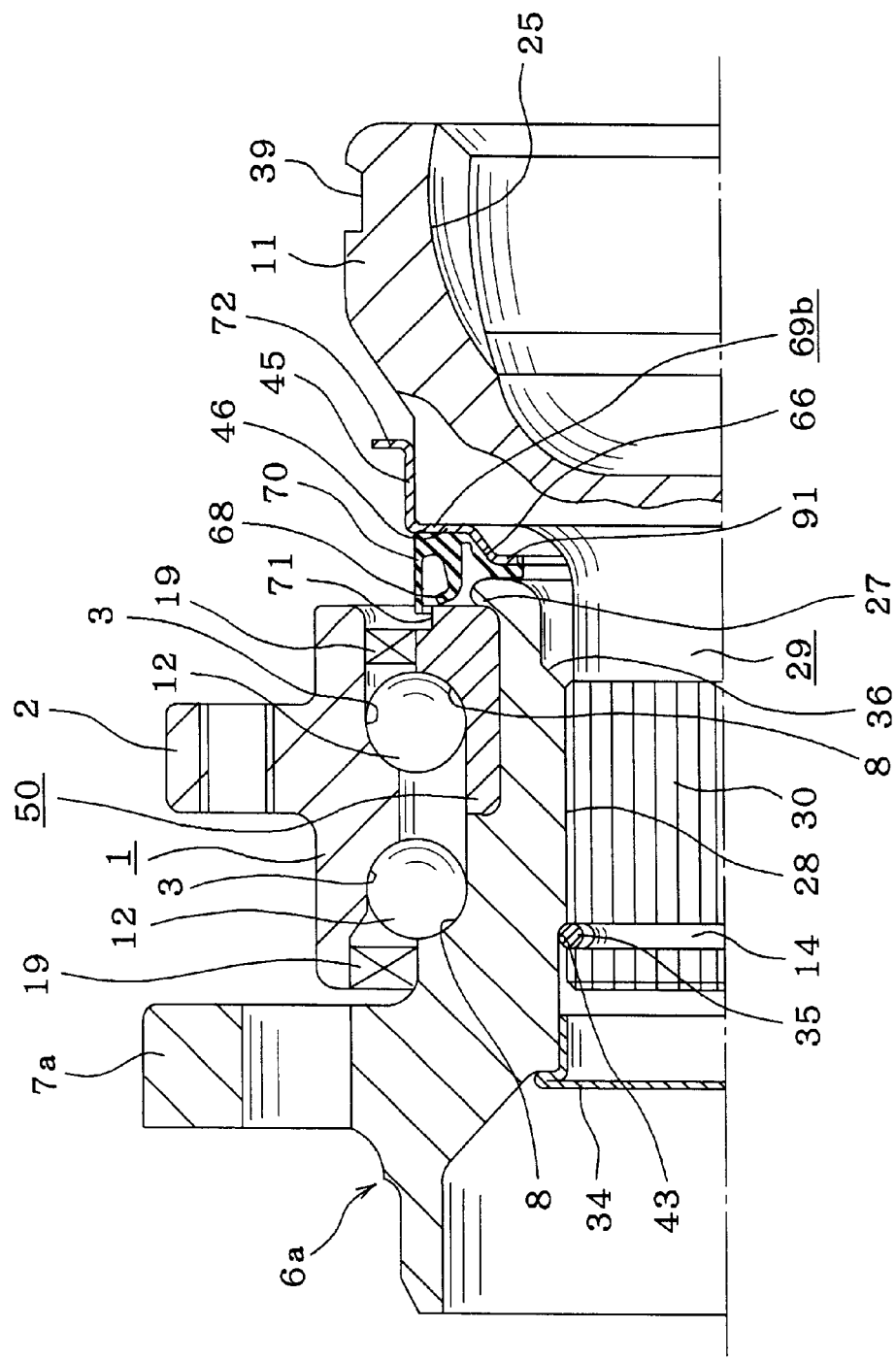
FIG. 12 is a cross sectional view of one half of an example of the embodiments of the axle unit for driving a vehicle wheel according to the present invention.

FIG. 12 shows an eighth example of the embodiment of the present invention. In the case of this example, the through holes (FIG. 10) are not formed in the cylindrical portion 45 of a metal backing member 69b externally secured on the axially outer end portion of the housing 11.

Moreover, in this case, notches 67 (FIGS. 10 and 11) are not formed on the inner peripheral rim on the inner diameter side of the ring-shaped portion 46 of the metal backing member 69b, the inner diameter side portion of the ring-shaped portion 46 being instead a flat spring portion 91 in a form of diaphragm.

Furthermore in this case, a covering portion 70 is formed in a cylindrical shape by a part of a resilient material constituting the seal lip 68 and disposed in the portion on the outer diameter side of the seal lip 68 connected to the axially outside face of the ring-shaped portion 46.

The tip end edge of the covering portion 70 is extended up to the outer diameter side of a reduced diameter stepped portion 71 formed on the inner end portion of the inner ring 50 around the whole periphery, thereby covering the portion sealed by the seal lip 68.

In the case of this example, therefore, foreign matter such as rain water or the like is prevented from directly touching the seal lip 68, thereby making the sealing function of the seal lip 68 satisfactory.

Furthermore, in the case of this example, a part of the resilient material constituting the seal lip 68 is bonded to the axially outside face of the flat spring portion 91 formed on the inner diameter side of the ring-shaped portion 46, so that the axially outside face of the flat spring portion 91 does not abut directly against the end face of the crimped portion 27. The reason for this is to prevent fretting wear from occurring in an abutting portion between the axially outside face of the flat spring portion 91 and the end face of the crimped portion 27.

In the case of this example, an outwardly flanged collar 72 is formed on the axially inner end rim of the cylindrical portion 45 of the metal backing member 69b. When the metal backing member 69b is pressed onto the axially outer end portion of the housing 11, the tip portion of a press jig is made to abut against the outside face of the collar 72, without crushing the seal lip 68.

Other construction and operation are substantially the same as for the case of the above described seventh example.

Figure 13:
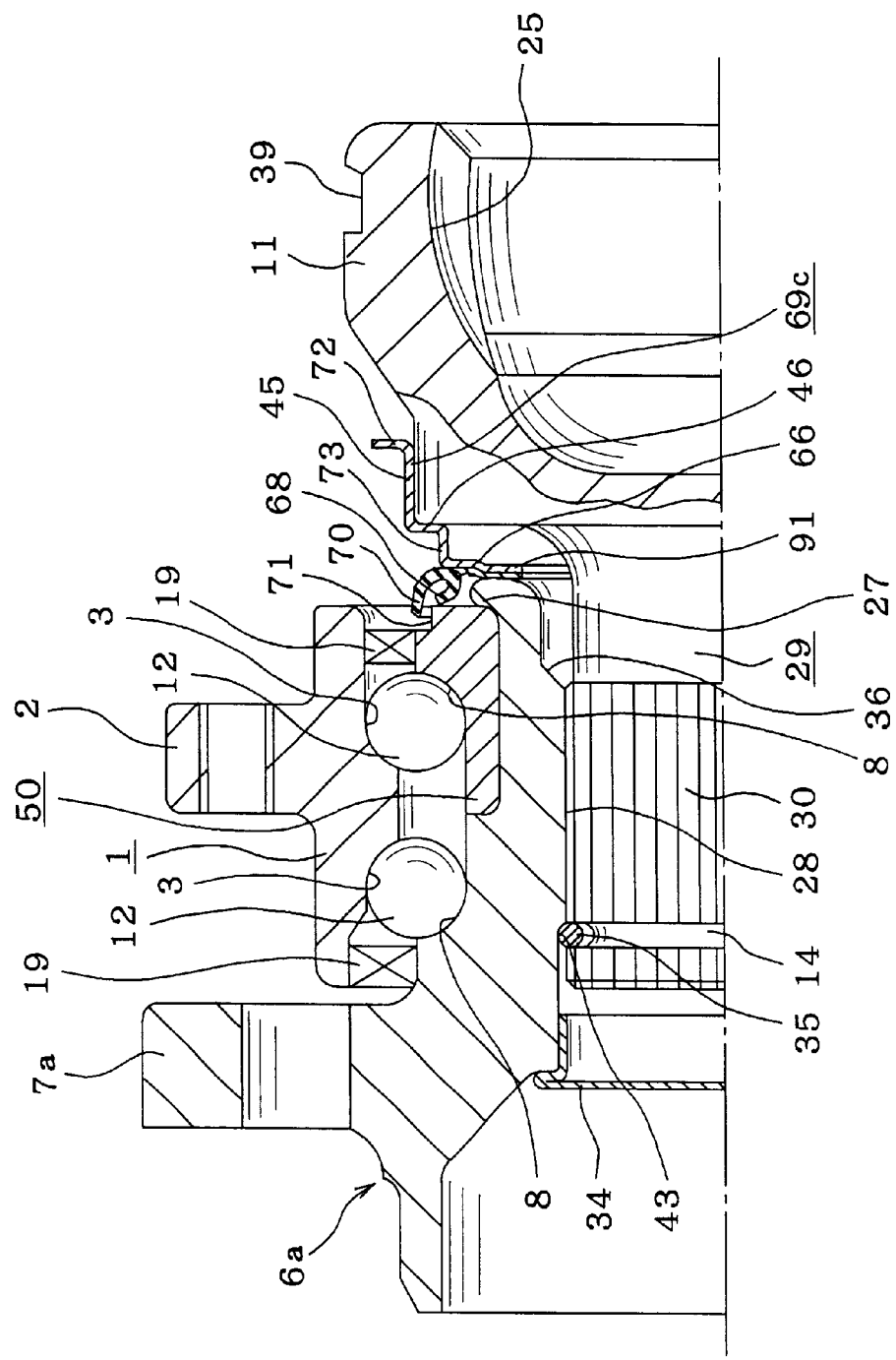
FIG. 13 is a cross sectional view of one half of an example of the embodiments of the axle unit for driving a vehicle wheel according to the present invention.

FIG. 13 shows a ninth example of the embodiment of the present invention. In the case of this example, by forming a stepped portion 73 on an inner peripheral rim portion of the ring-shaped portion 46 of a metal backing member 69c supported on the axially outer end of the housing 11, then by a part of the axially outside face on the inner diameter side portion of the ring-shaped portion 46, a portion for connecting the seal lip 68 to the bottom edge of the covering portion 70, is urged close to the axially inner end face of the inner ring 50. The amount of the resilient material for the seal lip 68 and the covering portion 70 is thus reduced by the amount by which the part of the axially outside face of the ring-shaped portion 46 is made closer to the axially inner end face of the inner ring 50, thereby reducing the cost of the seal lip 68 and the covering portion 70.

Other construction and operation are substantially the same as for the case of the above described eighth example.

Figure 14:
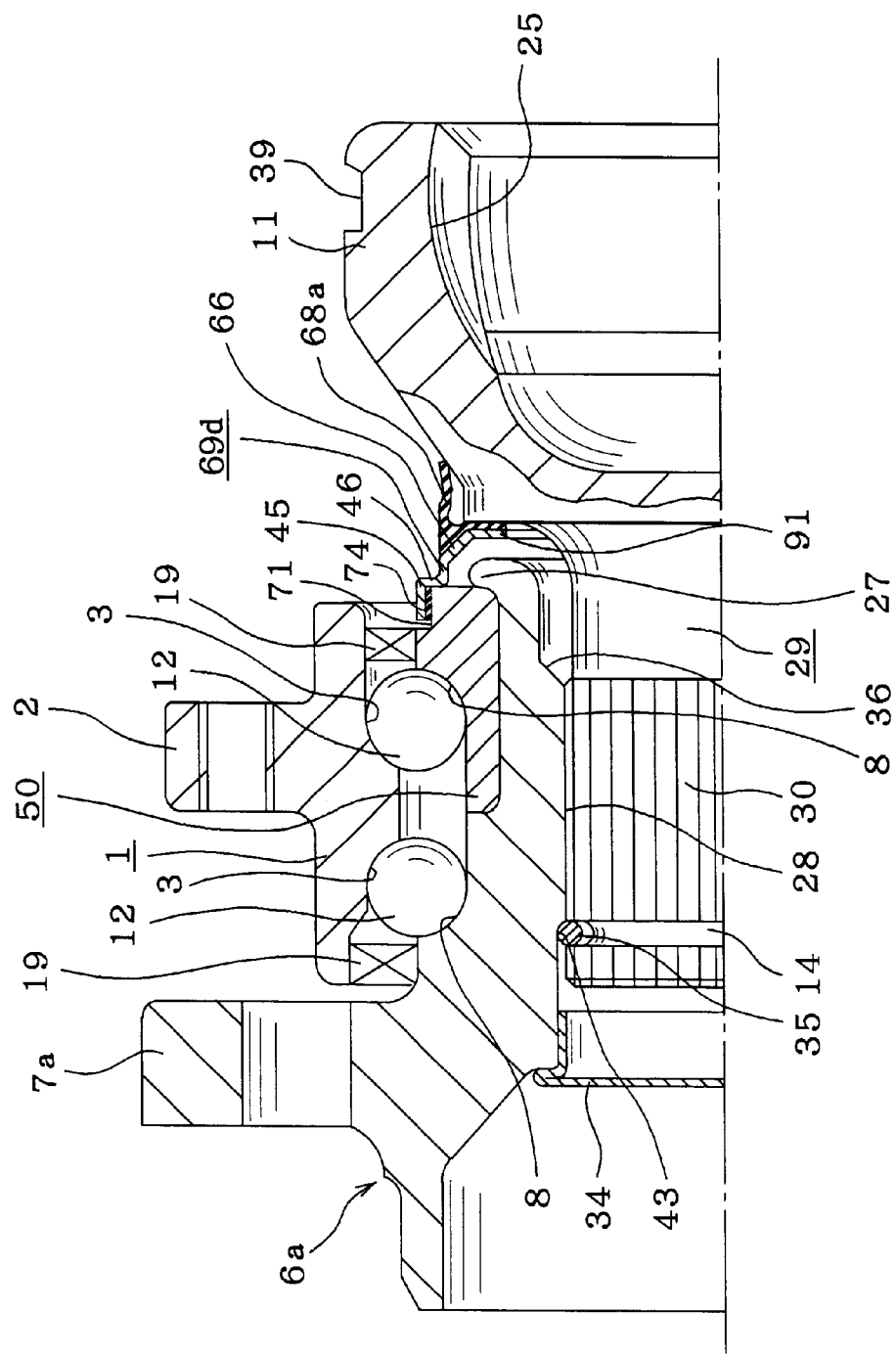
FIG. 14 is a cross sectional view of one half of an example of the embodiments of the axle unit for driving a vehicle wheel according to the present invention.

FIG. 14 shows a tenth example of the embodiment of the present invention. In the case of this example, a cylindrical portion 45 of a metal backing member 69d for supporting a seal lip 68a is externally secured to the reduced diameter stepped portion 71 formed on the axially inner end portion of the inner ring 50.

In addition, an axially inside face of a flat spring portion 91 of the metal backing member 69d is made to abut resiliently against the axially outer end face of the housing 11 via a part of the resilient material constituting the seal lip 68a. The tip edge of the seal lip 68a is also made to abut against a conical inclined face on the axially outer end side in the outer peripheral face of the housing 11 around the whole periphery.

In the case of this example, the size of diameter of the tip end edge of the seal lip 68a in a free state is made slightly larger than that of the outer end face of the housing 11. The reason for this is to prevent the seal lip 68a from being turned over due to bumping of the tip edge of the seal lip 68a against the outer end face of the housing 11, when the splined shaft 30 is inserted into the splined bore 28.

The reduced diameter stepped portion 71 formed on the axially inner end portion of the inner ring 50, being the portion where the cylindrical portion 45 of the metal backing member 69d is externally secured, may be deformed slightly when the axially inner end face of the inner ring 50 is attached to the axially inner end portion of the hub 6a by crimping.

In the case of this example, therefore, a resilient material 74 such as rubber is bonded around the whole periphery on the inner peripheral face of the cylindrical portion 45 to make the fit strength of the cylindrical portion 45 with respect to the reduced diameter stepped portion 71 sufficient and to ensure the sealing performance in the fitted portion, even if the reduced diameter stepped portion 71 is deformed to change the diameter or the like of the reduced diameter stepped portion 71.

Other construction and operation are substantially the same as for the case of the above described ninth example.

Figure 15:
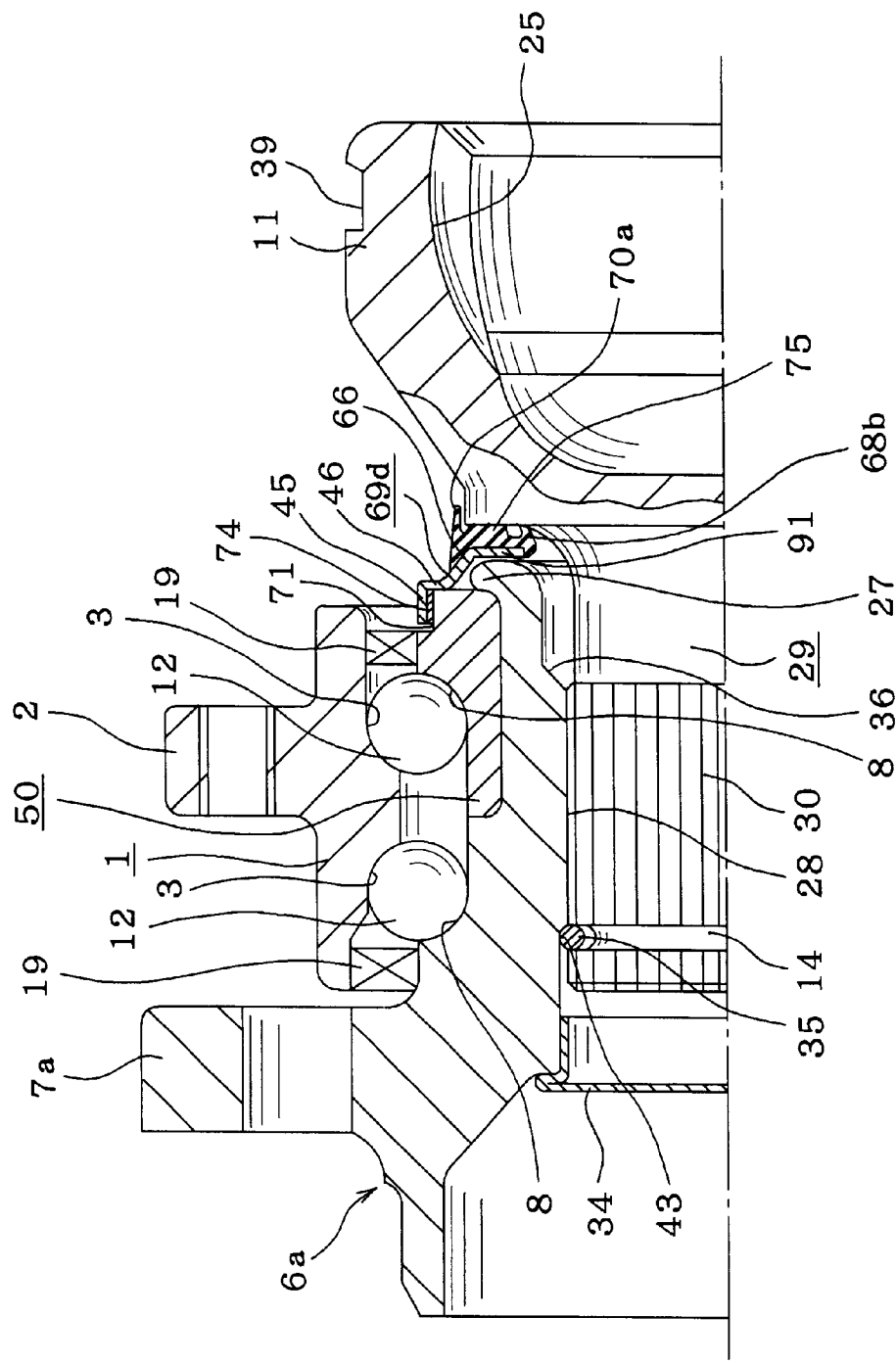
FIG. 15 is a cross sectional view of one half of an example of the embodiments of the axle unit for driving a vehicle wheel according to the present invention.

FIG. 15 shows an eleventh example of the embodiment of the present invention. In the case of this example, the base end edge of a seal lip 68b is bonded to the inner peripheral rim portion of a flat spring portion 91 which constitutes a metal backing member 69d. Moreover, the tip edge of the seal lip 68b is made to abut resiliently against a curved face existing in a connecting portion between the outer peripheral face of the splined shaft 30 and the axially outer end face of the housing 11.

Furthermore, the base edge of a covering portion 70a is connected to the axially inside face of an inclined portion 66 disposed on the inner diameter side portion of the ring-shaped portion 46, and the tip end edge of the covering portion 70a is extended towards the outer diameter side of the axially outer end portion of the housing 11, thereby covering the portion sealed by the seal lip 68b around the whole periphery.

In addition, in the case of this example, the thickness of the resilient material which exists between the seal lip 68b and the covering portion 70a is made large, and the axially inside face of the resilient material abuts against the axially outer end face of the housing 11, the portion where the thickness is made large being designated as a resilient plate portion 75. In this case, by providing such a resilient plate portion 75, the function to inhibit the splined shaft 30 from being displaced relative to the splined bore 28 further towards the left than as shown in FIG. 15 is made satisfactory.

Other construction and operation are substantially the same as for the case of the above described tenth example.

Figure 16:
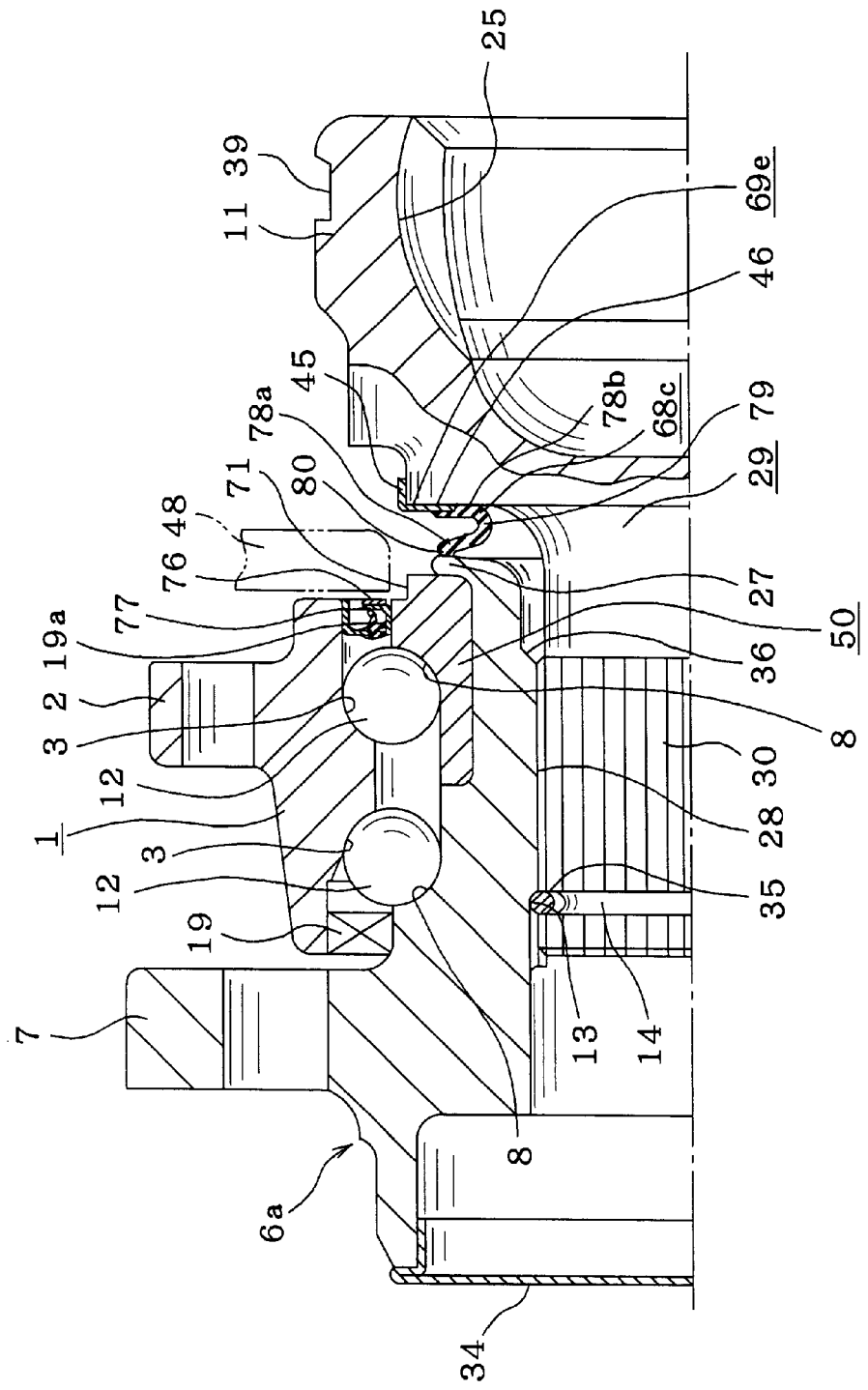
FIG. 16 is a cross sectional view of one half of an example of the embodiments of the axle unit for driving a vehicle wheel according to the present invention.

FIG. 16 shows a twelfth example of the embodiment of the present invention. In the case of this example, an encoder 76 constitutes a rotation speed detection unit mating with the sensor 48 and is supported and secured on the axially inside face of a seal ring 19a for closing an opening of the axial inner end of a space in which is disposed a plurality of rolling members 12.

That is to say, in the case of this example, a combined seal ring is adopted as the seal ring 19a, with the encoder 76 bonded and secured to the axially inside face of a slinger 77 of the combined seal ring. The combined seal ring is externally secured to the axially inner end portion of the inner ring 50. The encoder 76 is formed in an overall ring shape from a permanent magnet such as a rubber magnet in which ferrite powder is incorporated, and magnetized in the axial direction (in the right and left direction in FIG. 16). The magnetized direction is changed alternately in the circumferential direction at equal intervals.

Therefore, on the axially inside face of the encoder 76, south and north poles are arranged alternately at equal intervals. Also in the case of this example, the detection section of the sensor 48 supported on a fixed portion, such as the suspension unit or the like is made to face close to the axially inside face of the encoder 76 when fitted to the vehicle, to freely detect the rotation speed of the drive shaft member 29 which rotates synchronously with the wheel.

In the case of this example, a seal lip 68c connected to a metal backing member 69e externally secured to the axially outer end portion of the housing 11, is formed in an overall annular shape with an approximate U-shape cross-section, and comprises a pair of ring-shaped portions 78a, 78b approximately parallel to each other, a connecting portion 79 for making the inner peripheral rims of the ring-shaped portions 78a, 78b continuous with each other, and a protruding portion 80 which is bent axially outward from the outer peripheral rim of the outside ring-shaped portion 78a of the ring-shaped portions 78a and 78b.

With such a seal lip 68c, a portion on the outer periphery side in the inside ring-shaped portion 78b is securely connected by bonding or baking to a portion on the inner periphery side on the axially outside face of the ring-shaped portion 46 of the metal backing member 69e and to the inner peripheral rim portion of the ring-shaped portion 46.

Moreover, the tip end edge of the protruding portion 80 is made to abut resiliently against the end face of the crimped portion 27 around the whole periphery.

Furthermore, in this condition, a part of the axially inside face of the axially inside ring-shaped portion 78b is made to abut resiliently against the axially outer end face of the housing 11 around the whole periphery, to seal the fitted and secured portion between the metal backing member 69e and the axially outer end portion of the housing 11. The axial size (in the right and left direction of FIG. 16) of the seal lip 68c in a free state is made sufficiently larger than the axial space between the axially outer end face of the housing 11 and the end face of the crimped portion 27.

In the case of this example constructed as described above, since the seal lip 68c is formed in an approximate U-shape in cross-section, the tip edge of the protruding portion 80 formed on the outer peripheral rim of the axially outside ring-shaped portion 78a can be displaced by a large amount in the axial direction. Therefore, even if the axial interval between the axially outer end face of the housing 11 and the end face of the crimped portion 27 is changed significantly (for example, by about 1 mm) due to the play existing in the coupling portion between the inside and outside engagement grooves 14 and 13 and the stop ring 35, the tip end edge of the protruding portion 80 can follow the change, thus sufficiently ensuring an abutting pressure of the tip end edge of the protruding portion 80 against the end face of the crimped portion 27.

Since the seal lip 68c is formed in an approximate U-shape in cross-section, the resistance to deformation of the middle part of the seal lip 68c can be made smaller than any frictional resistance acting on the abutting portion between the tip edge of the protruding portion 80 and the end face of the crimped portion 27, thus ensuring that the abutting portion does not slide during operation. Accordingly, the sealing performance of the seal lip 68c can be stabilized.

In the case of this example, when the cylindrical portion 45 of the metal backing member 69e is pressed onto the axially outer end portion of the housing 11, a jig is pressed against a portion on the outer diameter side where the ring-shaped portion 78b of the seal lip 68c is not bonded, of the axially outside face of the ring-shaped portion 46 of the metal backing member 69e.

In other words, to ensure a portion for pressing the jig on the portion on the outer diameter side of the axially outside face of the ring-shaped portion 46, the size of the outer diameter of the ring-shaped portion 46 is made sufficiently larger than that of the axially inside ring-shaped portion 78b of the seal lip 68c.

Other construction and operation are substantially the same as for the case of the above described first and third examples.

Figure 17:
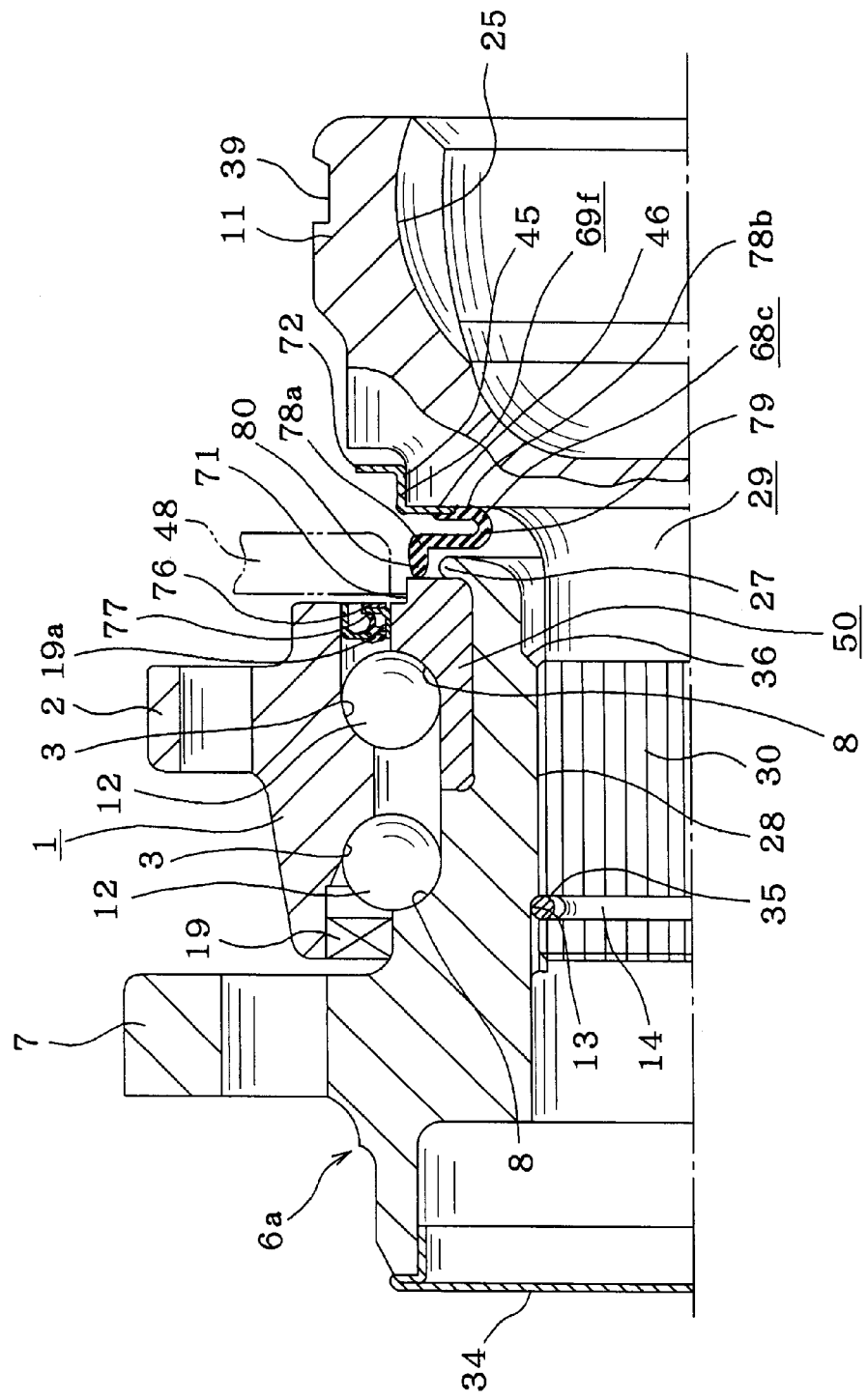
FIG. 17 is a cross sectional view of one half of an example of the embodiments of the axle unit for driving a vehicle wheel according to the present invention.

FIG. 17 shows a thirteenth example of the embodiment of the present invention. In the case of this example, the tip edge of a protruding portion 80 constituting a seal lip 68c is made to abut against the axially inner end face of the inner ring 50 around the whole periphery. With this example therefore, the tip edge of the protruding portion 80 is made to abut against the axially inner end face of the inner ring 50 having a higher positional accuracy and shape accuracy after being fitted than that of the end face of the crimped portion 27. Hence the sealing performance of the seal lip 68c is further stabilized.

In the case of this example, a collar 72 for pressing by a press jig is formed on the axially inner end rim of the cylindrical portion 45 of a metal backing member 69f externally secured to the axially outer end portion of the housing 11.

Accordingly, in the case of this example there is no larger allowance for a press portion for the press jig as in the above described twelfth example, on the outer diameter side of the axially outside face of the ring-shaped portion 46 of the metal backing member 69f.

Other construction and operation are substantially the same as for the case of the above described twelfth example.

Figure 18:
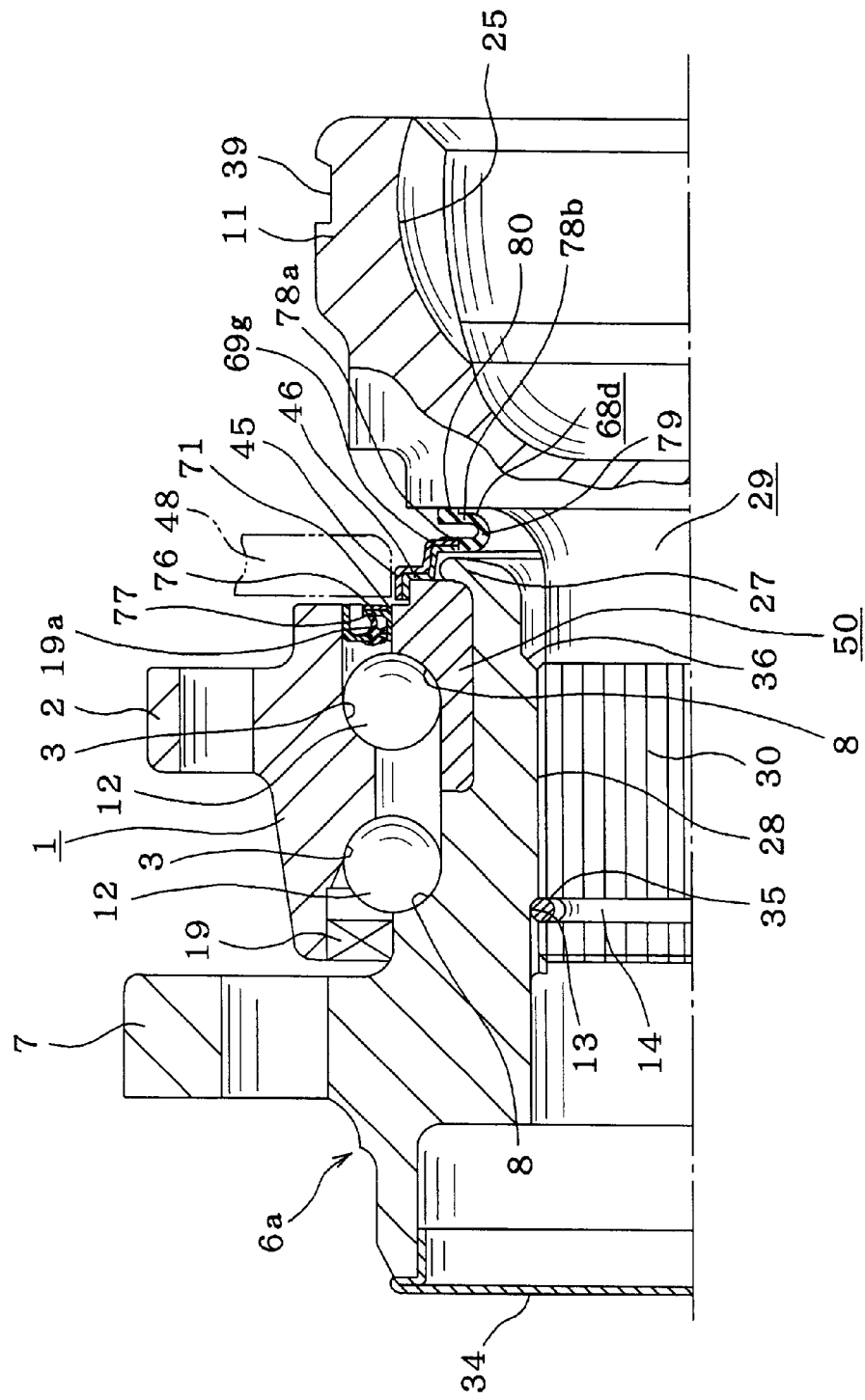
FIG. 18 is a cross sectional view of one half of an example of the embodiments of the axle unit for driving a vehicle wheel according to the present invention.

FIG. 18 shows a fourteenth example of the embodiment of the present invention. In the case of this example, a metal backing member 69g for supporting a seal lip 68d is formed in the shape of a crank in cross-section, and the cylindrical portion 45 provided on the outermost diameter side is externally secured to the reduced diameter stepped portion 71 formed on the axially inner end portion of the inner ring 50. The reason why the cylindrical portion 45 is externally secured to the reduced diameter stepped portion 71 is to keep the cylindrical portion 45 from interfering with the tip portion of the sensor 48.

On the other hand, the seal lip 68d supported by the metal backing member 69g has a portion on the outer diameter side of an axially outside ring-shaped portion 78a connected to an inner peripheral edge portion of the metal backing member 69g, and makes the tip edge of a protruding portion 80 provided on an outer peripheral rim of an axially inside ring-shaped portion 78b abut against the axially outer end face of the housing 11 around the whole periphery.

In the case of this example, a part of the resilient material constituting the seal lip 68d is bonded to the inner peripheral face of the cylindrical portion 45. Therefore, even if the reduced diameter stepped portion 71 is deformed when the crimped portion 27 is formed, the fit strength of the cylindrical portion 45 to the reduced diameter stepped portion 71 can be made suitable, and the sealing performance of the fitting portion of the cylindrical portion 45 can be ensured.

Other construction and operation are substantially the same as for the case of the above described twelfth example.

Figure 19:
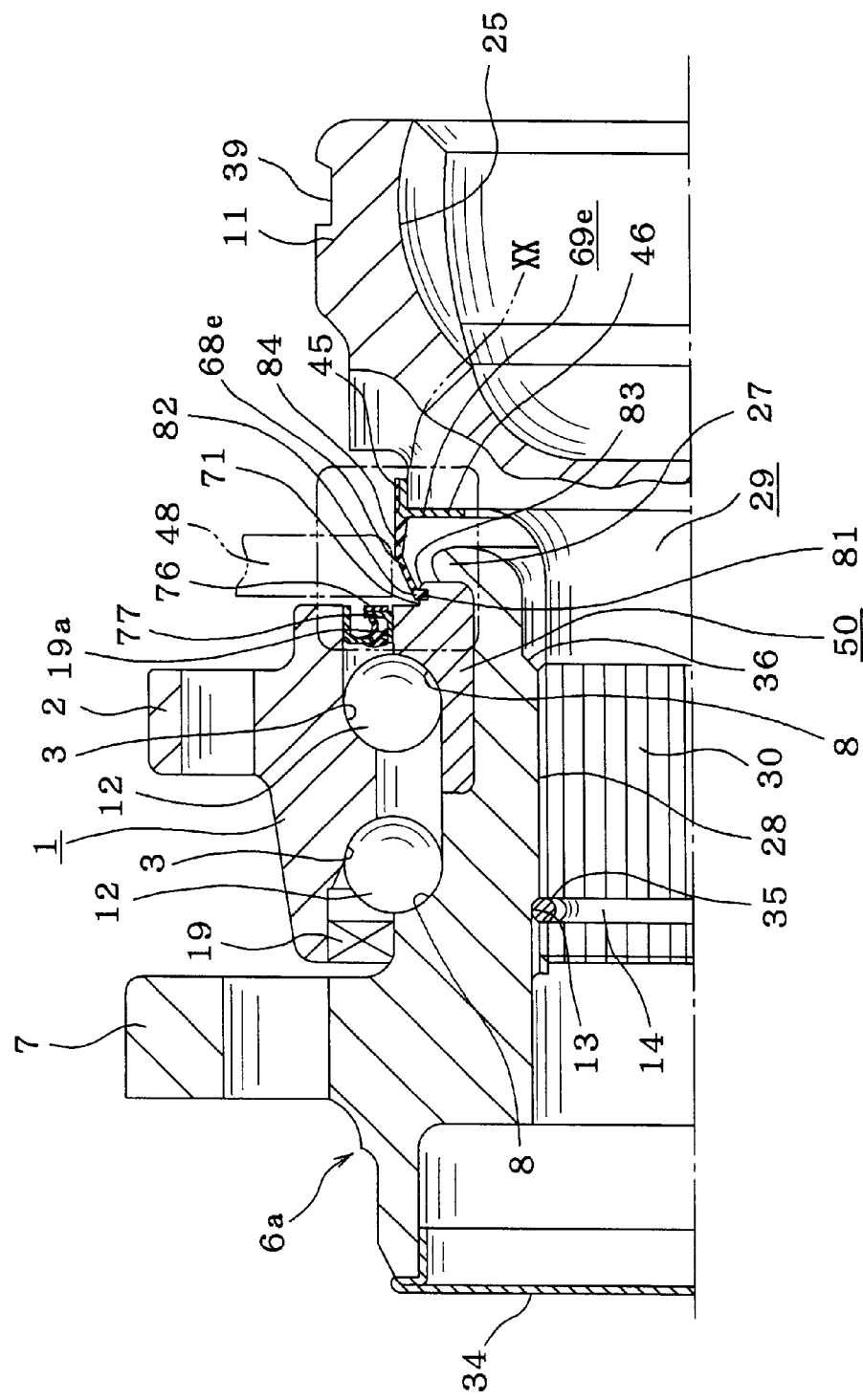
FIG. 19 is a cross sectional view of one half of an example of the embodiments of the axle unit for driving a vehicle wheel according to the present invention.
Figure 20:
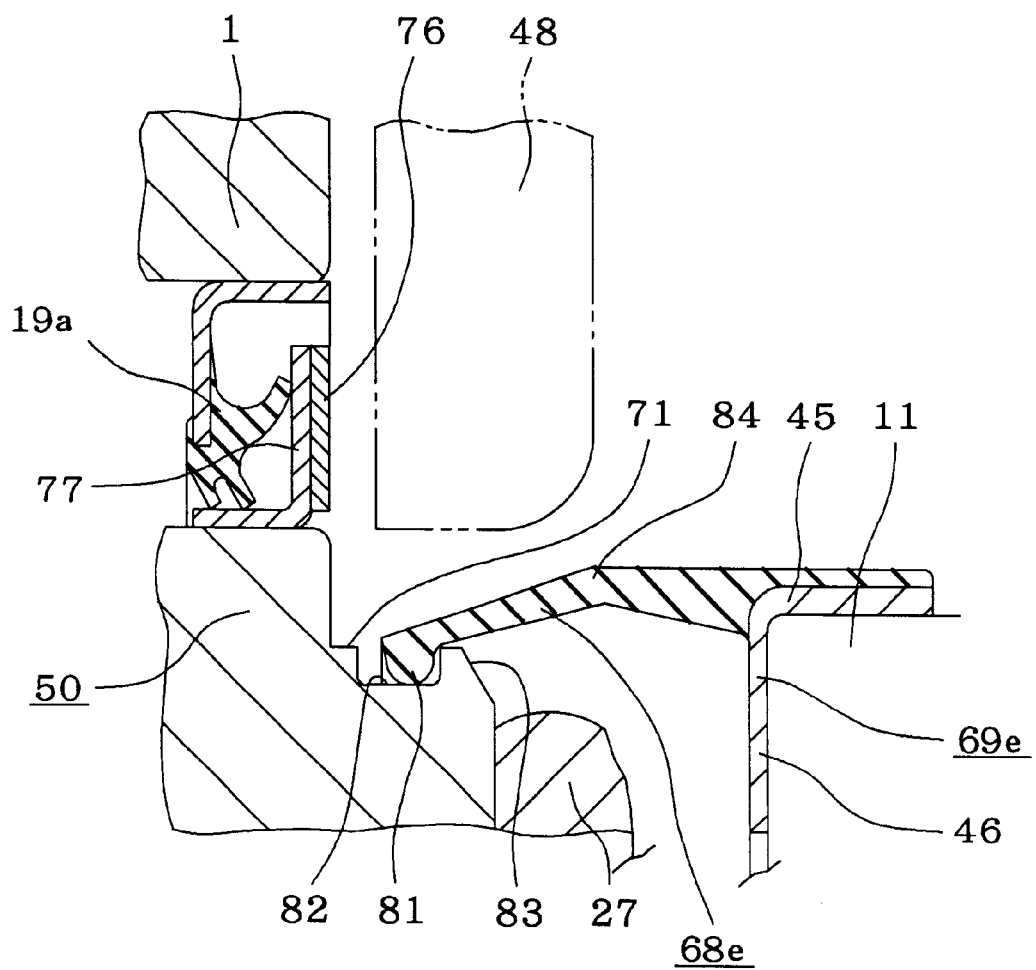
FIG. 20 is an enlarged view of Portion XX in FIG. 19.

FIGS. 19 and 20 show a fifteenth example of the embodiment of the present invention. In the case of this example, a seal member or seal lip 68e is supported on a metal backing member 69e externally secured to the axially outer end portion of the housing 11 and formed in an approximate cylindrical shape overall, and in a kink-shape in cross-section. The axially inner end portion or base end of the seal lip 68e is bonded to the outer peripheral face of a cylindrical portion 45 and the outer peripheral rim portion of a ring-shaped portion 46 of the metal backing member 69e.

Moreover, an anchoring protrusion 81 is formed on an inner peripheral face of a tip portion around the whole periphery and engaged in an anchoring groove 82 formed in the reduced diameter stepped portion 71 of the inner ring 50 around the whole periphery. The height of the anchoring protrusion 81 is made larger than the depth of the anchoring groove 82.

Moreover, the diameter of the inner peripheral rim of the anchoring protrusion 81 in a free state is made smaller than that of the bottom face of the anchoring groove 82. Therefore, with the anchoring protrusion 81 is engaged in the anchoring groove 82, the inner peripheral rim of the anchoring protrusion 81 abuts resiliently against the bottom face of the anchoring groove 82 around the whole periphery. In other words, the tip portion of the seal lip 68e is externally fitted to the bottom face of the anchoring groove 82. In this condition, the space between the hub 6a and the drive shaft member 29 is sealed.

When engaging the anchoring protrusion 81 in the anchoring groove 82, the splined shaft 30 is inserted into the splined bore 28 from the right to the left in. FIG. 19, with the metal backing member 69e externally secured on the axially outer end portion of the housing 11. By this insertion operation, the anchoring protrusion 81 formed on the tip portion of the seal lip 68e is resiliently widened in the inner diameter, while being guided over a the chamfered portion 83 formed in a conical convex shape and provided on the axially inner end rim of the reduced diameter stepped portion 71. Then, after following over the outer peripheral face of the reduced diameter stepped portion 71, the inner diameter is again reduced to enter into the anchoring groove 82.

In the case of this example constructed as described above, even if the housing 11 and the anchoring groove 82 formed on the outer peripheral face of the reduced diameter stepped portion 71 are axially displaced relative to each other due to the play existing between the engagement portion of the inside and outside engagement grooves 14 and 13 and the stop ring 35, a kinked portion 84 formed in the middle part of the seal lip 68e bends, thereby allowing the anchoring protrusion 81 formed on the tip portion of the seal lip 68e to follow the anchoring groove 82.

Hence, sliding is not caused in the abutting portion between the inner peripheral rim of the anchoring protrusion 81 and the bottom face of the anchoring groove 82, and deterioration of the sealing performance due to wear or the like can be prevented.

In the case of this example, the size of the inner diameter of the ring-shaped portion 46 of the metal backing member 69e is made sufficiently smaller than that of the anchoring protrusion 81 provided at the tip portion of the seal lip 68e in a free state. Hence, when the metal backing member 69e is pressed onto and secured to the outer end portion of the housing 11, the tip portion of the seal lip 68e does not interfere with the press jig which is made to abut against the axially outside face of the ring-shaped portion 46 of the metal backing member 69e. Other construction and operation are substantially the same as for the case of the above described twelfth example.

Figure 21:
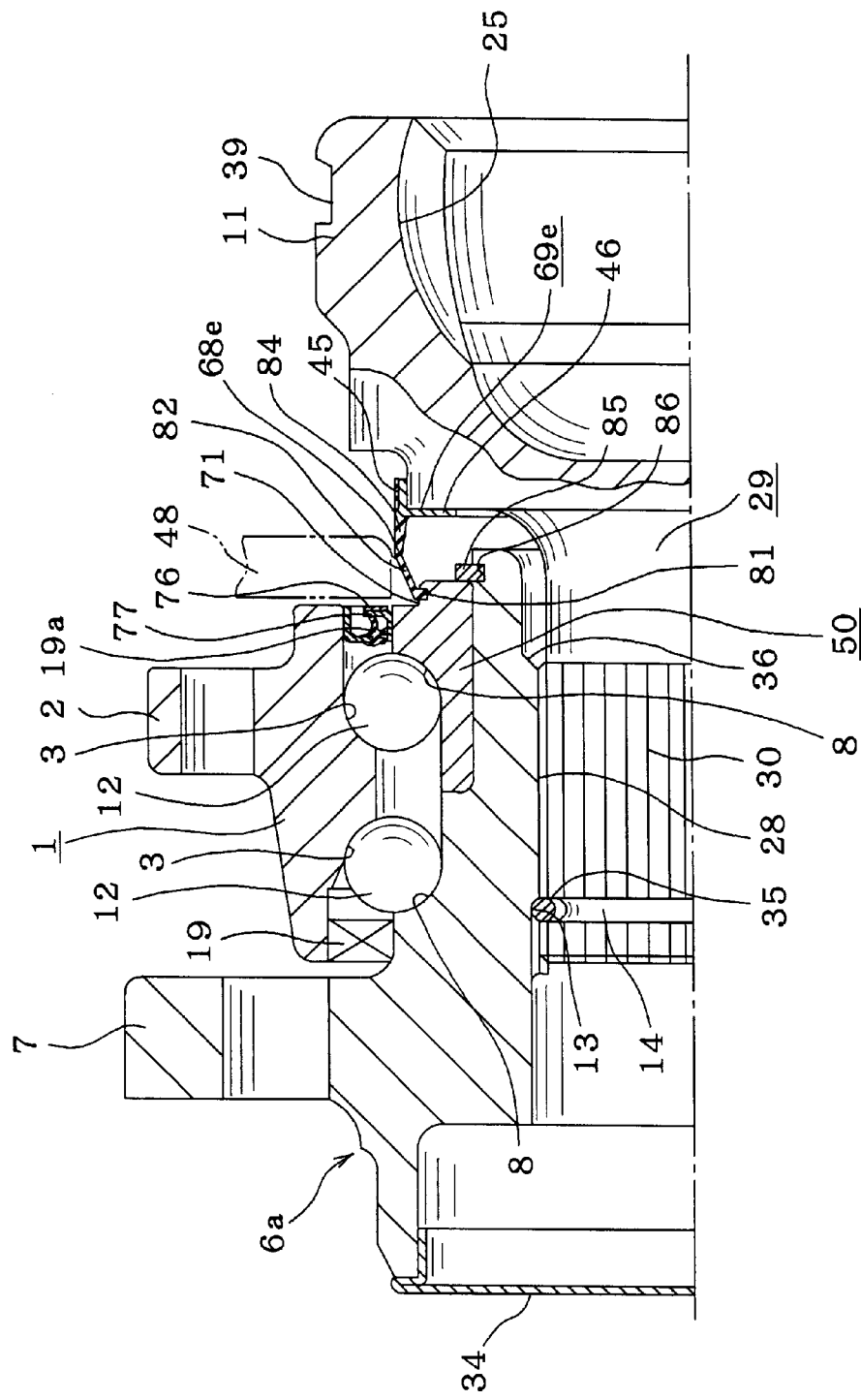
FIG. 21 is a cross sectional view of one half of an example of the embodiments of the axle unit for driving a vehicle wheel according to the present invention.

FIG. 21 shows a sixteenth example of the embodiment of the present invention. In the case of this example, the inner ring 50 is held on the axially inner end portion of the hub 6a by a stop ring 85 engaged in the axially inner end portion of the hub 6a. That is to say, an anchoring groove 86 is formed on the outer peripheral face of the axially inner end portion of the hub 6a around the whole periphery, and the stop ring 85 is engaged in the anchoring groove 86. The stop ring 85 is composed of a pair of stop ring elements, each being semicircular. Such a stop ring 85 is forced to press the inner ring 50 against the hub 6a axially outward to impart a suitable preload to the rolling members 12, while engaging the inner peripheral rim portion thereof in the anchoring groove 86.

Furthermore, as the stop ring 85, one is selected having a suitable thickness to keep a sufficient preload on the rolling members 12, even when the above-mentioned force pressing the inner ring 50 axially outward is released.

Other construction and operation are substantially the same as for the case of the above described fifteenth example.

Figure 22:
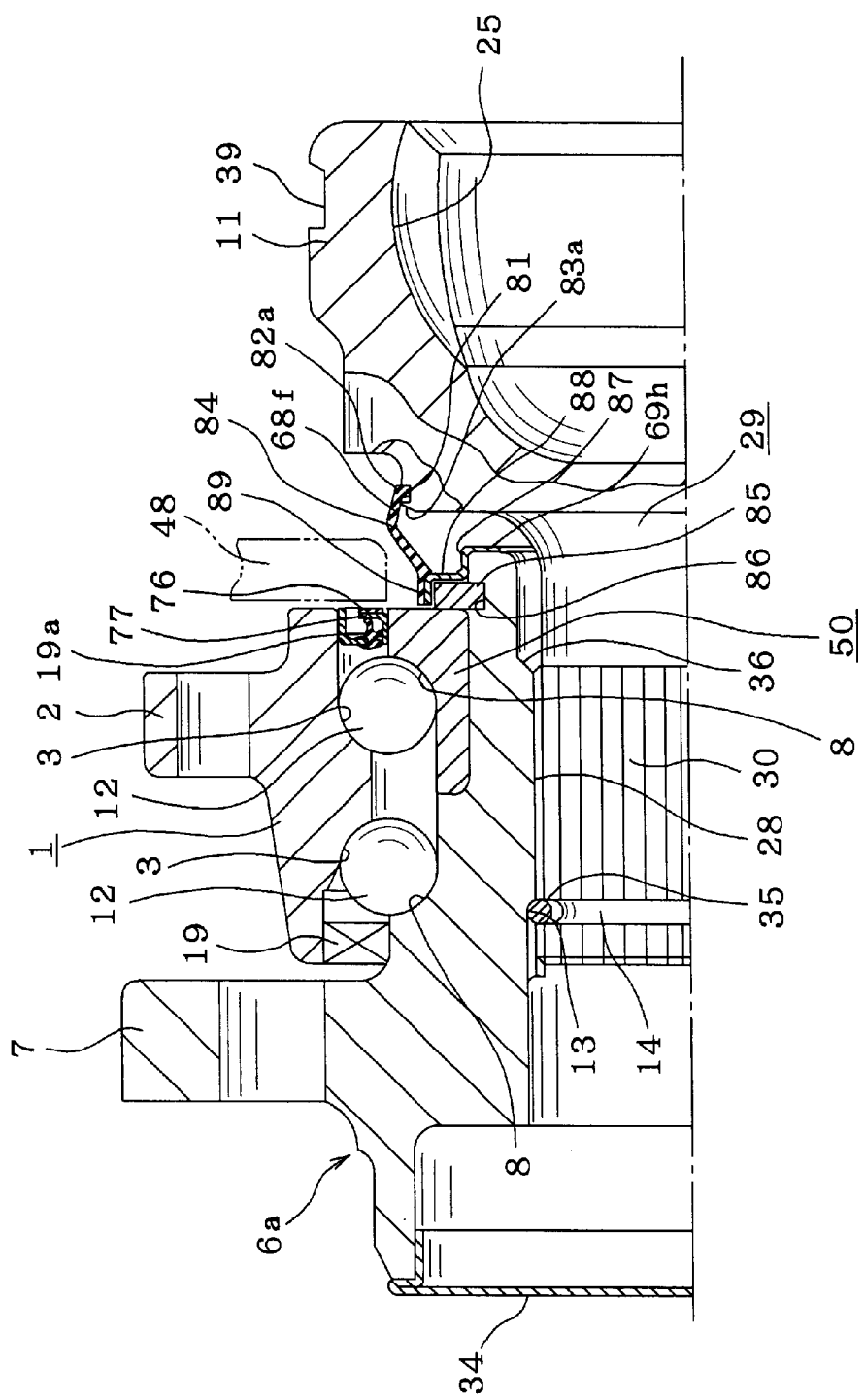
FIG. 22 is a cross sectional view of one half of an example of the embodiments of the axle unit for driving a vehicle wheel according to the present invention.

FIG. 22 shows a seventeenth example of the embodiment of the present invention. In the case of this example, a metal backing member 69h for supporting a seal lip 68f is supported and secured to the axially inner end portion of the hub 6a. A part of the metal backing member 69h is disposed on the circumference of the stop ring 85 for holding the inner ring 50 on the axially inner end portion of the hub 6a. Hence, in the case of this example, the pair of stop ring elements constituting the stop ring 85 are prevented from being displaced radially outward and thus inadvertently coming out from the anchoring groove 86 formed towards the axially inner end on the outer peripheral face of the hub 6a.

That is to say, the metal backing member 69h is formed in an overall circular shape and in the shape of a crank in cross-section, and comprises a small diameter cylindrical portion 87 for externally securing to the axially inner end portion of the hub 6a, a ring-shaped portion 88 bent a radially outward from the axially outer end rim of the small diameter cylindrical portion 87, and a large diameter cylindrical portion 89 bent axially outward from the outer peripheral rim of the ring-shaped portion 88.

The axially outside face of the ring-shaped portion 88 is made to abut against or face close to the axially inside face of the stop ring 85, while the inner peripheral face of the large diameter cylindrical portion 89 is made to abut against or face close to the outer peripheral face of the stop ring 85.

The axially outer end or base end of the seal lip 68f is connected to the outer peripheral face of the cylindrical portion 89 with a larger diameter and the outer peripheral rim portion of the ring-shaped portion 88, while the inner peripheral rim of an anchoring protrusion 81 disposed on the inner peripheral face of the axially inner end or tip end of the seal lip 68f is made to abut against the bottom face of an anchoring groove 82a formed on the outer peripheral face of the axially outer end portion of the housing 11 around the whole periphery.

In the case of this example also, a chamfered portion 83a is formed on the axially outer end rim portion of the housing 11, which serves as a guide face when the anchoring protrusion 81 disposed at the tip portion of the seal lip 68f is engaged in the anchoring groove 82a.

Other construction and operation are substantially the same as for the case of the above described sixteenth example.

Figure 23:
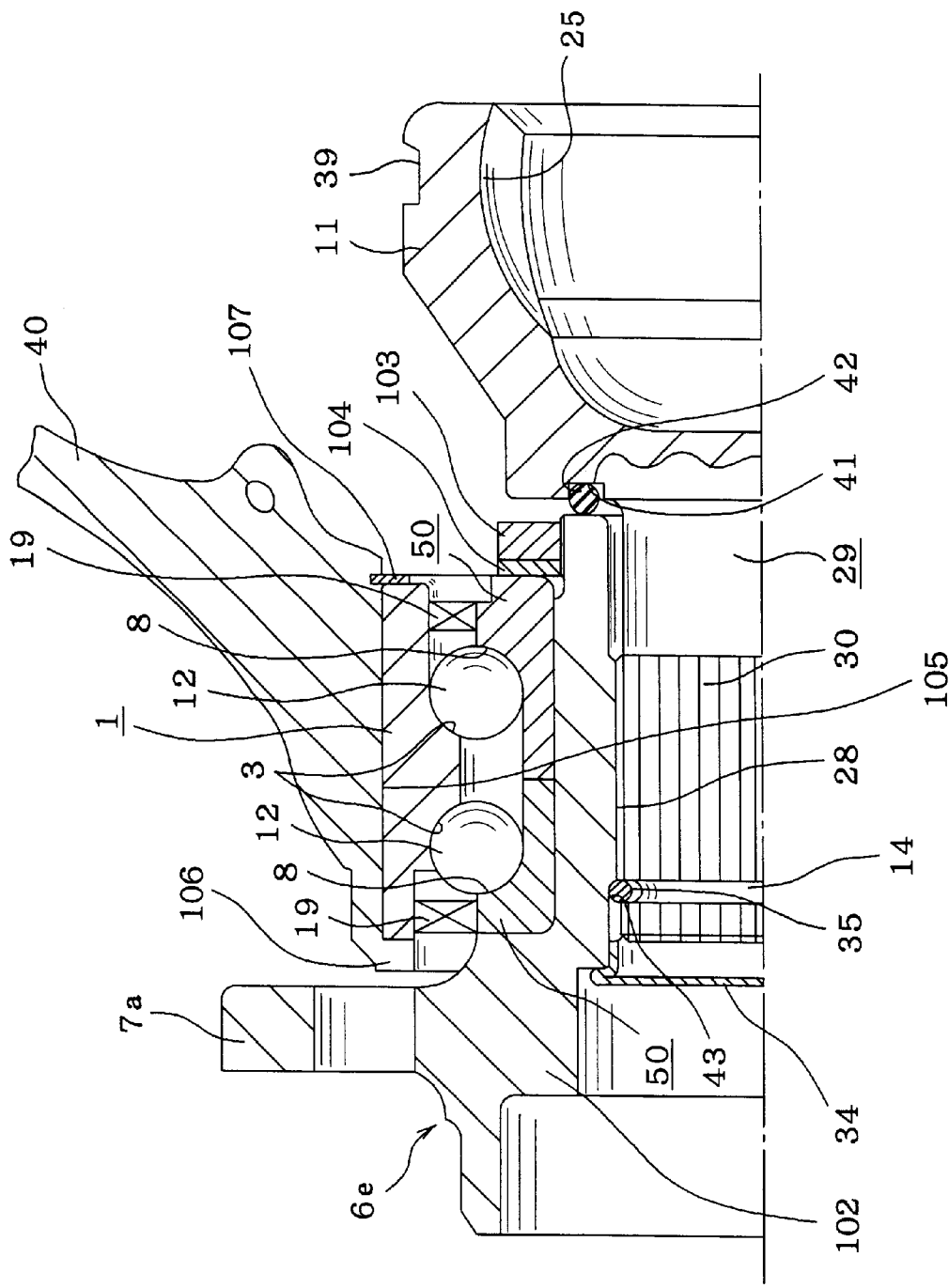
FIG. 23 is a cross sectional view of one half of an example of the embodiments of the axle unit for driving a vehicle wheel according to the present invention.

FIG. 23 shows an eighteenth example of the embodiment of the present invention. In the case of this example, the hub 6e comprises a hub main body 102, a pair of inner rings 50 and a nut 103. That is to say, the hub 6e is constituted by screwing and fastening the nut 103 on an external thread formed on the axially inner end portion of the hub main body 102, with the pair of inner rings 50 externally fitted to the hub main body 102.

In addition, a washer 104 is positioned between the nut 103 and the inside inner ring 50. An outer ring 1 is internally fitted to the inside of a support bore 105 formed in a knuckle 40, and held between a collar 106 formed on the inner peripheral face of an opening on one end of the support bore 105 and a stop ring 107 engaged with the inner peripheral face of the other end of the support bore 105, from axially opposite sides.

Other construction and operation are substantially the same as for the case of the above described fourth example shown in FIG. 7. Here, with the pair of inner rings 50, the axially outside inner ring 50 may be formed integrally with the hub main body 102.

Figure 24:
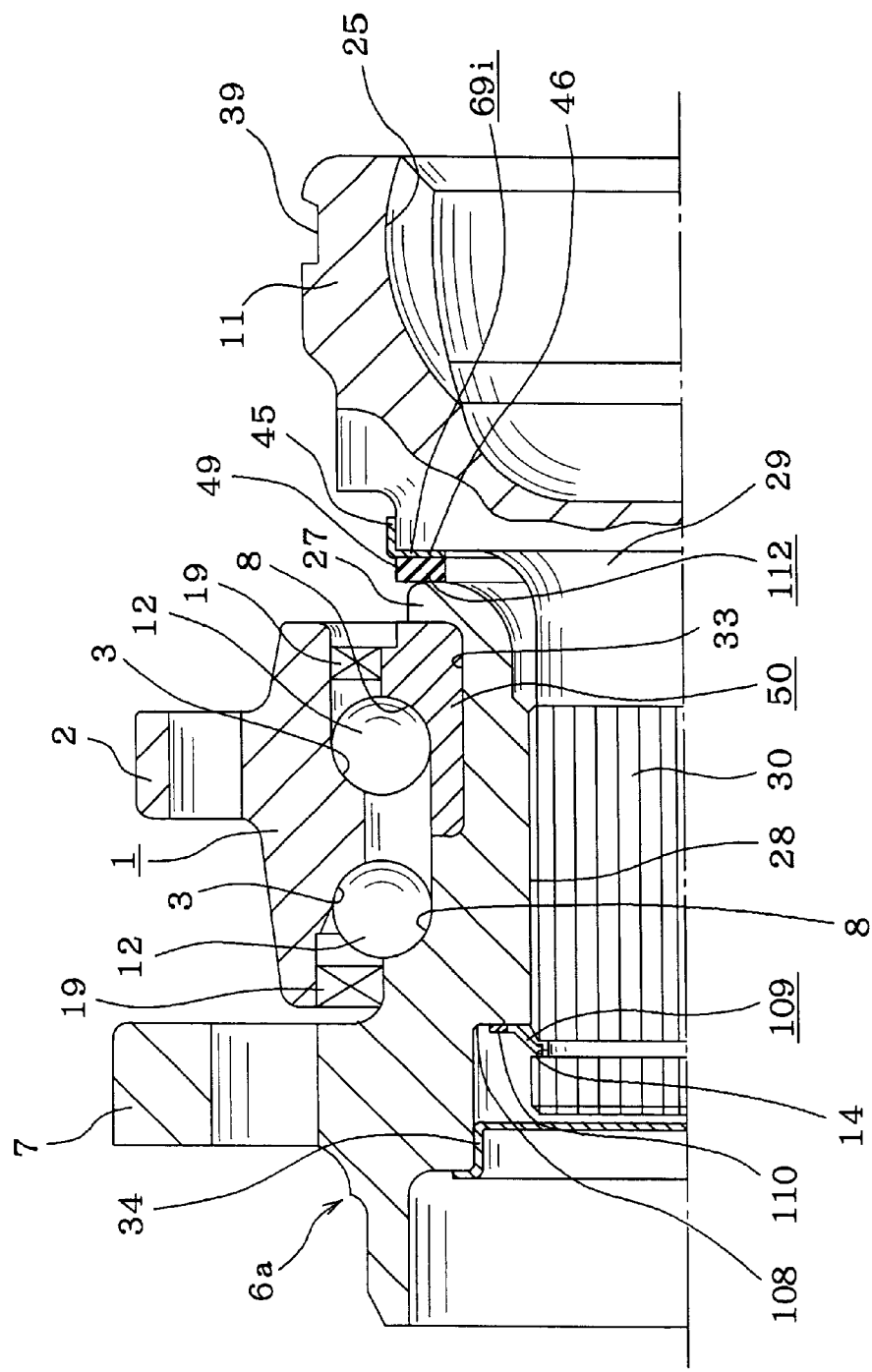
FIG. 24 is a cross sectional view of one half of an example of the embodiments of the axle unit for driving a vehicle wheel according to the present invention.
Figure 25:
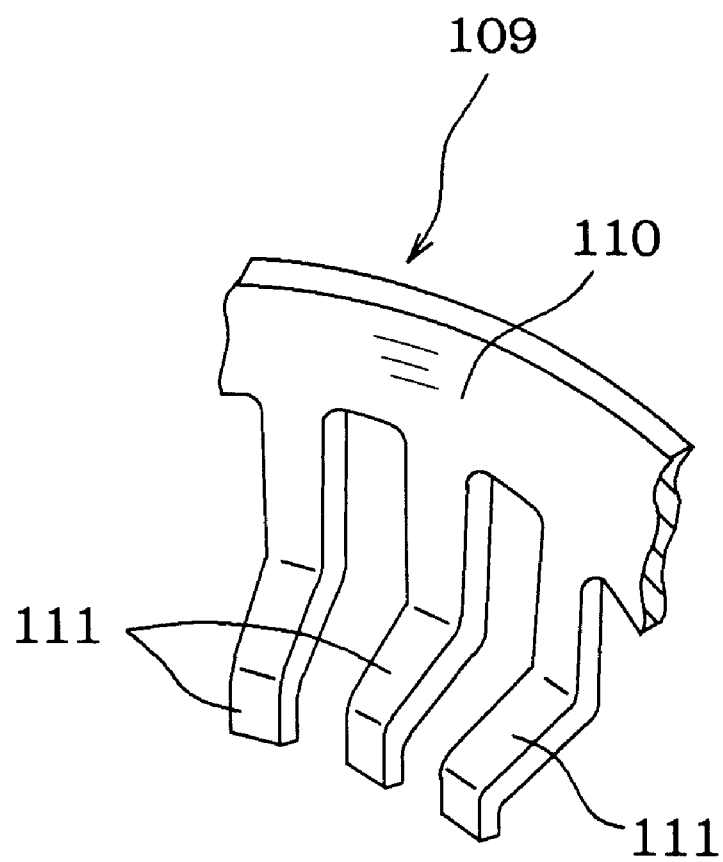
FIG. 25 is a enlarged perspective view of part of the stop ring in FIG. 24.

FIGS. 24 and 25 show a nineteenth example of the embodiment of the present invention. In the case of this example, the inside engagement portion or inside engagement groove 14 is formed on the outer peripheral face of the middle part on the outer end side of the splined shaft 30 around the whole periphery. Moreover, an outside engagement portion or stepped portion 108 is formed on the circumference of the opening on the axially outer end of the splined bore 28 formed in the central portion of the hub 6a, at a position coordinated with the inside engagement groove 14, around the whole periphery. An annular stop ring 109, a part of which is shown in FIG. 25, is fitted between the inside engagement groove 14 and the stepped portion 108, so as to span therebetween.

The stop ring 109 is formed in an overall annular shape from a resilient metal plate, for example, a spring steel such as SK5, a stainless spring steel or the like, so that the thickness thereof can be resiliently contracted freely in the axial direction (the right and left direction in FIG. 24). More specifically, the stop ring 109 is provided with a ring-shaped portion 110 around the whole periphery on the outer peripheral side, and a plurality of resilient tongues 111 formed on the inner peripheral rim portion of the ring-shaped portion 110 protruding radially inward and in the axial direction.

The diameter of the inscribing circle at the tip edge (end edge on the inner peripheral side) of the plurality of resilient tongues 111 which constitute the stop ring 109 is made smaller than the diameter of the circumscribing circle of the splined shaft 30, in a free state of the stop ring 109.

The stop ring 109 is externally fitted to the axially outer end portion of the splined shaft 30, with the tip portion (end portion on the inner peripheral side) of the plurality of resilient tongues 111 resiliently deformed in a radially outward direction of the stop ring 109.

The tip end portion of the resilient tongues 111 are then resiliently restored radially inward, so that the plurality of resilient tongues 111 fit into the inside engagement groove 14, with the tip end portion of the resilient tongues 111 and the inside engagement groove 14 engaged with each other. In this state, the ring-shaped portion 110 is made to abut against the stepped portion 108.

It is a matter of course in this case, the diameter of the groove bottom of the inside engagement groove 14 is restricted (the diameter of the groove bottom of the inside engagement groove 14 is made smaller than the diameter of the groove bottom of the male splines) and the width of the tip portion of the resilient tongues 111 is also restricted (the width is made larger than the width of the splined grooves), so that the resilient tongues 111 cannot come away from the inside engagement groove 14 along the splined grooves formed on the outer peripheral face of the splined shaft 30. The ring-shaped portion 110 may be formed in a segment circle, to make it easy to perform the work of engaging the respective resilient tongues 111 with the inside engagement groove 14.

Alternatively, the spline grooves may be left off the tip portion of the splined shaft 30, on the tip end side of the inside engagement groove 14 with which the stop ring 109 is engaged, so that the splined shaft 30 has a cylindrical face with a smaller diameter than that of the groove bottom of the splined grooves. In this case, the diameter of the bottom portion of the inside engagement groove 14 will be smaller than the outer diameter of the cylindrical face.

Incidentally, in the present case, the stop ring 109 is mounted after the splined shaft 30 is inserted into the splined hole 28.

As in the first example shown in FIG. 1, it is impossible to insert the splined shaft 30 into the splined hole 28 in the state where the stop ring 35 is previously installed in the splined shaft 30.

Furthermore, a seal member 112 comprising a metal backing member 69i and a resilient plate 49, is disposed between the axially outer end face of the housing 11 provided on the axially inner end portion of the drive shaft member 29 provided with the splined shaft 30, and the axially inner end face of the hub 6a.

The metal backing member 69i of the seal member 112 is made by forming a metal plate, for example, a carbon steel plate such as SPCC in an overall annular shape with an L-shape in cross-section, and is secured on the axially outer end portion of the housing 11. Specifically, the cylindrical portion 45 formed on the outer peripheral rim portion of the metal backing member 69i is externally fitted onto the axially outer end portion of the housing 11 by an interference fit.

The resilient plate 49 made by forming an elastomer such as rubber, vinyl or the like in a ring form, is attached to the axially outside face of the ring-shaped portion 46 of the metal backing member 69i around the whole periphery by baking or bonding.

Such a resilient plate 49 of the seal member 112 is resiliently clamped between the axially outer end face of the housing 11 and the crimped portion 27 existing on the axially inner end face of the hub 6a, with the stop ring 109 spanning between the inside engagement groove 14 and the stepped portion 108.

The resilient force for clamping the resilient plate 49 therebetween based on the resilience of the stop ring 109 is set to be slightly larger than the thrust load applied to the splined shaft 30 at the time of driving, for example, around 100 kgf. With the axle unit for supporting the wheel of this example, the resilient plate 49 is resiliently clamped between the axially outer end face of the housing 11 and the crimped portion 27 by spanning the stop ring 109 between the inside engagement groove 14 and the stepped portion 108 in an axially compressed state, thereby positioning the hub 6a and the drive shaft member 29 in the axial direction.

In the case of the axle unit for driving the wheel of this example constructed as described above, the stop ring 109 has resilience in the axial direction, and the resilient plate 49 is resiliently clamped between the crimped portion 27 existing on the axially inner end face of the hub 6a and the axially outer end face of the housing 11, with the stop ring 109 spanning between the inside engagement groove 14 and the stepped portion 108. Therefore, regardless of vibration caused during driving, abnormal sounds due to bumping between the members do not occur. Moreover, while driving an automobile, the thrust load produced in the section of the tripod type constant velocity joint (not shown) provided on the differential gear side, is applied to the drive shaft member 29 via a drive shaft (not shown).

Since the direction of the thrust load changes depending upon the operational state of the tripod type constant velocity joint, a force in a direction to pull out the drive shaft member 29 from the hub 6a is applied in certain instances.

However, even in this case, since the force clamping the resilient plate 49 based on the resilience of the stop ring 109 is set to be larger than the thrust load applied to the splined shaft 30 with the tripod type constant velocity joint being driven, for example, around 100 kgf, then the drive shaft member 29 and the hub 6a will not be displaced axially. Accordingly, the crimped portion 27 and the resilient plate 49 are not separated, and the sealing performance between the drive shaft member 29 and the hub 6a by means of the resilient plate 49 can be ensured, regardless of the thrust load applied during driving.

Figure 26:
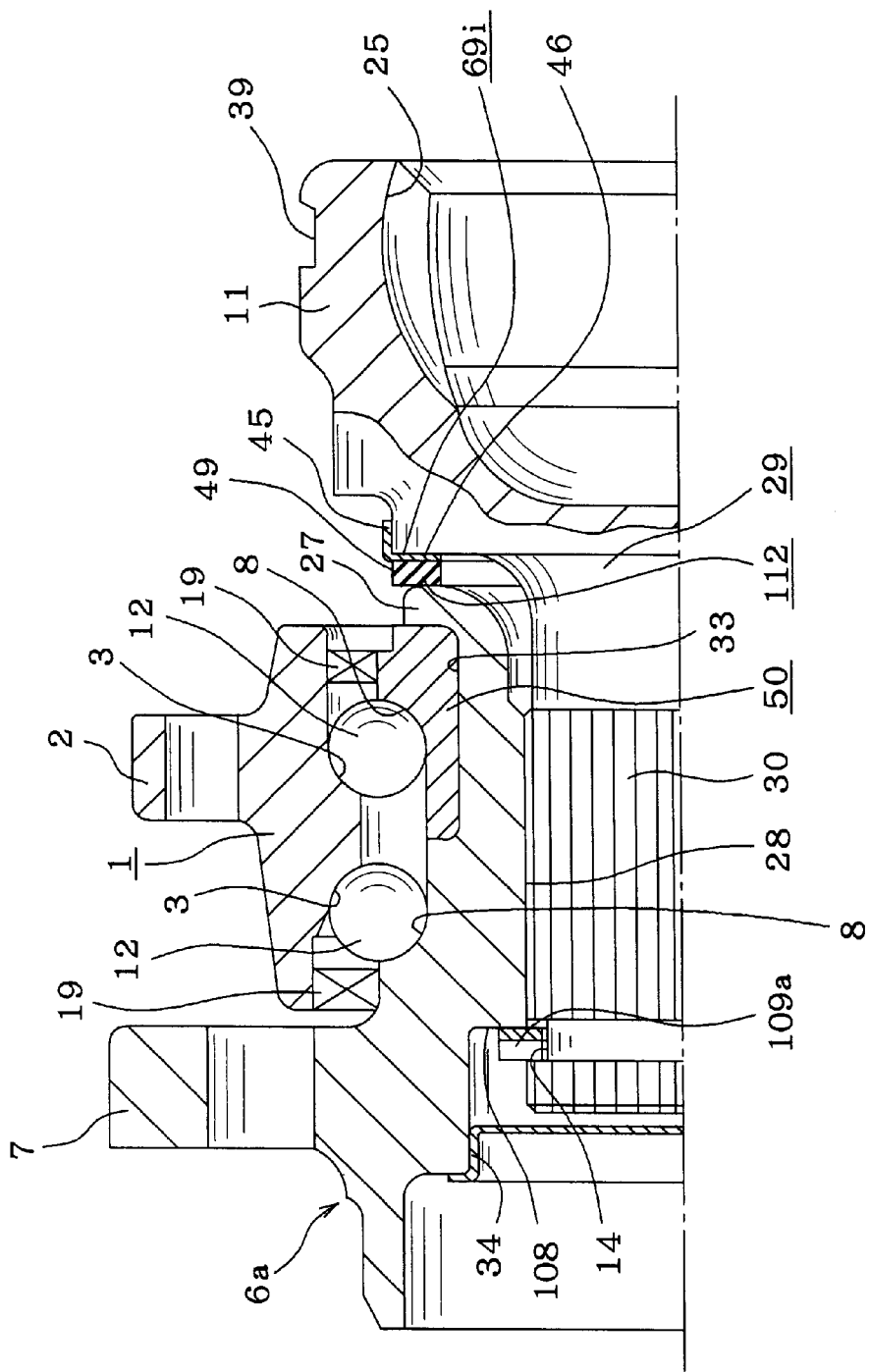
FIG. 26 is a cross sectional view of one half of an example of the embodiments of the axle unit for driving a vehicle wheel according to the present invention.
Figure 27:
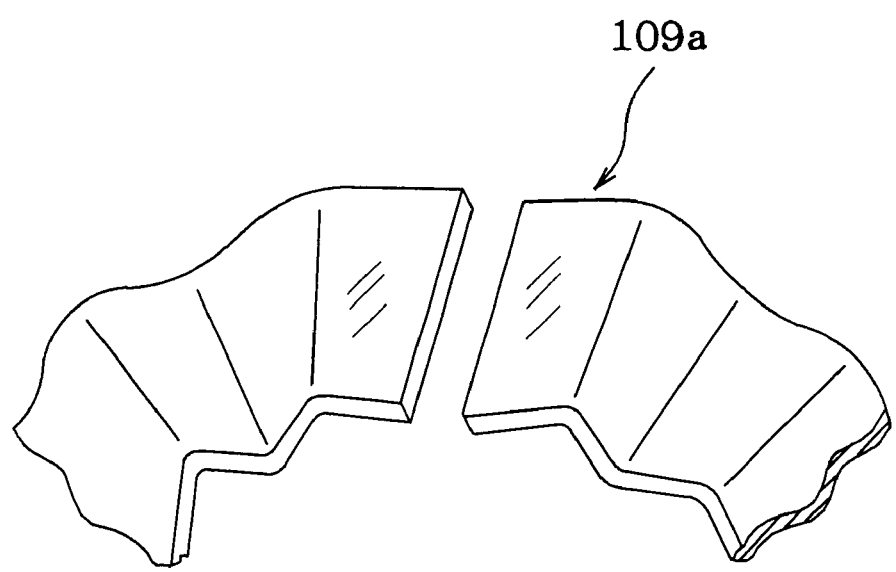
FIG. 27 is an enlarged perspective view of the stop ring in FIG. 26.

FIGS. 26 and 27 show a twentieth example of the embodiment of the present invention. In the case of this example, as a stop ring 109a spanning between the inside engagement groove 14 on the outer peripheral face of the splined shaft 30 of the drive shaft member 29 and the stepped portion 108 on the inner peripheral face of the hub 6a, a corrugated plate spring in the shape of segment circle is used.

The stop ring 109a formed from a similar resilient metal plate as the stop ring 109 used in the nineteenth example described above is spanned between the inside engagement groove 14 and the stepped portion 108, with the inner diameter thereof resiliently expanded.

Other construction and operation are substantially the same as for the case of the above described nineteenth example, hence similar components are denoted by the same symbols, and repeated description is omitted.

Figure 28:
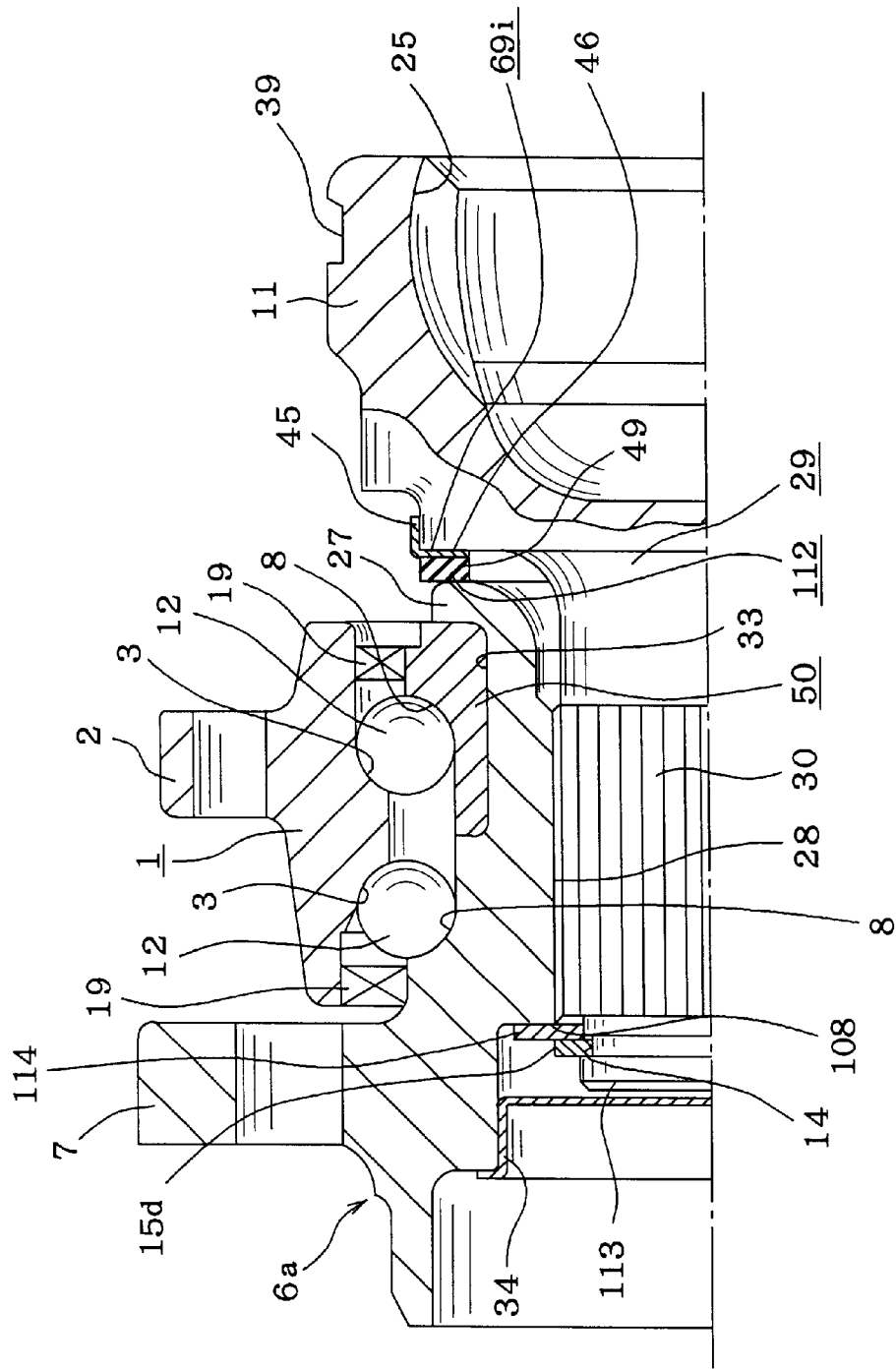
FIG. 28 is a cross sectional view of one half of an example of the embodiments of the axle unit for driving a vehicle wheel according to the present invention.

FIG. 28 shows a twenty-first example of the embodiment of the present invention. In the case of this example, at the tip portion of the splined shaft 30 of the drive shaft member 29, a cylindrical portion 113 is formed. The outer diameter of the cylindrical portion 113 is smaller than the diameter of the inscribing circle of the groove bottom of the splined groove formed on the splined shaft 30. The inside engagement portion or inside engagement groove 14 is formed in the axially middle part of the cylindrical portion 113 around the whole periphery.

Moreover, an outside engagement portion or stepped portion 108 is formed on the circumference of the axially outer end opening of the splined bore 28, at a position coordinated with inside engagement groove 14, around the whole periphery.

A stop ring 15d in the shape of a segment circle and a circular spacer 114 are fitted between the inside engagement groove 14 and the stepped portion 108, spanning between the inside engagement groove 14 and the stepped portion 108.

The above described stop ring 15d is a resilient metal plate, for example, a spring steel such as SK5 or a stainless spring steel, and is formed in the shape of segment circle overall so that the diameter can be resiliently expanded and contracted freely. The inner diameter of the stop ring 15d in a free state is smaller than the outer diameter of the cylindrical portion 113. Moreover, the inner diameter of the spacer 114 is slightly larger than the outer diameter of the cylindrical portion 113, and the outer diameter of the spacer 114 is sufficiently larger than the inner diameter of the splined bore 30.

Furthermore, a seal member 112 comprising a metal backing member 69i and a resilient plate 49 is disposed between the axially outer end face of the housing 11 and the axially inner end face of the hub 6a, in a similar manner to in the nineteenth example shown in FIGS. 24 and 25. The resilient plate 49 constituting the seal member 112 is clamped in a resiliently compressed (preload applied) state between the axially outer end face of the housing 11 and the inner end face of the hub 6a, with the stop ring 15d and the spacer washer 114 spanning between the inside engagement groove 14 and the stepped portion 108.

With the drive wheel axle unit of this example, the resilient plate 49 is resiliently clamped between the axially outer end face of the housing 11 and the crimped portion 27 by spanning the stop ring 15d together with the spacer washer 114 between the inside engagement groove 14 and the stepped portion 108 in an axially compressed state, thereby positioning the hub 6a and the drive shaft member 29 in the axial direction.

In the case of the axle unit of this example constructed as described above, since the spacer 114 is disposed between the stop ring 15d and the stepped portion 108, these stop ring 15d and the stepped portion 108 are prevented from abutting against each other over a small area. As a result, fretting wear can be prevented from occurring on the stop ring 15d and the stepped portion 108, irrespective of the thrust load applied between the drive shaft member 29 and the hub 6a at the time of driving.

That is to say, the stop ring 15d cannot be made wide radially because it must be resiliently enlarged diametrically at the time of engaging in the inside engagement groove 14, thus restricting the outer diameter of the stop ring 15d.

Moreover, the diameter of the opening peripheral edge of the splined bore 28 is somewhat large, due to a chamfered portion existing in the opening. Therefore, when only the stop ring 15d is provided between the inside engagement groove 14 and the stepped portion 108, the abutment area between the stepped portion 108 and the stop ring 15d is narrow, and hence the surface pressure on the abutting portion becomes high so that fretting wear easily occurs at the abutting portion.

On the contrary, in the case of the drive wheel axle unit of this example, by providing the spacer 114 and thus ensuring a suitable abutment area between the opposite faces of the spacer 114 and the stepped portion 108 and the stop ring 15d, the surface pressure on the abutting portion can be reduced, and fretting wear can thus be prevented from occurring at the abutting portion. In addition, the resilience force (preload) applied to the resilient plate 49 is preferably set to be slightly larger than the thrust load applied to the splined shaft 30 at the time of driving, for example, about 100 kgf, due to the reason as in the nineteenth example as shown in FIGS. 24 and 25, and as in the twentieth example as shown in FIGS. 26 and 27.

Other construction and operation are substantially the same as for the case of the above described nineteenth and twentieth examples.

Figure 29:
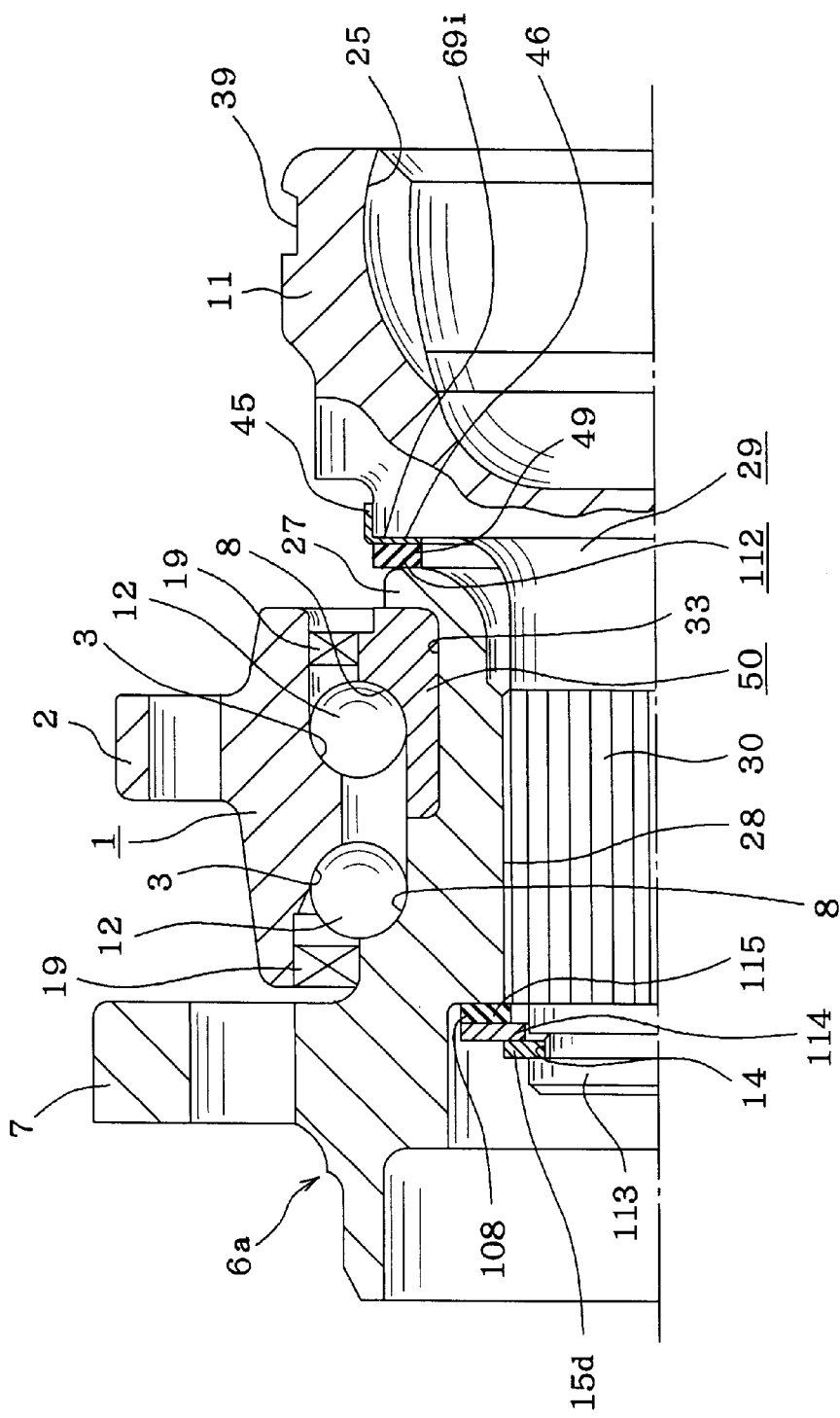
FIG. 29 is a cross sectional view of one half of an example of the embodiments of the axle unit for driving a vehicle wheel according to the present invention.

FIG. 29 shows a twenty-second example of the embodiment of the present invention. In the case of this example, a resilient ring 115 made of an elastomer such as rubber, vinyl or the like is clamped between the spacer 114 and the stepped portion 108 with the resilient ring 115 resiliently compressed between the spacer 114 and the stepped portion 108.

In the example shown in FIG. 29, the resilient ring 115 is plated or bonded to the inside face of the spacer 114, so that the resilient ring 115 can be handled integrally with the spacer 114. In such a case, the cap 34 (FIG. 28) fitted to the hub 6a in the above described twenty-first example is omitted because the resilient ring 115 seals the space between the spacer washer 114 and the stepped portion 108 against the foreign matter which may otherwise enter through the axially outside end opening of the center bore of the hub 6a.

Other construction and operation are substantially the same as for the case of the above described twenty-first example, hence similar components are denoted by the same symbols, and repeated description is omitted.

Figure 30:
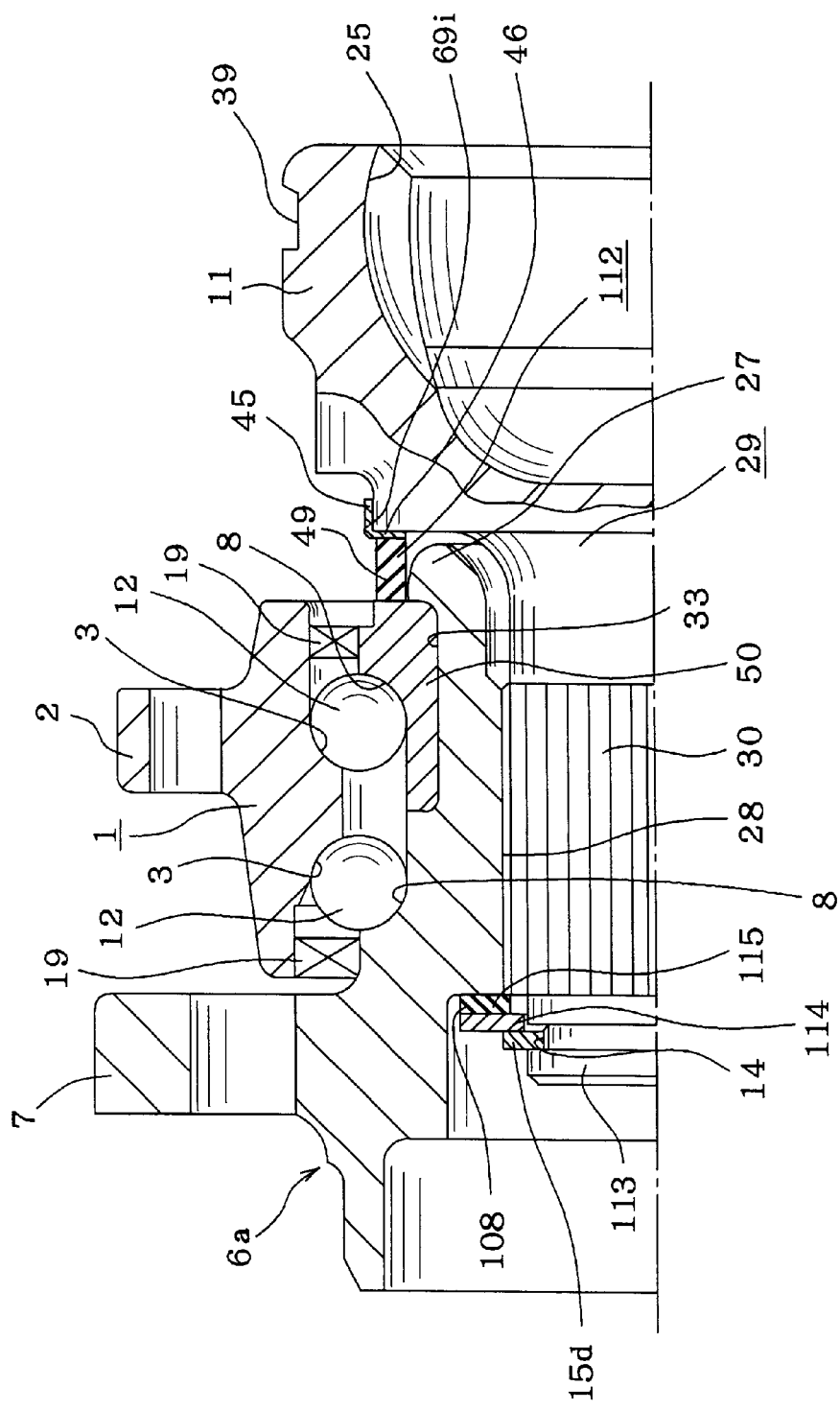
FIG. 30 is a cross sectional view of one half of an example of the embodiments of the axle unit for driving a vehicle wheel according to the present invention.

FIG. 30 shows a twenty-third example of the embodiment of the present invention. In the case of this example, the outer diameter of the crimped portion 27 formed on the axially inner end portion of the hub 6a, in relation to the outer diameter of the inner ring 50 externally secured to the axially inner end portion of the main body of the hub 6a, is made smaller than that in the above described twenty-first and twenty-second examples. Accordingly, in the case of this example, half of the axially inner end face of the inner ring 50 on the outer diameter side is exposed around the circumference of the outer peripheral rim of the crimped portion 27.

Moreover, in the case of this example, a seal member 112 is disposed between the exposed portion on the outer diameter side of the axially inner end face of the hub 6a and the axially outer end face of the housing 11.

In this example as constructed above, the end face of the seal member 112 is abutted to the end face of the flat inner ring 50, so that uniform deformation is produced in the seal member 112. As s result, the thrust load which is borne by the seal member 112 can be large.

Other construction and operation are substantially the same as for the case of the above described twenty-second example, hence similar components are denoted by the same symbols, and repeated description is omitted. Here, the construction with the seal member 112 disposed between the exposed portion on the outer diameter side of the axially inner end face of the inner ring 50 which constitutes the hub 6a and the axially outer end face of the housing 11 may be produced by the construction of the twenty-first example shown in FIG. 28 described above.

Figure 31:
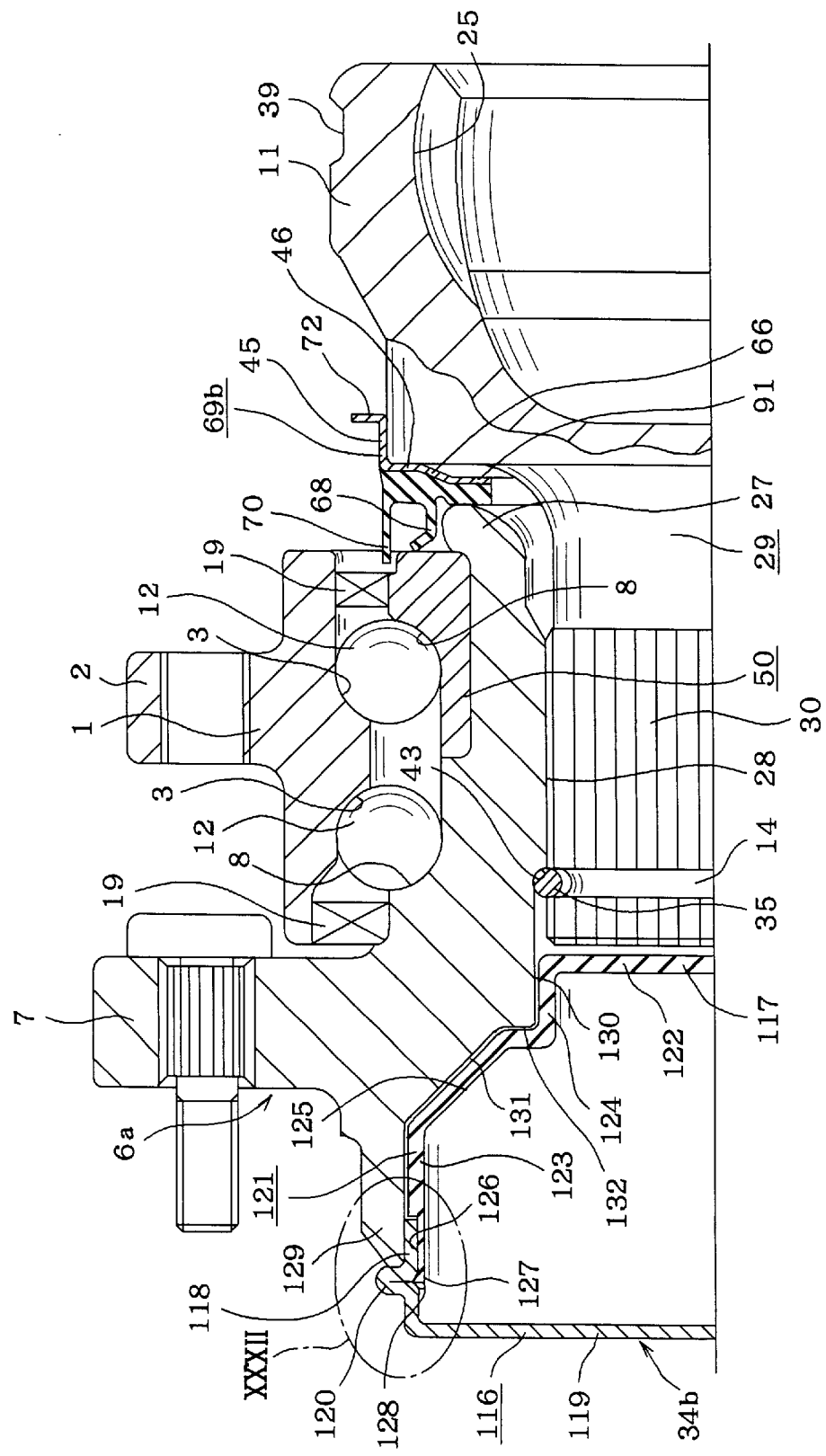
FIG. 31 is a cross sectional view of one half of an example of the embodiments of the axle unit for driving a vehicle wheel according to the present invention.
Figure 32:
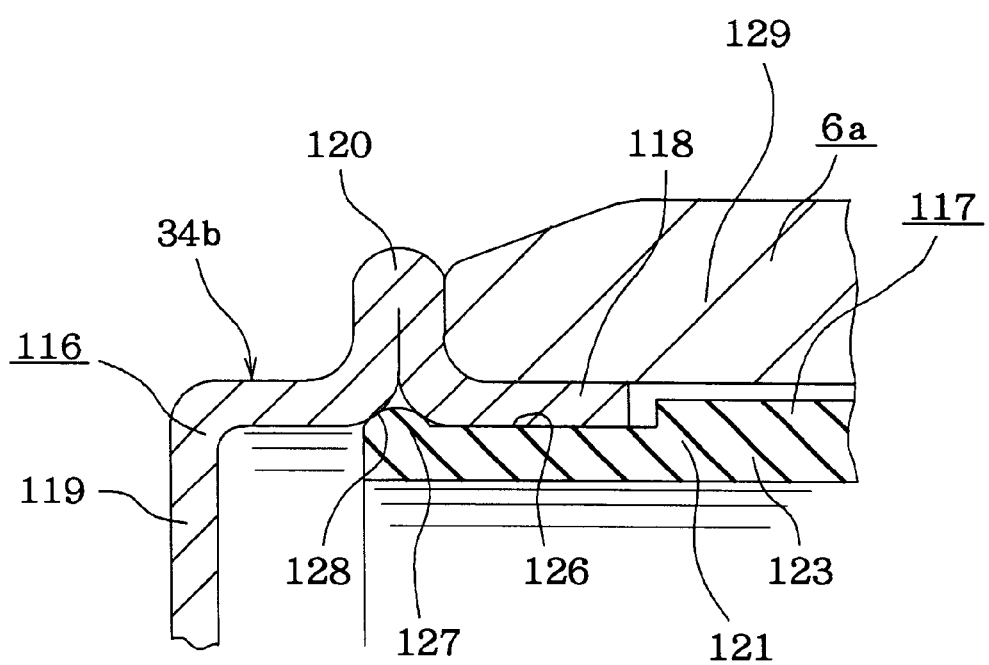
FIG. 32 is an enlarged view of Portion XXXII in FIG. 31.

FIGS. 31 and 32 show a twenty-fourth example of the embodiment of the present invention. In the case of this example, the outer end opening of the space in which the splined engagement portion of the splined shaft 30 and the splined bore 28 exists is blocked by a cap 34b formed by combining a first element 116 and a second element 117.

The first element 116 is formed in a closed end cylinder shape by deep-drawing a metal plate, and comprises a cylindrical portion 118 serving as a fitting and securing portion and a bottom plate 119 for blocking the axially outer end opening of the cylindrical portion 118.

Moreover, an outwardly flanged collar 120 is formed on the outer peripheral face of the middle part of the cylindrical portion 118 by buckling and deforming the metal plate so that the metal plate is folded back by 180 degree.

The second element 117 is formed in a closed end cylinder shape from a synthetic resin, and comprises a cylindrical portion 121, the shape of the outer peripheral face thereof being aligned with or freely capable of being aligned with a shape of the inner peripheral face on the axially outer end side of the hub 6a, and a bottom plate 122 which is a blocking plate disposed to block the axially inner end opening of the cylindrical portion 121.

The cylindrical portion 121 comprises a large diameter cylindrical portion 123, a small diameter cylindrical portion 124 and a connecting portion 125 connecting the axially inner end rim of the large diameter cylindrical portion 123 to the axially outer end rim of the small diameter cylindrical portion 124. The bottom plate 122 is disposed to block the axially inner end opening of the small diameter cylindrical portion 124.

The cap 34b is constricted by combining the first element 116 and the second element 117 back to back. That is to say, when the first and second elements 116 and 117 are combined, as shown in FIG. 32 in detail, the axially inner half part of the cylindrical portion 118 in the first element 116 is made to engage in an engagement groove 126 formed around the whole periphery on the outer peripheral face on the axially outer end of the large diameter cylindrical portion 123 in the second element 117.

At the same time, a protruding anchoring portion 127 is formed around the whole periphery on the outer peripheral face at the axially outer end of the large diameter cylindrical portion 123 and engaged in a V-shaped groove 128 formed when the collar 120 is being formed, on the inner peripheral face of the middle part of the cylindrical portion 118.

In the combined state as described above, the shape and the size of respective portions are restricted so that the engagement portion between the axially inner half of the cylindrical portion 118 and the engagement groove 126, and the engagement portion between the protruding anchoring portion 127 and the V-shaped groove 128 are sufficiently sealed.

When the cap 34b is attached to the axially outer end opening of the hub 6a to seal the axially outer end opening of the hub 6a, the axially inner half of the cylindrical portion 118 of the first element 116 is internally secured to an axially outer end portion of a positioning cylindrical portion 129 provided at the axially outer end of the hub 6a, by an interference fit, while the second element 117 is inserted into the inner diameter side on the axially outer end side of the hub 6a.

At the same time, the collar 120 is made to abut against the axially outer end face of the positioning cylindrical portion 129. The positioning cylindrical portion 129 is for positioning a driven wheel, not-shown, with respect to the axially outer end portion of the hub 6a, when the driven wheel is mounted on the mount flange 7. When the driven wheel is mounted on the mount flange 7, the positioning cylindrical portion 129 is inserted into a circular hole formed in the center of the driven wheel.

With the cap 34b mounted in the axially outer end opening of the hub 6a as described above, the outer peripheral face of the cylindrical portion 121 of the second element 117 abuts generally against or is close to the inner peripheral face on the axially outer end side of the hub 6a.

That is to say, the outer peripheral face of the large diameter cylindrical portion 123 abuts against the inner peripheral face of the positioning cylindrical portion 129, the outer peripheral face of the small diameter cylindrical portion 124 abuts against the inner peripheral face of the small diameter portion 130 formed on the inner peripheral face of the middle part of the hub 6a, and the axially outside face of the connecting portion 125 abuts against an inclined portion 131 and a stepped portion 132 which exist in a space between the inner peripheral face of the positioning cylindrical portion 129 and the inner peripheral face of the small diameter portion 130, respectively.

At the same time, the bottom plate 122 which constitutes the second element 117 faces close to the tip face of the splined shaft 30 with the bottom plate 122 blocking the axially outer end opening of the space where the engagement portion of the splined shaft 30 and the splined bore 28 exists.

As described above, in the case of this example, by providing the blocking plate or bottom plate 122 of the cap 34b axially inward of the cylindrical portion 118 which is the fitting and securing portion, the bottom plate 122 is made to face close to the tip end face of the splined shaft 30. Accordingly, the volume of the space where the engagement portion of the splined shaft 30 and the splined bore 28 exists can be made small to reduce the amount of grease filled in the space. In the case of this example, the grease filled in that space may enter into the portion on the axially outer end side of the bottom plate 122, that is, the portion between the outer peripheral face of the cylindrical portion 121 in the second element 117 and the inner peripheral face on the outer end side of the hub 6a.

The coupled portion of the first and the second elements 116 and 117 which exist in the axially outer end portion between these opposite outer and inner peripheral faces, and the fitted portion between the cylindrical portion 118 and the positioning cylindrical portion 129, however, has sufficient sealing performance. Therefore, even if the grease enters into the space between the opposite outer and inner peripheral faces, the grease does not leak outside through the engagement portion and the fitted portion.

In the case of this example, moreover, the cylindrical portion 118 which is the fitting and securing portion is internally secured at the axially outer end portion of the positioning cylindrical portion 129 defining the axially outer end opening of the hub 6a. Hence, the cylindrical portion 118 can be easily internally secured to the hub 6a. The construction of the seal member including the metal backing member 69b which is incorporated in this example is substantially the same as that for the eighth example shown in FIG. 12 described above.

Figure 33:
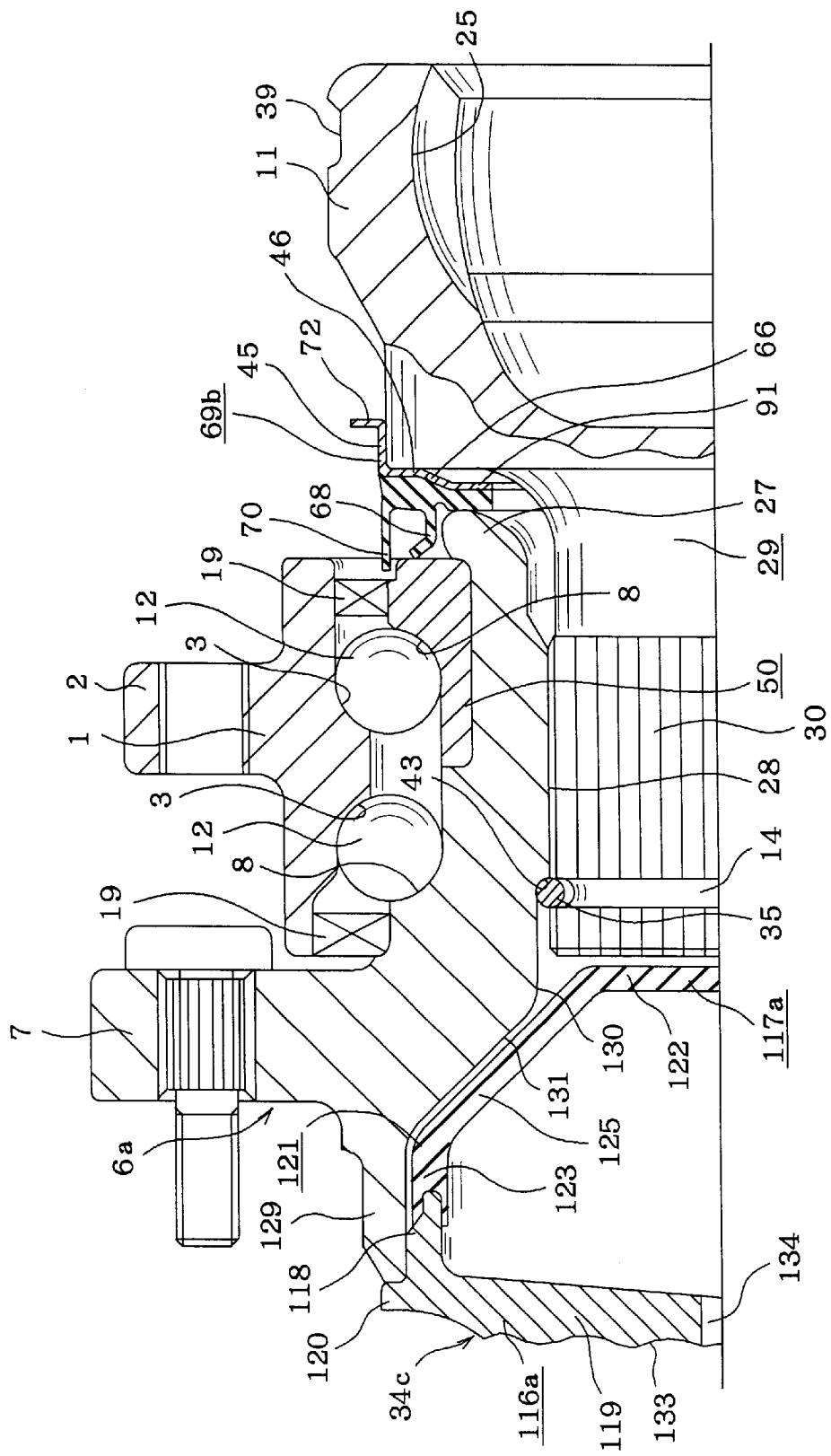
FIG. 33 is a cross sectional view of one half of an example of the embodiments of the axle unit for driving a vehicle wheel according to the present invention.

FIG. 33 shows a twenty-fifth example of the embodiment of the present invention. In the case of this example, a first element 116a which constitutes a cap 34c is prepared by die-cast molding an aluminum alloy. Moreover, on the axially outside face of a bottom plate 119 in the first element 116a, a molding 133 for improving the appearance is provided by the die cast molding. A second element 117a made of a synthetic resin is coupled integrally with the first element 116a by blow molding to constitute the cap 34c. Therefore, the edge on the axially outer end side of the large diameter cylindrical portion 123 of the second element 117a is bonded around the whole periphery to the edge on the axially inner end side of the cylindrical portion 118 of the first element 116a. The bonding strength between the first element 116a and the second element 117a can be improved by forming through holes or bottomed holes in the tip portion of the cylindrical portion 118.

Moreover, to perform the blow molding as described above, a blowing orifice 134 for blowing air into a space between the first element 116a and the second element 117a is formed in the central portion of a bottom plate 119 which constitutes the first element 116a. The blowing orifice 134 is blocked after completion of the cap 34c.

In the case of this example, to match the shape of the outer peripheral face of a cylindrical portion 121 of the second element 117a with the shape of the inner peripheral face on the axially outer end side of the hub 6a, the small diameter cylindrical portion 124 (see FIG. 31) is not formed on the cylindrical portion 121.

Other construction and operation are substantially the same as for the case of the above described twenty-fourth example.

Figure 34:
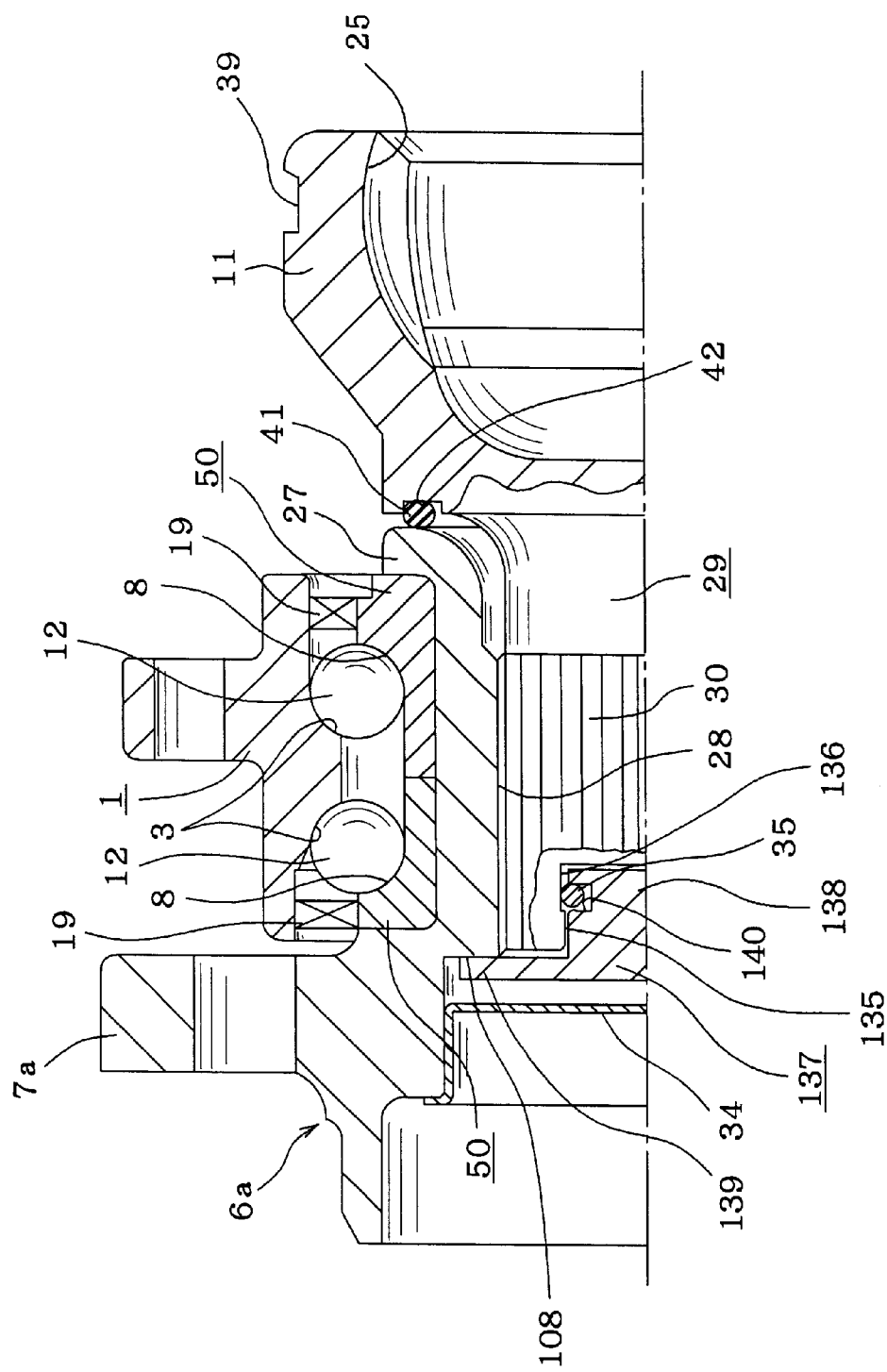
FIG. 34 is a cross sectional view of one half of an example of the embodiments of the axle unit for driving a vehicle wheel according to the present invention.

FIG. 34 shows a twenty-sixth example of the embodiment of the present invention. In the case of this example, a hole or circular bottomed hole 135 is formed in the central part of the tip face of the splined shaft 30 which constitutes the drive shaft member 29.

Moreover, an outside engagement portion or outside engagement groove 136 is formed around the whole periphery on the inner peripheral face of the bottomed hole 135. Into the bottomed hole 135, a part of a coupling shaft member 137 which is a separate body of the hub 6a is inserted.

The coupling shaft member 137 comprises a cylindrical portion 138 which can be inserted into the bottomed hole 135 without rattling, and an outwardly flanged retaining collar 139, formed on the axially outer end portion of the cylindrical portion 138.

At a position coordinated with the outside engagement groove 136 on the outer peripheral face of the cylindrical portion 138, with the retaining collar 139 made to abut against a stepped portion 108 formed on the peripheral rim portion of the opening of the splined bore 28, an inside engagement portion or inside engagement groove 140 is formed around the whole periphery.

Moreover, a stop ring 35 made of a resilient material is fitted between the inside engagement groove 140 and the outside engagement groove 136, with the stop ring 35 spanning between the inside engagement groove 140 and the outside engagement groove 136.

A part of the hub 6a is clamped between the retaining collar 139 and the housing 11 provided at the bottom end portion of the drive shaft member 29 with an O-ring 42, which is a seal member made of a resilient material, resiliently compressed, and the coupling shaft member 137 coupled to the tip end portion of the splined shaft 30 via the stop ring 35. Moreover, the axially outer end opening of the hub 6a is sealed by a cap 34.

With this construction, axial positioning of the hub 6a with respect to the coupling shaft member 137 and the drive shaft member 29 is effected, and the splined engagement portion between the splined bore 28 and the splined shaft 30 is sealed.

Other construction and operation are substantially the same as for the case of the above described fourth example shown in FIG. 7 described above, hence similar components are denoted by the same symbols, and repeated description is omitted.

Figure 35:
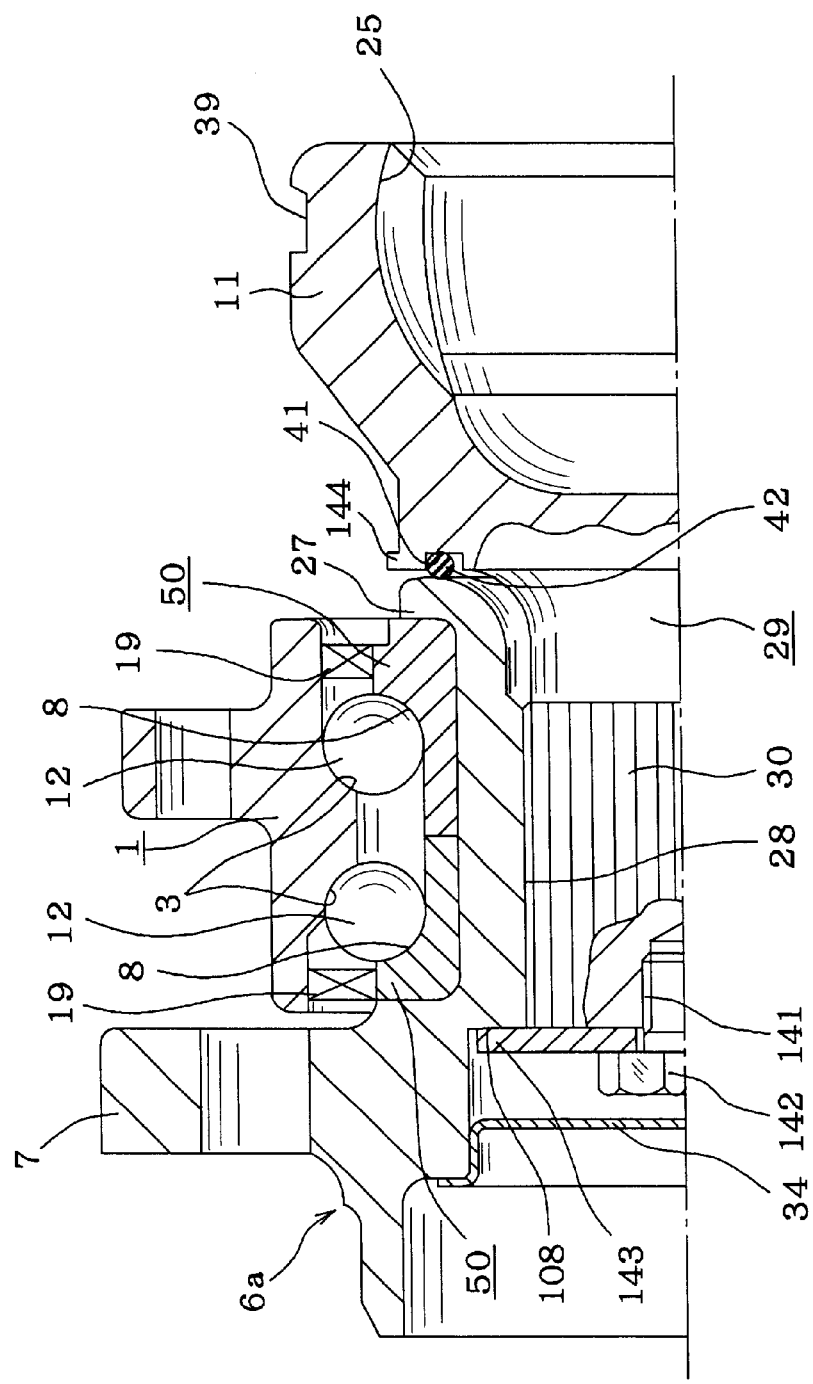
FIG. 35 is a cross sectional view of one half of an example of the embodiments of the axle unit for driving a vehicle wheel according to the present invention.
Figure 36:
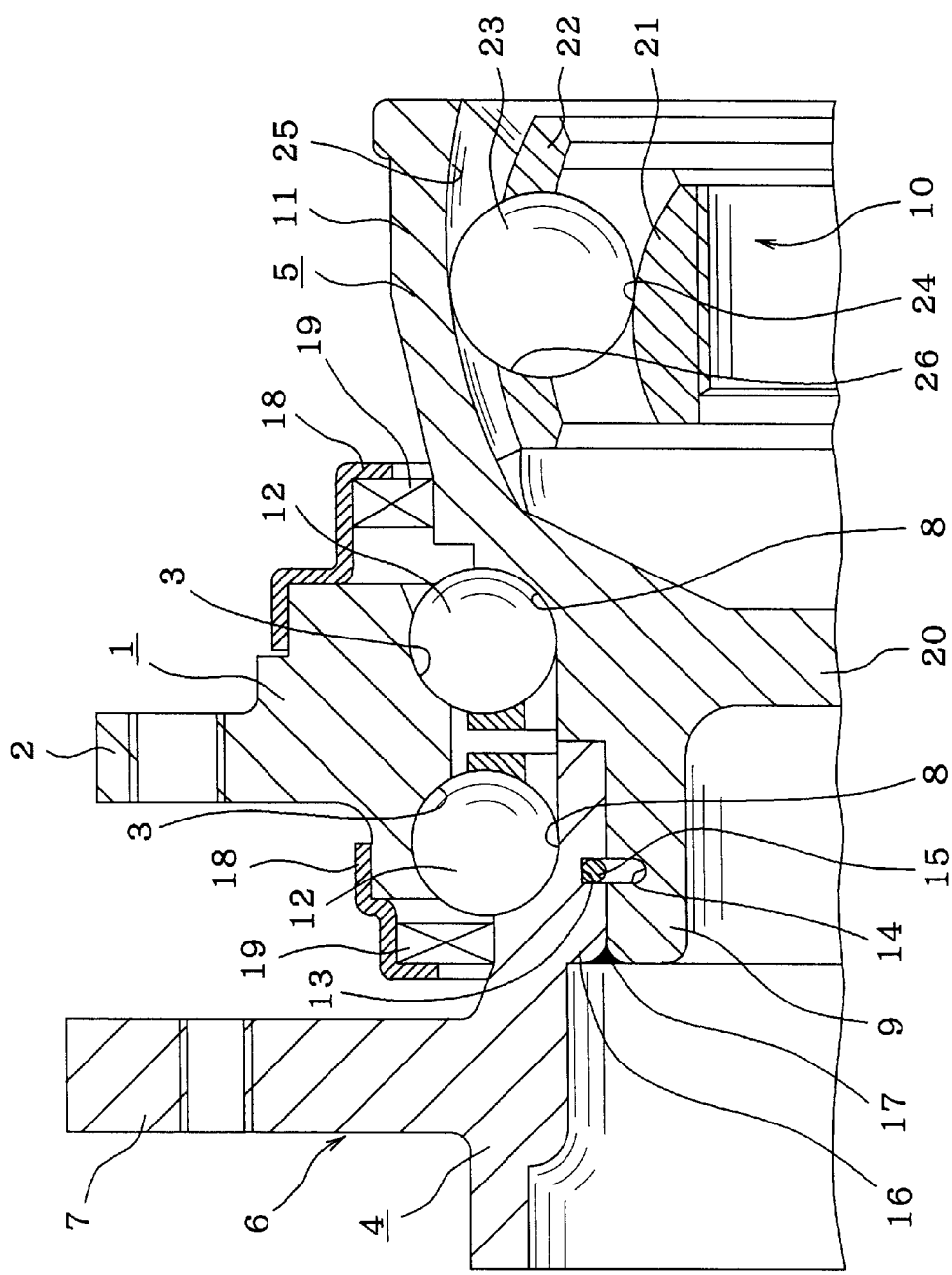
FIG. 36 is a cross sectional partial view of one example of the prior art structures.

Next, FIG. 35 shows another example of the embodiments of the present invention. In this example, a thread hole 141 is formed in the center portion of the tip end surface of the spline shaft 30 of the drive shaft member 29. And a bolt 142 is screwed into the threaded hole 141 and tightened, so that a retaining plate 143 in a circular ring shape, that is a connecting member, is securely connected to the tip end of the drive shaft member 29. In addition, an O ring 42 is supported in the support hole 141 on the axially outer end of the housing portion 11, and the hub 6a is resiliently held in the axial direction between the retaining plate 143 and the Oring 42.

Incidentally, in the present case, a brim portion 144 is formed on the outer peripheral surface at the axially outer end of the housing portion 11. When the splined shaft 30 is inserted into the splined hole 28, a robot arm grasps the outer peripheral surface of the housing portion 11 to force the housing portion 11 from right to left in FIG. 35. At this time, the brim portion 144 serves as a stopper to prevent the robot arm from being removed from the housing portion 11. In this structure where the robot arm is used for providing spline engagement between the splined shaft 30 and the splined hole 28, there is no need of process to form the engagement groove 54 for engagement with the drawing tool in the concave hole 53 at the central portion of the tip end surface of the splined shaft 30 (See FIG. 3). In addition, in this structure, automatic assembling using robots is possible.

The structure and function of the other parts are substantially the same to those of the example of FIG. 34. And like cords are attached to the like members and redundant explanation is omitted.

With the present invention constructed and operated as mentioned above, the compact and light weight axle unit for driving the wheel is realized with excellent durability and reliability, by which the comfortability, power performance and fuel performance of automobiles are improved. The component parts are prevented from bumping against each other during operation, and abnormal noise, vibration and fretting wear are prevented from occurring. Therefore, the comfortability of automobiles having the axle unit installed therein can be improved, and the durability of the axle unit can be improved.

What is claimed is:

1. An axle unit for driving a vehicle wheel comprising:
a bearing assembly comprising an outer ring having a flange to be fixed to a suspension provided in a vehicle body and an inner peripheral surface formed with an outer ring raceway thereon, and a rotatable inner ring having a flange to which a tire is connected, and an inner raceway ring fixed through crimping to the inner ring at the end thereof on the inner side of the vehicle body and having an outer peripheral surface formed with an inner ring raceway thereon, and the inner ring formed with a fitting bore having an inner peripheral surface formed with a first spline and a circumferential groove or a step portion,
a constant velocity joint having an outer ring which has a fitting shaft at an end thereof on the outer side of the vehicle body, and the fitting shaft having an outer peripheral surface formed with a second spline for spline engagement with the first spline of the fitting bore, and with a circumferential groove, and
a stop ring fitted into the circumferential groove or step portion of the fitting bore and to the circumferential groove of the fitting shaft, so that the bearing assembly is connected to the constant velocity joint through the stop ring in the axial direction.

2. An axle unit for driving a vehicle wheel comprising:
a bearing assembly comprising an outer ring fixed to a suspension provided in a vehicle body and an inner peripheral surface formed with an outer ring raceway thereon, and a rotatable hub having a flange to which a tire is connected, and an inner raceway ring fixed through crimping to the hub at the end thereof on the axially inner side of the vehicle body and having an outer peripheral surface formed directly or indirectly with an inner ring raceway thereon, and the hub formed with a fitting bore having an inner peripheral surface formed with a first spline and a circumferential groove or a step portion,
a constant velocity joint having an outer ring which has a fitting shaft at an end thereof on the axially outer side of the vehicle body, and the fitting shaft being an outer peripheral surface formed with a second spline for spline engagement with the first spline of the fitting bore, and with a circumferential groove,
a stop ring fitted into the circumferential groove or step portion of the fitting bore and to the circumferential groove to the fitting shaft, so that the bearing assembly is connected to the constant velocity joint through the stop ring in the axial direction.

3. An axle unit for driving a vehicle wheel comprising:
a bearing assembly comprising an outer ring fixed to a suspension provided in a vehicle body and an inner peripheral surface formed with an outer ring raceway thereon, and a rotatable hub having a flange to which a tire is connected, and an inner raceway ring fixed through crimping to the hub at the end thereof on the axially inner side of the vehicle body and having an outer peripheral surface formed directly or indirectly with an inner ring raceway thereon, and the hub formed with a fitting bore having an inner peripheral surface formed with a first spline and a circumferential groove or a step portion, a constant velocity joint having an outer ring which has a fitting shaft at an end thereof on the axially outer side of the vehicle body, and the fitting shaft having an outer peripheral surface formed with a second spline for spline engagement with the first spline of the fitting bore, and with a circumferential groove, a stop ring fitted into the circumferential groove of the fitting shaft, and the inserted into the fitting bore to be fitted into the circumferential groove or step portion of the fitting bore, so that the bearing assembly is connected to the constant velocity joint through the stop ring in the axial direction.

* * * * *